US011844992B2

(12) United States Patent
Kweon et al.

(10) Patent No.: US 11,844,992 B2
(45) Date of Patent: Dec. 19, 2023

(54) TENNIS SELF-TRAINING SYSTEM

(71) Applicant: CURINGINNOS INC., Incheon (KR)

(72) Inventors: Ye Chan Kweon, Incheon (KR); Wha Suk Lee, Incheon (KR); Hyuk Jae Lee, Incheon (KR); Seok Hwan Wi, Incheon (KR); Jee Hun Son, Incheon (KR)

(73) Assignee: CURINGINNOS INC., Incheon (KR)

( * ) Notice: Subject to any disclaimer, the term of this patent is extended or adjusted under 35 U.S.C. 154(b) by 0 days.

(21) Appl. No.: 17/883,285

(22) Filed: Aug. 8, 2022

(65) Prior Publication Data

US 2023/0110640 A1 Apr. 13, 2023

(30) Foreign Application Priority Data

Oct. 7, 2021 (KR) .................. 10-2021-0133347
Jun. 30, 2022 (KR) .................. 10-2022-0080550

(51) Int. Cl.
*A63B 69/40* (2006.01)
*G05B 13/02* (2006.01)
*A63B 69/38* (2006.01)

(52) U.S. Cl.
CPC ............ *A63B 69/406* (2013.01); *A63B 69/38* (2013.01); *G05B 13/0265* (2013.01); *A63B 2069/402* (2013.01)

(58) Field of Classification Search
CPC ... A63B 2102/02; A63B 69/38; A63B 47/002; G05B 15/02; G05B 13/0265
See application file for complete search history.

(56) References Cited

U.S. PATENT DOCUMENTS

| 6,082,350 A | 7/2000 | Crews et al. |
| 10,912,981 B1 * | 2/2021 | Ebrahimi Afrouzi ....................... B25J 11/003 |
| 2016/0166912 A1 * | 6/2016 | Paredes .................. A63B 63/00 473/462 |

(Continued)

FOREIGN PATENT DOCUMENTS

| KR | 10-2002-0018185 A | 3/2002 |
| KR | 10-2018-0031135 A | 3/2018 |

(Continued)

OTHER PUBLICATIONS

Office Action of KR Patent Application No. 10-2022-0080553 dated Oct. 17, 2022.

(Continued)

*Primary Examiner* — Ronald D Hartman, Jr.
(74) *Attorney, Agent, or Firm* — Maschoff Brennan

(57) ABSTRACT

The tennis ball supply device according to an embodiment of the present invention includes a communication circuit configured to communicate with an external device; a launcher configured to launch a ball; a body unit configured to move the launcher; and a controller configured to: control the body unit to move to a first position, identify whether the body unit is disposed on the first position based on a signal received from the communication circuit, based on identifying that the body unit is disposed on the first position, control the launcher to launch the ball, control the body unit to move to a second position after the launcher has stopped launching the ball, and identify whether the body unit is disposed on the second position based on the signal received from the communication circuit.

16 Claims, 53 Drawing Sheets

(56) References Cited

U.S. PATENT DOCUMENTS

2020/0197782 A1* 6/2020 Abdelmoneum .... A63B 69/406
2022/0193504 A1* 6/2022 Woo .................... A63B 47/025
2022/0296982 A1   9/2022 Kalfa

FOREIGN PATENT DOCUMENTS

| KR | 10-2019-0031113 A |   | 3/2019 | | |
| KR | 2020030219 A | * | 3/2020 | .............. | G06T 7/11 |
| KR | 10-2020-0126036 A |   | 11/2020 | | |
| KR | 10-2265914 B1 |   | 6/2021 | | |
| KR | 10-2021-0115465 A |   | 9/2021 | | |
| KR | 10-2021-0141263 A |   | 11/2021 | | |
| KR | 10-2022-0045020 A |   | 4/2022 | | |
| KR | 102464171 B1 | * | 9/2022 | ............. | A63B 69/40 |
| WO | WO-2022050792 A1 | * | 3/2022 | ......... | A63B 24/0006 |

OTHER PUBLICATIONS

Office Action of KR Patent Application No. 10-2022-0080551 dated Oct. 18, 2022.
Office Action of KR Patent Application No. 10-2022-0080552 dated Oct. 18, 2022.
International Search Report dated Feb. 6, 2023 as received in Application No. PCT/KR2022/015128.
Written Opinion of the International Searching Authority dated Feb. 6, 2023 as received in Application No. PCT/KR2022/015128.

* cited by examiner

FIG. 33
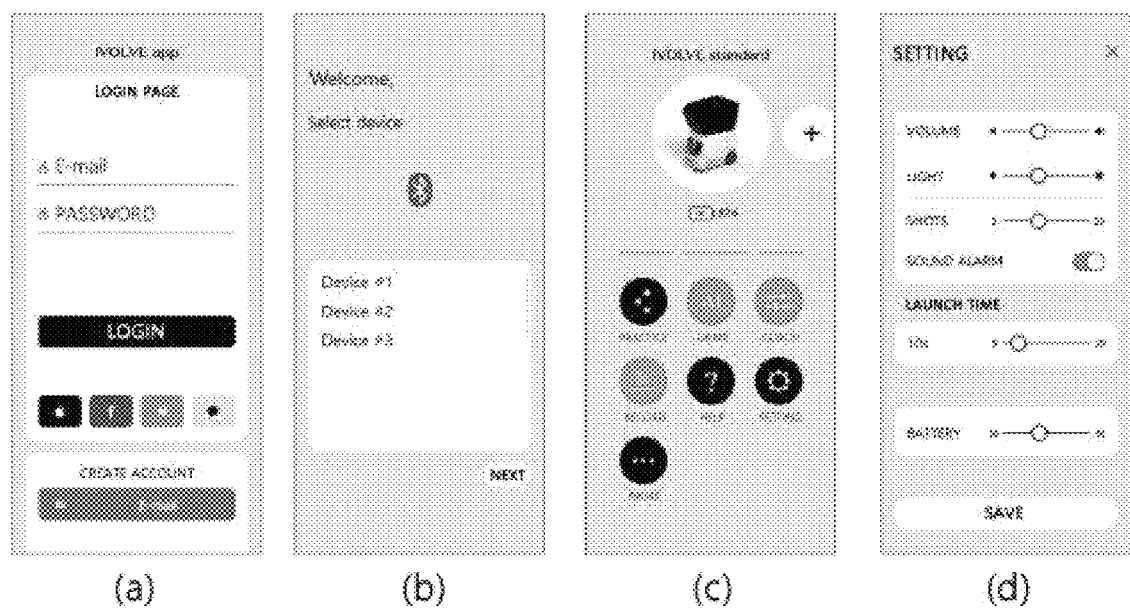
(a)     (b)     (c)     (d)
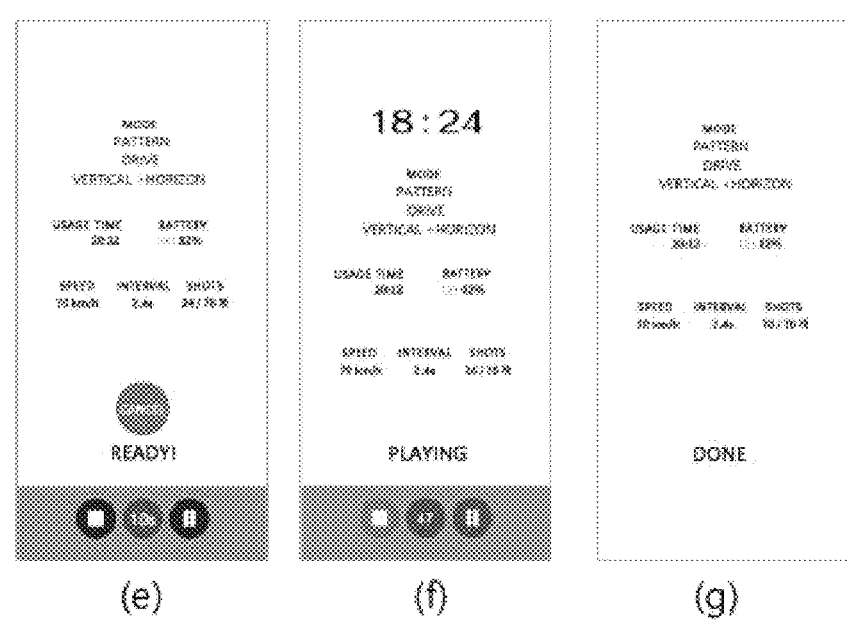
(e)     (f)     (g)

FIG. 34
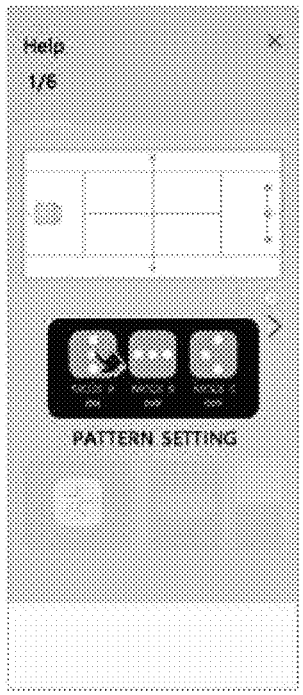
(a)
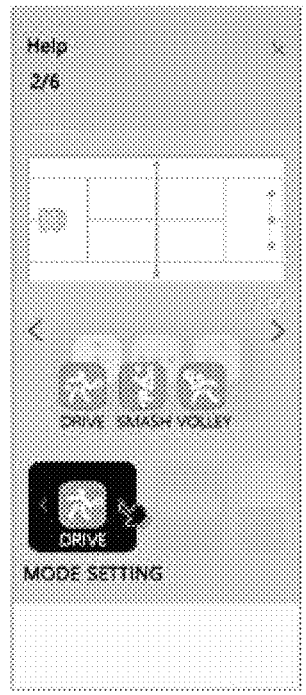
(b)
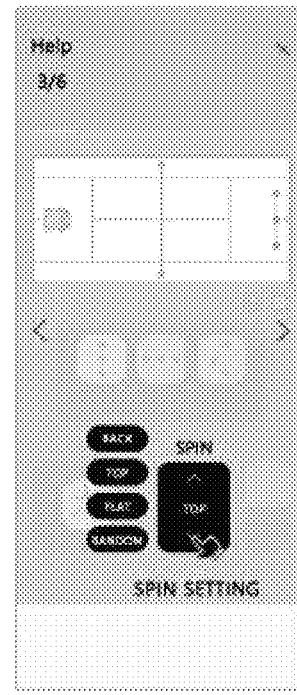
(c)
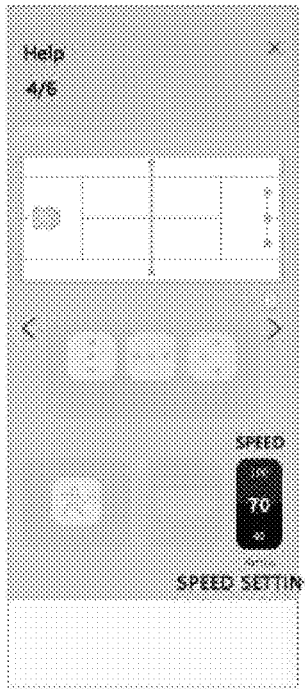
(d)
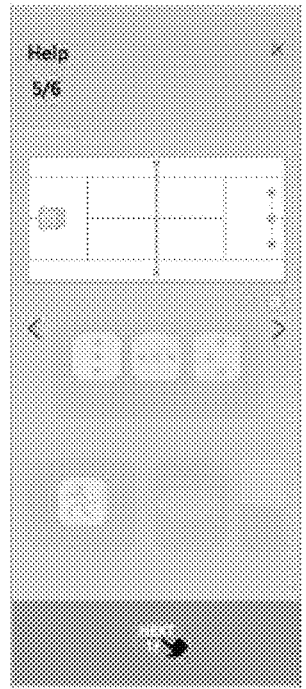
(e)
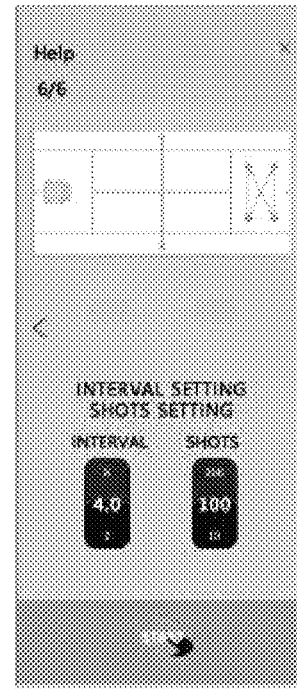
(f)

FIG. 36
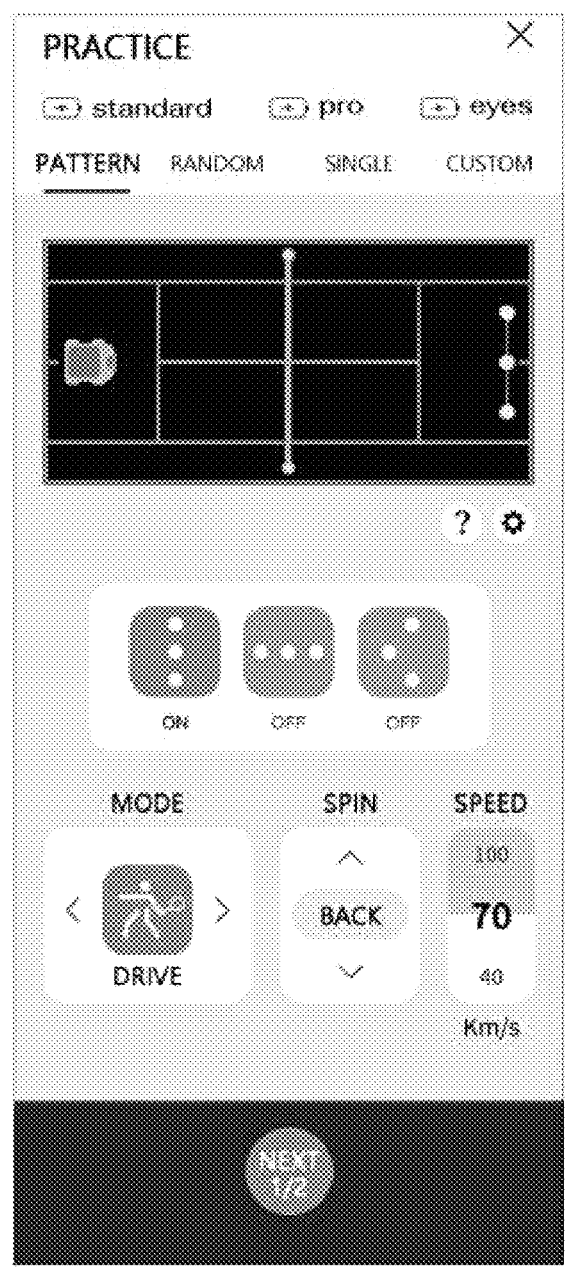
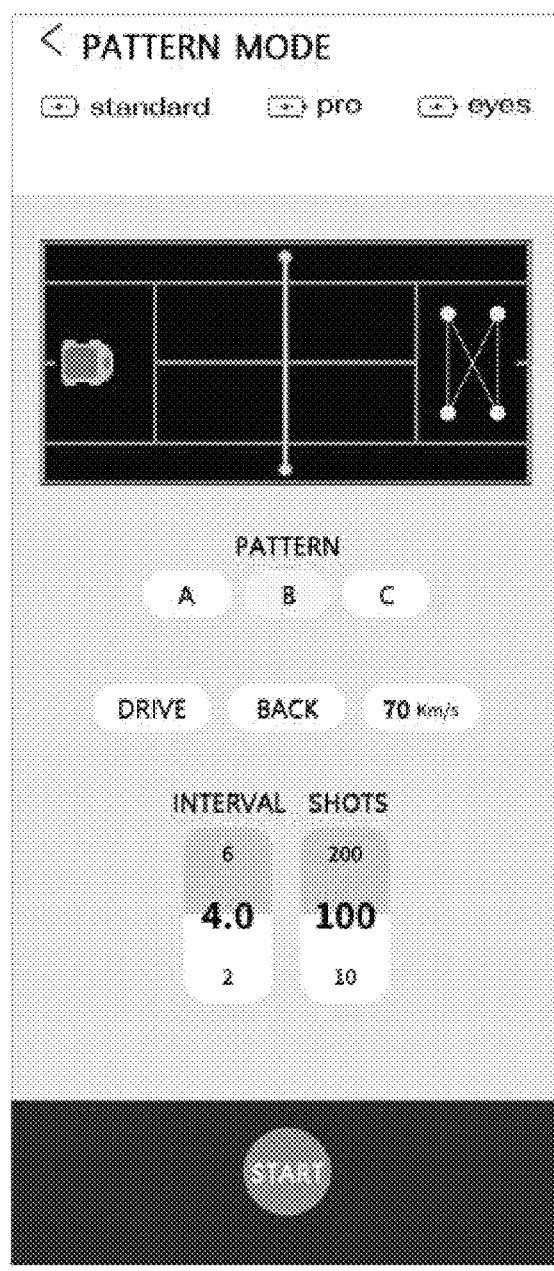
(a)          (b)

FIG. 37
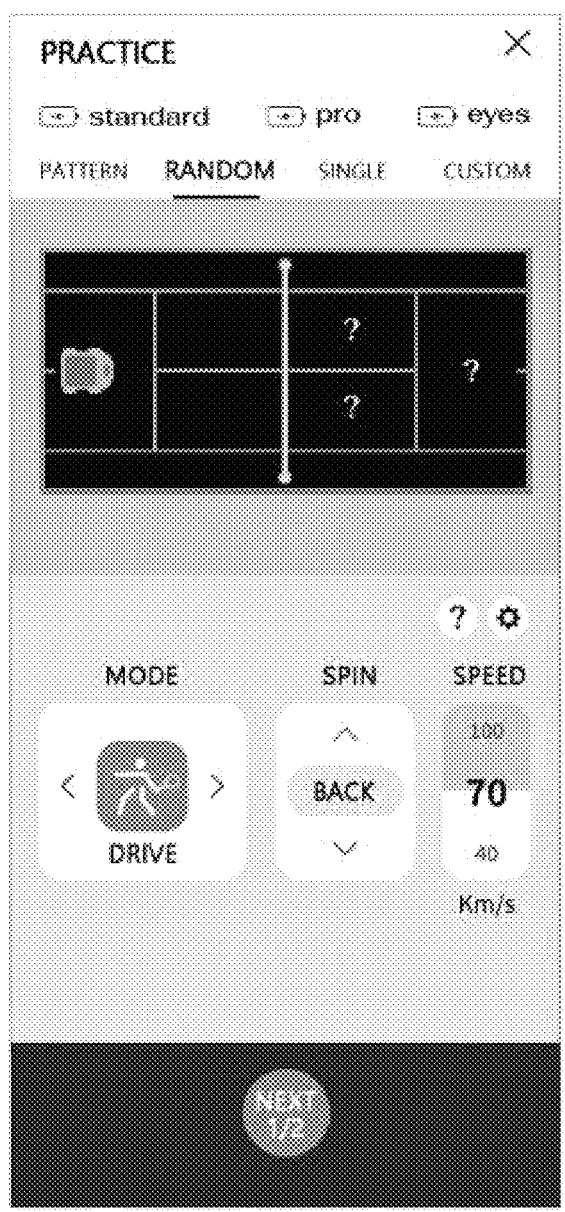
(a)
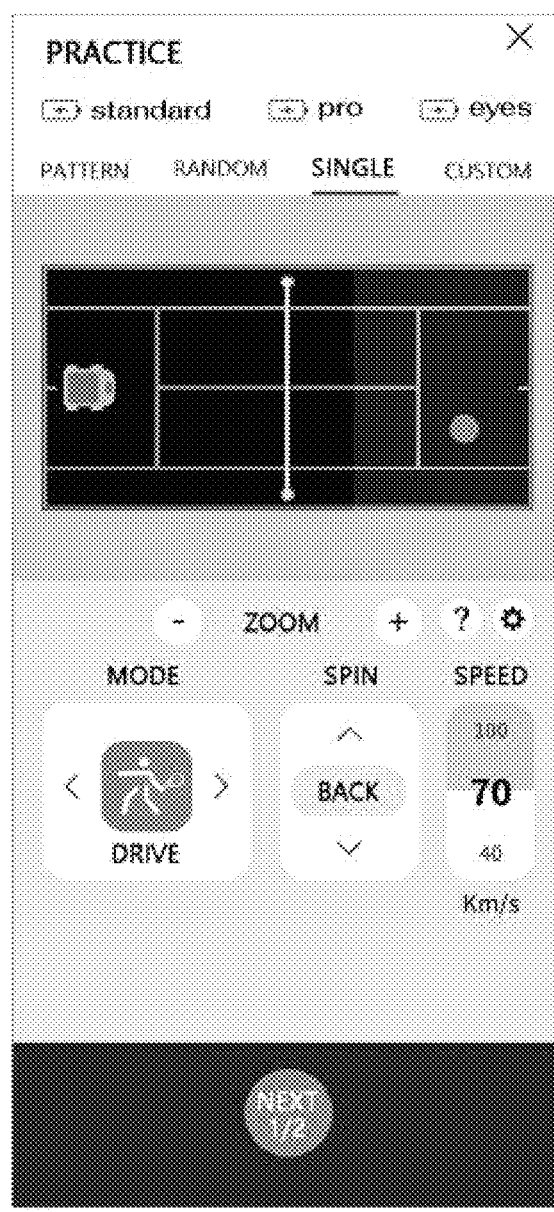
(b)

FIG. 44
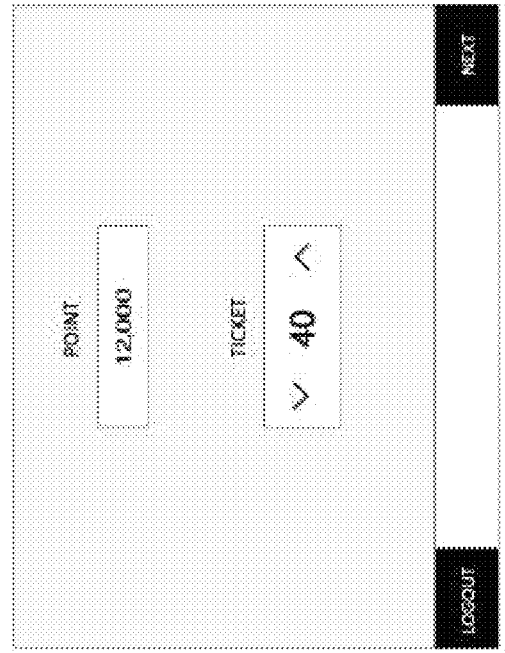
(a)
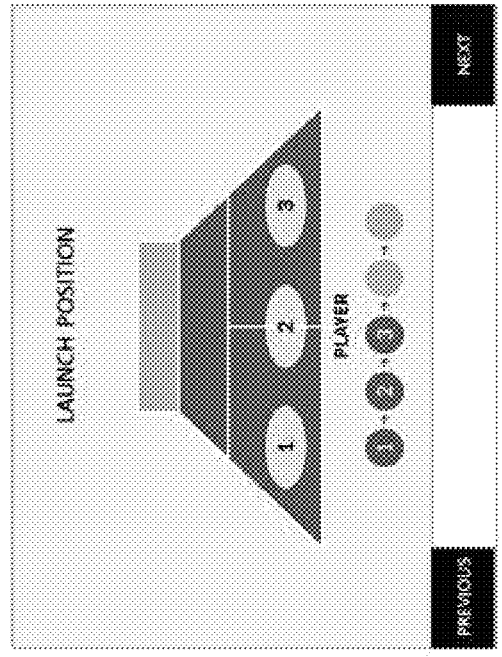
(b)
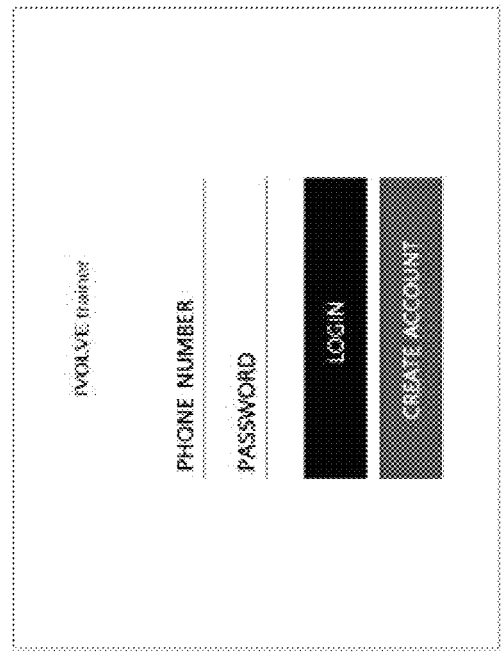
(c)
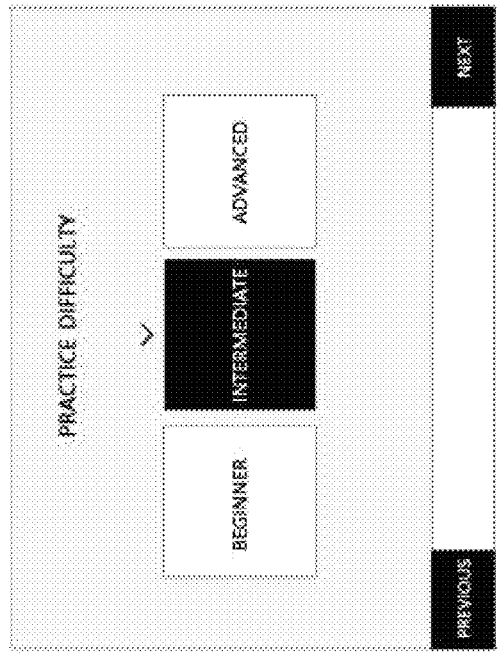
(d)

(a)  (b)

(a)          (b)

TENNIS SELF-TRAINING SYSTEM

CROSS REFERENCE TO RELATED APPLICATION

The present application claims priority to Korean Patent Application No. 10-2021-0133347, filed Oct. 7, 2021, the entire contents of which are incorporated herein for all purposes by this reference.

BACKGROUND OF THE INVENTION

Field of the Invention

The present invention relates to a tennis self-training system using artificial intelligence and, more particularly, to a tennis self-training system using artificial intelligence based on a tennis ball supply device and a method of operating the same.

Description of the Related Art

Demand and interest in tennis around the world are continuously increasing, and thus tennis-related facilities, as well as the tennis industry related to tennis equipment or the lesson market are also rapidly developing.

Since a player must have another player or a coach in order to play a tennis match or conduct training, there are many restrictions on playing alone or practicing. Tennis ball machines that assist players to practice tennis on their own are currently being distributed at a tennis court, thereby enabling the players to perform tennis practice alone.

However, because the existing tennis ball machine was not equipped with various training mode functions using artificial intelligence, there is a limitation that the players have no choice but to conduct simple and limited practices.

Accordingly, there is a need to provide a customized training mode function through evaluation and analysis of the player's athletic ability, and develop a tennis ball machine equipped with artificial intelligence which launches the ball while analyzing motions of the player associated with the ball in real time as if the player were playing a real game.

SUMMARY OF THE INVENTION

Accordingly, the present invention has been made keeping in mind the above problems occurring in the prior art, and an objective of the present invention is to provide a tennis self-training system equipped with artificial intelligence.

Another objective of the present invention is to provide a tennis ball supply device and a method of operating the same.

The problem to be solved by the present invention is not limited to the above-mentioned problems, and problems not mentioned will be clearly understood by those of ordinary skill in the art to which the present invention pertains from this specification and the accompanying drawings.

According to an embodiment of the present invention, the tennis ball supply device includes a launcher; body unit; and at least one processor, in which the at least one processor is configured to: determine a point where the tennis ball supply device is located; when it is determined that the point where the tennis ball supply device is located is not a reference point, control the body unit so that the tennis ball supply device moves to the reference point, and when it is confirmed that the tennis ball supply device moves to the reference point, control the operation of at least one of the launcher and the body unit based on a predetermined launch condition, the reference point being a point determined according to a predetermined criterion.

The means of solving the problems of the present invention are not limited to the above-described solutions, and those of ordinary skill in the art to which the present invention pertains will be able to clearly understand solutions not mentioned in this specification and the accompanying drawings.

BRIEF DESCRIPTION OF THE DRAWINGS

The above and other objects, features, and other advantages of the present invention will be more clearly understood from the following detailed description when taken in conjunction with the accompanying drawings, in which:

FIGS. 33 to 39 are exemplary views illustrating a user interface output from a mobile device according to an embodiment;

FIGS. 42 to 44 are exemplary views illustrating a user interface output through a mobile device according to another embodiment;

DETAILED DESCRIPTION OF THE INVENTION

Figure 1:
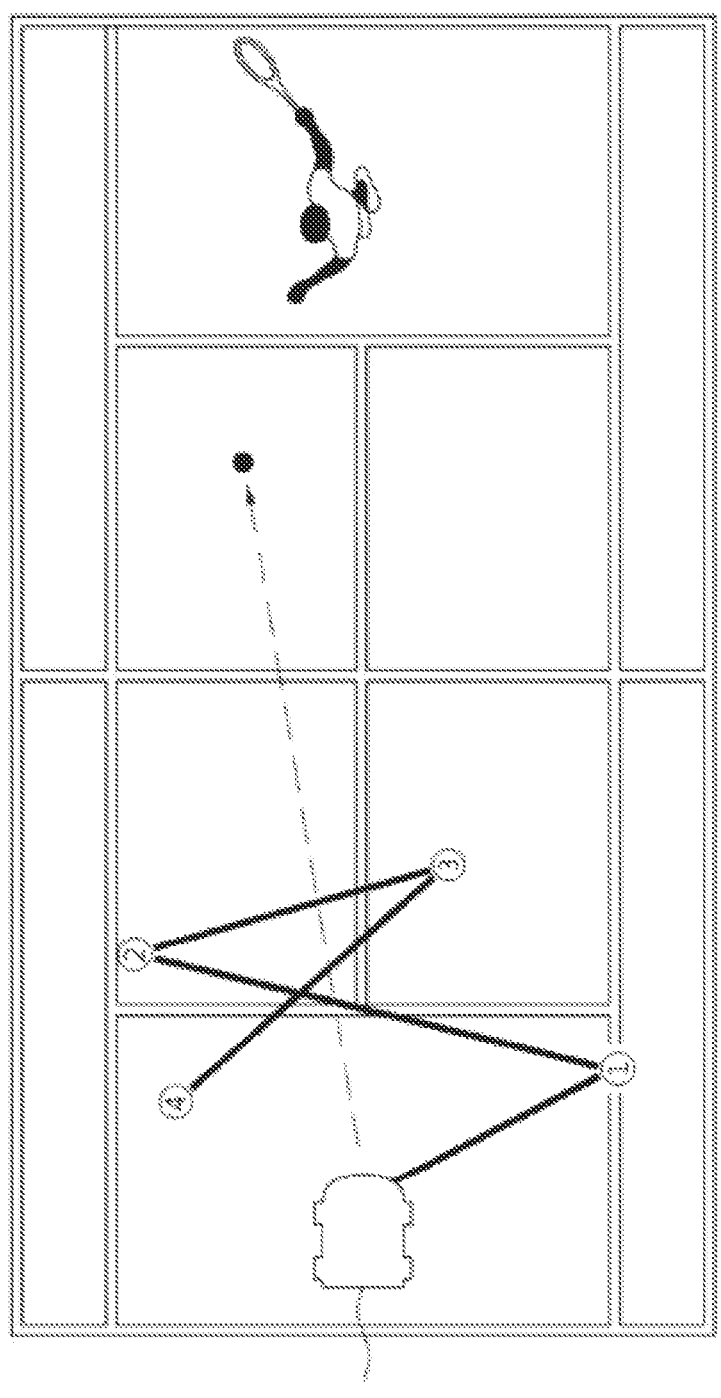
FIGS. 1 and 2 are views illustrating a tennis self-training system according to an embodiment.

The above-described objectives, features, and advantages of the present application will become more apparent from the following detailed description in conjunction with the accompanying drawings. However, the present application may apply various changes and may have various embodiments, and specific embodiments are illustrated in the drawings and will be described below in detail.

Throughout the specification, like reference numerals refer to like elements in principle. In addition, components having the same function within the scope of the same idea shown in the drawings of each embodiment will be described using the same reference numerals, and overlapping descriptions thereof will be omitted.

When it is determined that a detailed description of a known function or configuration related to the present application may unnecessarily obscure the gist of the present application, a detailed description thereof will be omitted. In addition, numbers (e.g., first, second, etc.) used in the description process of the present specification are merely identification symbols for distinguishing one component from other components.

In addition, the suffixes "module" and "part" for the components used in the following embodiments are given or mixed in consideration of only the ease of writing the specification, and do not have distinct meanings or roles by themselves.

In the following examples, the singular expression includes the plural expression unless the context clearly dictates otherwise.

In the examples below, the terms "include" or "have" means that the features or elements described in the specification are present, and do not preclude the possibility that one or more other features or elements will be added.

In the drawings, the size of the components may be exaggerated or reduced for convenience of description. For example, the size and thickness of each component shown in the drawings are arbitrarily indicated for convenience of description, and the present invention is not necessarily limited to what is shown.

In cases where certain embodiments are otherwise implementable, the order of specific processes may be performed differently from the order in which they are described. For example, two processes described in succession may be performed substantially simultaneously, and may proceed in a reverse order to the order described.

In the following embodiments, when it is said that the components are connected, the components are directly connected each other, as well as the components may be indirectly connected with other components being intervened.

For example, in this specification, when it is said that the components are electrically connected, the components are directly electrically connected, as well as the components may be electrically connected with other components being interposed in the middle According to one embodiment, the tennis ball supply device includes a ball storage housing having an internal space capable of accommodating the ball; a launcher including one or more rollers and provided in a rotatable left and right state; a housing having an inner space surrounding at least a portion of the launcher and having an opening; an upper plate positioned on a first plane within the housing; and a lower plate formed on the lower side of the upper plate, in which the ball included in the ball storage housing is introduced into the launcher in the direction of the first axis perpendicular to the first plane, the upper plate is provided to be rotatable left and right based on the first axis, and when the upper plate rotates to the left and right, the launcher rotates to the left and right together with the upper plate in a state that the housing and the lower plate are fixed.

The launcher is fixed to the upper plate, but not directly coupled to the lower plate, and the upper plate is not directly coupled to the housing.

The width of the opening formed in the housing is defined correspondingly to the maximum horizontal rotation angle of the launcher.

The launcher includes a ball guide, and the ball introduced into the launcher from the ball storage housing first meets the ball guide at any point on the first axis.

The upper plate includes at least one guide groove capable of guiding the left and right rotation of the upper plate, and is rotatably coupled to the lower plate through the guide groove.

At least one protruding member is formed in the lower plate, and the protruding member is formed to correspond to the guide groove included in the lower plate.

The ball supply device further includes at least one processor, in which the at least one processor controls one or more components included in the tennis ball supply device.

The at least one processor controls the operation of the launcher based on a preset launch condition, in which the preset launch condition relates to at least one of a ball launch speed, a ball launch angle, a ball launch direction, a ball launch interval, the number of ball launches, a type of spin, and a degree of spin.

The at least one processor controls the upper plate to rotate left or right according to a predetermined condition.

The at least one processor determines the launch condition of the launcher based on an image obtained by capturing the movement of the player or ball, and controls the operation of the launcher based on the launch condition.

The tennis ball supply device further includes a body unit, and the at least one processor controls the operation of the body unit so that the ball supply device moves to a predetermined point.

The at least one processor controls the operation of the body unit so that the ball launch position is determined based on the image obtained by capturing the player or the ball and the ball supply device moves to the determined ball launch position.

According to another embodiment, the tennis ball supply device includes a launcher; and at least one processor, in which the at least one processor: receives an operation signal from an external device at a first time, control the action of the launcher so that the ball is launched at the second time point, the second time point being later than the first time point; perform a first operation to control the operation of the launcher based on a predetermined launch condition in the launch waiting period; and perform a second operation of controlling the operation of the launcher so that a zero point of the launcher can be adjusted during the launch waiting period, the launch waiting period being a period between the first time point and the second time point.

The second time point is determined based on a time when it is confirmed that the performance of the first operation is completed by the at least one processor and a time when it is confirmed that the execution of the second operation is completed.

The at least one processor controls the rotation speed of the first roller or the second roller included in the launcher based on the predetermined launch condition in the launch waiting period, in which the second time point is determined based on a time point when it is confirmed that the rotation speed of the first roller or the second roller satisfies the predetermined launch condition.

The at least one processor controls to output a first alarm before the second time point, when it is confirmed that the operation control of the launcher based on the predetermined launch condition is completed, and the zero point of the launcher is adjusted, The at least one processor perform controls so that a first alarm can be output before the second time point, when it is confirmed that the rotation speed of the first roller or the second roller satisfies the predetermined launch condition.

The at least one processor performs the first operation and the second operation during the launch waiting period, and after the second operation is completed, the first operation is performed.

The preset launch condition relates to at least one of a ball launch speed, a ball launch angle, a ball launch direction, a ball launch interval, the number of ball launches, a type of spin, and a degree of spin.

When the preset launch condition is a condition related to the ball launch speed, the at least one processor controls the speeds of the first roller and the second roller included in the launcher to correspond to the preset launch condition.

The at least one processor controls to output a second alarm when the reception of the operation signal is confirmed.

The first alarm is an alarm that can provide information to the user visually or audibly, and the at least one processor determines the type of the first alarm and controls an output of the first alarm based on a surrounding environment condition.

The at least one processor performs a third operation of controlling the operation of the launcher so that the ball launch is stopped, when a predetermined condition is satisfied.

The at least one processor performs a third operation of controlling the operation of the launcher to stop the ball launch, when it is determined that the current value measured by the sensor is abnormal.

The predetermined condition is a condition determined based on at least one of the number of ball launches, the operation time of the launcher, the movement of the ball, the movement of the player, and a sensor value.

The at least one process additionally performs a second operation of controlling the operation of the launcher so that the zero point of the launcher can be adjusted, when it is confirmed that the third operation has been performed.

A method of supplying a tennis ball includes: receiving an operation signal from an external device at a first time point; controlling the operation of the launcher so that the ball is launched at a second time point, the second time point being a time point later than the first time point; performing a first operation for controlling the operation of the launcher based on a predetermined launch condition in a launch waiting period; and performing a second operation of controlling the operation of the launcher so that the zero point of the launcher is adjusted during the launch waiting period, in which the launch waiting period is a period between the first time point and the second time point.

The second time point is determined based on a time point when it is confirmed that the first operation is completed and a time point when it is confirmed that the second operation is completed.

The performing the first operation further includes controlling the rotational speed of the first roller or the second roller included in the launcher based on the predetermined launch condition in the launch waiting period, in which the second time point is determined based on a time point when it is confirmed that the rotation speed of the first roller or the second roller satisfies the predetermined launch condition.

When it is confirmed that the operation control of the launcher based on the predetermined launch condition is completed, and it is confirmed that the zero point of the launcher is adjusted, the first alarm is output before the second time point When it is confirmed that the rotation speed of the first roller or the second roller satisfies the predetermined launch condition, a first alarm is output before the second time point.

According to another embodiment, the tennis ball supply device includes a ball storage housing having an internal space that can accommodate the ball; a launcher including a first roller and a second roller; and at least one processor, in which the at least one processor controls each of the first roller and the second roller in parallel to satisfy a first condition related to a ball launch speed and a second condition related to a ball spin type, and when it is determined that the control of the first roller is completed, and it is determined that the control of the second roller is completed, controls the ball included in the ball storage housing to move to the launcher The tennis ball supply device further includes a plurality of sensors including a first sensor and a second sensor, and the at least one processor obtains a first sensor value associated with the first roller measured through the first sensor, obtains a second sensor value related to the second roller measured through the second sensor, and determines whether the rotation speed of the first roller is normal based on the first sensor value, in which it is determined whether the rotation speed of the second roller is normal based on the second sensor value, when it is determined that the rotation speed of the first roller and the rotation speed of the second roller are normal, the ball included in the ball storage housing is controlled to move to the launcher.

The at least one processor determines whether the first roller is controlled to satisfy the first condition and the second condition based on the first sensor value and the second sensor value, and whether the second roller is controlled to satisfy the first condition and the second condition.

When the rotation speed of the first roller determined based on the first sensor value reaches a preset first reference value, it is determined that the rotation speed of the first roller is normal, and when the rotation speed of the second roller determined based on the second sensor value reaches a preset second reference value, it is determined that the rotation speed of the second roller is normal.

When it is determined that the first sensor value is constant within the allowable error range for the first time period, it is determined that the rotation speed of the first roller is normal, and when it is determined that the second sensor value is constant within the allowable error range for the second time period, it is determined that the rotation speed of the second roller is normal The at least one processor additionally control the rotation speed of the first roller so that the rotation speed of the first roller corresponds to the first reference value when the rotation speed of the first roller does not satisfy the first reference value, and additionally control the rotation speed of the second roller so that the rotation speed of the second roller corresponds to the second reference value when the rotation speed of the second roller does not satisfy the second reference value.

The first sensor and the second sensor are current sensors, in which the first sensor value is a current value related to the rotation speed of the first roller, and the second sensor value is a current value related to the rotation speed of the second roller.

The at least one processor controls the operation of the launcher at a first time point so that the ball is launched, in which the first sensor measures the first sensor value after a predetermined time has elapsed from the first time point, the second sensor measures the value of the second sensor after the predetermined time has elapsed from the first time point, and the predetermined time is a time required for the current curve to be stabilized.

When the type of the ball spin is the first spin, the speed of the first roller is controlled to be higher than the speed of the second roller, and when the type of the ball spin is the second spin, the speed of the first roller is controlled to be lower than the speed of the second roller.

A method of supplying a tennis ball includes: controlling the first roller and the second roller in parallel to satisfy a first condition related to a ball launch speed and a second condition related to a type of ball spin; obtaining a first sensor value associated with the first roller measured through a first sensor; obtaining a second sensor value associated with the second roller measured through a second sensor; determining whether the rotation speed of the first roller is normal based on the first sensor; determining whether the rotation speed of the second roller is normal based on the second sensor; and when it is determined that the rotation speed of the first roller and the rotation speed of the second roller are normal, controlling the ball included in the ball storage housing to move to the launcher.

According to another embodiment, the tennis ball supply device includes a lower plate provided to be rotatable; a launcher coupled to the lower plate; and at least one processor for controlling the lower plate and the launcher, in which the at least one processor performs a first operation of controlling the operation of the launcher so that the ball is launched, performs a second operation of adjusting the zero point of the launcher before performing the first operation, the second operation being to control the operation of the lower plate so that the launcher faces the first zero point, and when it is confirmed that the second operation is completed, controls the operation of the launcher so that the ball is launched.

The first zero point is a reference point when controlling the left and right rotation angle of the launcher based on the launch condition.

The launcher can rotate up to a first point when it rotates to the left at the maximum, and can rotate to the second point when it rotates to the right at the maximum, in which the distance between the first zero point and the first point is substantially equal to the distance between the first zero point and the second point The at least one processor performs the second operation by controlling the lower plate to rotate in the first direction until the time point detected by the first sensor, and by controlling the lower plate to rotate by a predetermined distance in the second direction when the detection of the lower plate by the first sensor is confirmed, in which the first direction and the second direction are opposite directions.

The predetermined distance is determined based on the maximum horizontal rotation angle of the launcher.

The predetermined distance corresponds to a half of the maximum horizontal rotation angle of the launcher.

The at least one processor controls the lower plate to rotate in a first direction to a reference point, and when it is confirmed that the lower plate rotates to the reference point, controls the lower plate to rotate by a predetermined distance in the second direction to perform the second operation, in which the first direction and the second direction are opposite directions.

The reference point is a point corresponding to the point when the launcher is rotated to the left or right at the maximum.

The at least one processor performs the second operation when a predetermined condition is satisfied while performing the first operation, in which the predetermined condition is a condition determined based on at least one of the number of ball launches, the operation time of the launcher, the movement of the ball, the movement of the player, and a sensor value.

The tennis ball supply device further includes a side plate provided to be rotatable, the lower plate is provided to be rotatable about the first axis, and the side plate is provided to be rotatable about the second axis, the first axis being perpendicular to the second axis, in which the at least one processor performs a third operation of adjusting a zero point of the launcher before performing the first operation, the third action being to control the action of the side plate so that the launcher faces a second zero point, and when it is confirmed that the third operation is completed, controls the operation of the launcher so that the ball is launched.

The second zero point is a reference point when controlling the vertical rotation angle of the launcher based on the launch condition.

The second zero point is determined corresponding to the lowest launch angle of the launcher.

The at least one processor performs the third operation by controlling the side plate to rotate about the second axis in a third direction until a time point detected by the second sensor.

The method of supplying a tennis ball includes: performing a first operation of controlling the operation of the launcher so that the ball is launched; performing a second operation of adjusting a zero point of the launcher before the first operation is performed; and when it is confirmed that the second operation is completed, controlling the operation of the launcher so that the ball is launched, in which the second operation is to control the operation of the lower plate so that the launcher faces the first zero point.

The step of performing the second operation includes controlling the lower plate to rotate in a first direction until a time point detected by a first sensor; and when the detection of the lower plate by the first sensor is confirmed, controlling the lower plate to rotate by a predetermined distance in the second direction; includes, in which the first direction and the second direction are opposite directions.

The step of performing the second operation includes controlling the lower plate to rotate in a first direction to a reference point; and when it is confirmed that the lower plate rotates to the reference point, controlling the lower plate to rotate by a predetermined distance in the second direction, in which the first direction and the second direction are opposite directions.

The method further includes, before performing the first operation, performing a third operation of adjusting the zero point of the launcher; and when it is confirmed that the third operation is completed, controlling the operation of the launcher so that the ball is launched, in which the third operation is to control the operation of the side plate so that the launcher faces the second zero point, the lower plate is provided to be rotatable about the first axis, and the side plate is provided to be rotatable about a second axis, the first axis being perpendicular to the second axis.

According to another embodiment, the tennis ball supply device includes a launcher; body unit; and at least one processor, in which the at least one processor is configured to: determine a point where the tennis ball supply device is located; when it is determined that the point where the tennis ball supply device is located is not a reference point, control the body unit so that the tennis ball supply device moves to the reference point, and when it is confirmed that the tennis ball supply device has moved to the reference point, control the operation of at least one of the launcher and the body unit based on a predetermined launch condition, the reference point being a point determined according to a predetermined criterion.

The at least one processor controls the body unit to move the ball supply device to a predetermined point, when it is confirmed that the tennis ball supply device has moved to the reference point.

The at least one processor controls the operation of the launcher so that the zero point of the launcher can be adjusted, when it is confirmed that the tennis ball supply device has moved to the reference point.

The launch condition relates to at least one of a ball launch speed, a ball launch angle, a ball launch direction, a ball launch interval, the number of ball launches, a type of spin, and a degree of spin.

The at least one processor determines a point where the tennis ball supply device is located based on the image captured by the tennis ball supply device.

The at least one processor obtains current spatial information based on information related to the tennis court, receives a position signal from an external communication device, and determines the point where the ball supply device is located based on the position signal and the current space information.

The information related to the tennis court is related to at least one of size, standard, area information, and line information of the tennis court.

The reference point is any lower one of a plurality of preset points on the tennis court.

The operating method of the tennis ball supply device includes determining a point where the tennis ball supply device is located; when it is determined that the point where the tennis ball supply device is located is not a reference point, controlling a body unit to move the tennis ball supply device to the reference point; and controlling the operation of at least one of the launcher and the body unit based on a predetermined launch condition when it is confirmed that the tennis ball supply device has moved to the reference point, in which the reference point is a point determined according to a predetermined criterion.

The operating method includes controlling the body unit so that the ball supply device moves to a predetermined point, when it is confirmed that the tennis ball supply device has moved to the reference point.

The operating method includes controlling the operation of the launcher so that the zero point of the launcher can be adjusted when it is confirmed that the tennis ball supply device has moved to the reference point.

The launch condition relates to at least one of a ball launch speed, a ball launch angle, a ball launch direction, a ball launch interval, the number of ball launches, a type of spin, and a degree of spin.

The step of determining the point where the tennis ball supply device is located determines the point at which the tennis ball supply device is located based on the image captured by the tennis ball supply device.

The step of determining the point where the tennis ball supply device is located includes obtaining current spatial information based on information related to the tennis court; receiving a position signal from an external communication device; and determining a point where the ball supply device is located based on the position signal and the current space information.

The information related to the tennis court is related to at least one of size, standard, area information, and line information of the tennis court.

According to another embodiment, the electronic device for controlling the operation of the ball supply device includes an external electronic device including an image capturer for photographing the tennis game situation and a controller for analyzing the game situation based on the video obtained from the image capturer; and a ball supply device that moves according to the instructions of the external electronic device and launches a ball, in which the external electronic device determines the position of the player and the position of the ball supply device using the video, predicts the drop position of the ball hit by the player using the video, calculates the ball launch position and the ball arrival position of the ball supply device in consideration of the player's position and the predicted drop position, generates a control signal indicating the calculated ball launch position and ball arrival position, and transmits the control signal to the ball supply device, in which the ball supply device receives the control signal from the external electronic device, and moves to the ball launch position according to the ball launch position indicated by the received control signal, and launches the ball to the ball arrival position according to the ball arrival position indicated by the received control signal.

The external electronic device uses the video to determine when the ball drops, extracts an image frame corresponding to the time of the drop from the video, transforms the viewpoint of the extracted image frame, and determines the drop position of the ball from the viewpoint-converted image frame.

The external electronic device detects the movement direction of the ball in the up and down direction in the video using the video, and determines a time point at which the moving direction changes from a downward direction to an upward direction as the drop time point.

The external electronic device determines whether the ball is in-out according to the determined drop position.

The external electronic device calculates the game score according to the determined in-out.

The image capturer includes a first camera for photographing one half-court and a second camera for photographing the other half-court, and the external electronic device primarily predicts the drop position using the first video obtained from the first camera and corrects the first predicted drop position using the second video obtained from the second camera.

The external electronic device receives the positions of at least two points on the tennis court from the user, and recognizes the lines of the tennis court using the received positions of the at least two points.

The external electronic device recognizes the base line and the doubles side line of the tennis court using the input positions of the at least two points, and creates at least some of the service line, center service line and singles side line from the recognized base line and doubles side line according to the specifications of the tennis court.

The external electronic device extracts pixels corresponding to the line in the video by using the input positions of the at least two points, and recognizes the line from the extracted pixels.

The external electronic device receives the self-training difficulty input from the user, and calculates the ball arrival position according to the self-training difficulty.

The external electronic device calculates the arrival position of the ball within a predetermined radius based on the position of the player, in which the predetermined radius is set to increase as the difficulty level of the self-training increases, whereby the higher the difficulty level of the self-training, the father the ball arrival position from the player is calculated.

According to another embodiment, the electronic device for controlling the operation of the ball supply device includes a touch display; and at least one processor, in which the at least one processor controls to display a first screen for determining the drop point of the ball on the touch display, control to display a second screen including an object for determining the launch condition of the ball on the touch display, determines a point at which the ball will drop based on a user input to the first screen, and determines a launch condition of the ball based on a user input to the second screen.

The at least one processor controls the object to be activated so that a user input for the object included in the second screen is obtained, when the user input to the first screen is confirmed.

The at least one processor controls to display the first screen on the touch display at an upper portion of the second screen The at least one processor controls the first screen to be displayed on the touch display, in which the first screen includes an image corresponding to the tennis court.

The at least one processor controls the first screen to be displayed on the touch display, in which the area corresponding to the first screen on the touch display includes an active area in which a user input can be obtained and an inactive area in which a user input is not obtained.

The at least one processor displays the active area and the inactive area so that they can be visually distinguished.

The first screen includes an image corresponding to the tennis court, and the active area is determined based on the image corresponding to the tennis court, in which the at least one processor is configured to generate a control signal which allows to determine a point at which the ball will drop on the tennis court based on a user input to the activation area and control the operation of the ball supply device so that the ball can be launched to the determined drop point of the ball.

The active area includes a first active area and a second active area, in which the at least one processor is configured to generate a second control signal which allows to determine a point at which the ball will drop on the tennis court based on a user input to the first activation area, determines a point at which ball launch will start based on a user input to the second activation area, generate a first control signal for controlling the operation of the ball supply device so that the ball can be launched to the determined drop point of the ball, and control the operation of the ball supply device so that the ball supply device can move to the determined ball launch start point The at least one processor controls the user input to the second activation region and the user input to the first activation region to be sequentially performed, and when it is confirmed that the user input for the second activation area is obtained, controls the user input for the first activation area to be obtained.

The first screen includes an image corresponding to the tennis court, and the active area is determined based on the image corresponding to the tennis court, in which the first active area and the second active area are areas symmetrical to each other on the image corresponding to the tennis court.

The launch condition relates to at least one of a ball launch speed, a ball launch angle, a ball launch direction, a ball launch interval, the number of ball launches, a type of spin, and a degree of spin.

The object includes a first object for determining a first launch condition and a second object for determining a second launch condition.

The at least one processor controls the user input for the first object and the user input for the second object to be sequentially performed, and when it is confirmed that the user input for the first object is obtained, controls to obtain the user input for the second object The first launch condition is a condition related to the spin of the ball, and the second launch condition is a condition related to the speed of the ball, in which the at least one processor determines a maximum value and a minimum value of the second launch condition based on the user input for the first launch condition.

The at least one processor controls the trajectory of the ball launched through the ball supply device to be displayed in real time through the first screen.

The object includes a first object for controlling the position of the ball supply device on the tennis court in real time, and the at least one processor generates a control signal enabling the position of the ball supply device to be controlled in real time based on the user input for the first object.

The method of controlling the operation of the ball supply device includes: displaying a first screen for determining a drop point of the ball on the touch display; displaying a second screen including an object for determining a launch condition of a ball on the touch display; obtaining a user input for the first screen; obtaining a user input for the second screen; determining a point at which the ball will drop based on a user input to the first screen; determining a launch condition of the ball based on a user input to the second screen; and generating a control signal for controlling the operation of the ball supply device based on the determined drop point of the ball and the launch condition of the ball.

According to another embodiment, a ball supply device includes a communication circuit configured to communicate with an external device; a launcher configured to launch a ball; a body unit configured to move the launcher; and a controller configured to: control the body unit to move to a first position, identify whether the body unit is located at the first point based on the signal received from the communication circuit, based on identifying that the body unit is located at the first position, control the launcher to launch the ball, control the body unit to move to a second position after the launcher has stopped launching the ball, and identify whether the body unit is located at the second position based on the signal received from the communication circuit.

The first point and the second point are determined based on a user input.

The controller configured to control the launcher or the body unit based on an image related to the tennis match, generate a first data related to the position of the ball based on the image, control the body unit to move to the first point or the second point determined based on the first data.

The controller configured to generate a second data related to the position of a user based on the image, determine a launch condition of the launcher based on at least one of the first data and the second data.

The launch condition is related to at least one of a ball launch angle, a type of spin and a ball launch speed.

A ball supply device further comprising a storage, wherein the controller configured to: control the launcher or the body unit based on an image related to the tennis match, obtain a first user information related to a first user at a first time point, generate a first data based on an image related to the motion of the first user, match the first data with the first user information and store the first data in the storage, obtain a second user information related to a second user at a second time point, determine a launch condition of the launcher based on the first data if it is determined that the second user information corresponds to the first user information, wherein the first time point is in the past than the second time point.

The launch condition is related to at least one of a ball launch angle, a type of spin and a ball launch speed.

The controller configured to obtain an image related to the tennis match, generate a first data related to the position of the ball based on the image, generate a second data related to the position of a user based on the image, determine a ball launch position based on the first data, wherein the ball launch position is an area on the tennis court where the ball supply device starts launching the ball, determine a ball arrival position based on the second data, wherein the ball arrival position is an area on the tennis court where the launched ball first hits the tennis court, generate a first control signal for controlling the body unit to move to the ball launch position, generate a second control signal for controlling the launcher so that the ball falls to the ball arrival position.

The second control signal is a signal for controlling at least one of a ball launch angle, a type of spin and a ball launch speed.

A method of launching a ball using a ball supply device, the method comprising controlling a body unit to move to a first point; determining whether the body unit is located at the first point based on the signal received from a communication circuit; controlling a launcher to launch the ball if it is determined that the body unit is located at the first point; controlling the body unit to move to a second point after the launcher has stopped launching the ball; and determining whether the body unit is located at the second point based on the signal received from the communication circuit.

The first point and the second point are determined based on a user input.

A method of launching a ball using a ball supply device further comprising controlling the launcher or the body unit based on an image related to the tennis match; generating a first data related to the position of the ball based on the image; and controlling the body unit to move to the first point or the second point determined based on the first data.

A method of launching a ball using a ball supply device further comprising generating a second data related to the position of a user based on the image; and determining a launch condition of the launcher based on at least one of the first data and the second data.

A method of launching a ball using a ball supply device further comprising controlling the launcher or the body unit based on an image related to the tennis match, wherein the controlling the launcher or the body unit further comprises obtaining a first user information related to a first user at a first time point; generating a first data based on an image related to the motion of the first user; and matching the first data with the first user information and storing the first data in the storage; obtaining a second user information related to a second user at a second time point; and determining a launch condition of the launcher based on the first data if it is determined that the second user information corresponds to the first user information, wherein the first time point is in the past than the second time point.

A method of launching a ball using a ball supply device further comprising controlling the launcher or the body unit based on an image related to the tennis match, wherein the controlling the launcher or the body unit further comprises: generating a first data related to the position of the ball based on the image; generating a second data related to the position of a user based on the image; determining a ball launch position based on the first data, wherein the ball launch position is an area on the tennis court where the ball supply device starts launching the ball; determining a ball arrival position based on the second data, wherein the ball arrival position is an area on the tennis court where the launched ball first hits the tennis court; generating a first control signal for controlling the body unit to move to the ball launch position; and generating a second control signal for controlling the launcher so that the ball falls to the ball arrival position.

Hereinafter, it will be described with respect to the tennis self-training system according to an embodiment referring to the drawings.

1 Tennis Self-Training System

Figure 2:
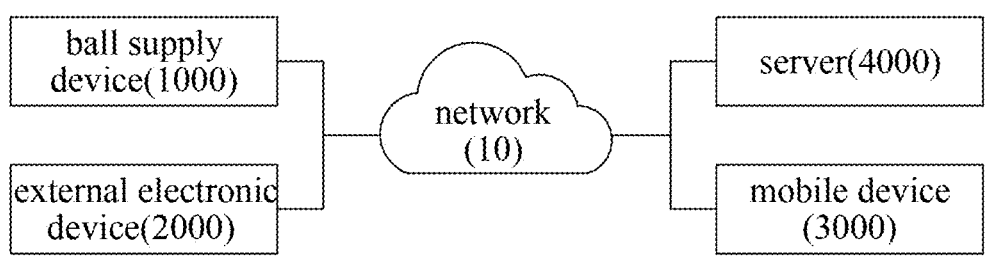

FIGS. 1 and 2 are diagrams for illustrating a tennis self-training system according to an embodiment.

Referring to FIG. 1, the tennis self-training system according to an embodiment may be configured so that the tennis ball supply device 1000 automatically launches practice balls for a player according to a predetermined operation method so that the player may practice tennis alone without any opponent.

The tennis self-training system according to another embodiment may calculate the game score through the in-out determination of the ball hit by the player, and provide an analysis result for the content of the game based on results obtained by capturing the motions of the player and the ball.

More specifically, since the movement of the player is converted into video data (image or video) and movement pattern and posture of the player are identified from the image data through a vision recognition algorithm, the player may be provided with training program customized for the player's athletic ability and a solution for posture correction. Accordingly, the player can enjoy tennis without restrictions, as well as develop his/her athletic skills alone without the direct help of a professional coach. Furthermore, when the professional coach utilizes the tennis self-training system according to an embodiment of the present invention, the player may receive more effective coaching from the coach.

Referring to FIG. 2, the tennis self-training system may include a ball supply device 1000, an external electronic device 2000, a mobile device 3000, and a server 4000, which are communicatively connected through the network 10.

According to an embodiment, the tennis self-training method may be performed by the ball supply device 1000. For example, the tennis self-training method may be performed in such a manner that the ball supply device 1000 launches balls for the player according to a predetermined operation method.

For example, a user may input a desired training mode or training program to the ball supply device 1000, and the ball supply device 1000 may supply a ball for the player according to a predetermined operation method based on the user input. Here, the predetermined operation method may be an operation method set in relation to the number of balls launched for the player, the speed of the ball, the spin of the ball, the drop point of the ball, and the like. Specific details regarding the predetermined operation method will be described later.

As another example, the ball supply device 1000 may acquire image data obtained by capturing the player and/or the ball using a built-in capturing device, determine a training program customized for athletic ability of the player based on the same, and provide the player with balls according to the determined training program.

In addition, the ball supply device 1000 may capture the player and/or the ball using a built-in capturing device to obtain image data, and provide the player with a match result or an analysis result for the match content on the basis of the same.

According to another embodiment, the tennis self-training method may be performed by the ball supply device 1000 and the external electronic device 2000. For example, the tennis self-training method determines the operation method of the ball supply device 1000 based on predetermined data generated by the external electronic device 2000, and the ball supply device 1000 may supply a ball to the player according to the determined operation method.

For example, the external electronic device 2000 may acquire image data obtained by capturing the player and/or the ball using a built-in capturing device, determine a training program optimized for athletic ability of the player based on the same, and control the ball supply device 1000 to supply the ball according to the determined training program.

In addition, the external electronic device 2000 may acquire image data obtained by capturing the player and/or the ball using a built-capturing device, and generate and provide a match result or an analysis result for the match content on the basis of the same.

According to another embodiment, the tennis self-training method may be performed by the ball supply device 1000, the external electronic device 2000, and the mobile device 3000. For example, the tennis self-training method may be performed in such a manner that the operation method or the type of training program of the ball supply device 1000 may be determined based on the user response that is input to the mobile device 3000, and the ball supply device 1000 and/or the external electronic device 2000 are controlled according to the determined operation method or training program.

Herein, the mobile device 3000 is provided with a user interface for selecting or setting an operation method of the ball supply device or a training program, and a detailed description thereof will be provided later.

According to another embodiment, the tennis self-training method may be performed by the ball supply device 1000, the external electronic device 2000, the mobile device 3000, and the server 4000. For example, the tennis self-training method may be performed based on data previously stored in the server 4000.

For example, the server 4000 may obtain and store information about the player in advance through the training data of the player in the past, and subsequently, when the player tries to conduct training again, determine the operation method of the ball supply device 1000 or the type of training program based on the previously stored information, and then allow the ball supply device 1000 and/or the external electronic device 2000 to be controlled according to the determined operation method or training program.

Hereinafter, each of a ball supply device 1000, an external electronic device 2000, a mobile device 3000, and server 4000 in the tennis self-training system will be described.

2 Ball Supply Device 1000

Figure 3:
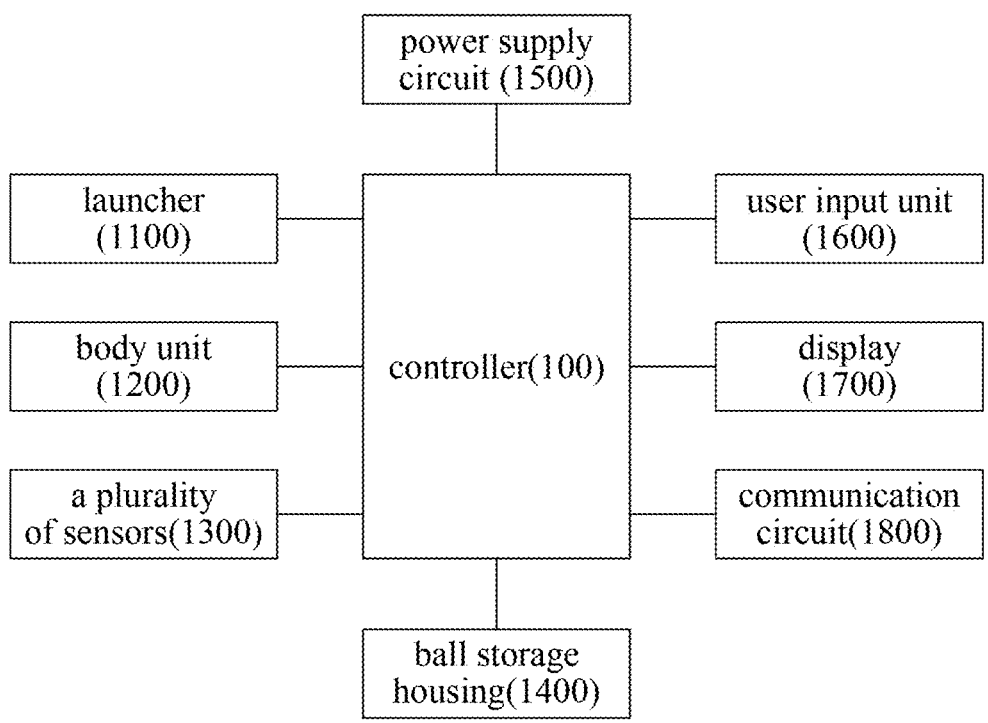
FIG. 3 is an exemplary view illustrating the structure of the ball supply device 1000.

2.1 Structure of Ball Supply Device 2.1.1 General Components of Ball Supply Device FIG. 3 is an exemplary diagram illustrating the structure of the ball supply device 1000. Referring to FIG. 3, the ball supply device 1000 includes a launcher 1100, a body unit 1200, a plurality of sensors 1300, a ball storage housing 1400, a power supply circuit 1500, a user input unit 1600, an display 1700, and a communication circuit 1800.

According to an embodiment, the ball supply device 1000 may not include the body unit 1200. As such, when the ball supply device 1000 does not include the body unit 1200, the tennis self-training method may be performed in a state in which the ball supply device 1000 is fixed at a certain point within the tennis court.

According to another embodiment, the ball supply device 1000 may include a body unit 1200. When the ball supply device 1000 includes the body unit 1200, the ball supply device 1000 may be combined with an autonomous driving system, and thus the ball supply device 1000 may supply balls to the player while moving in real time according to a predetermined method.

The launcher 1100 performs a function of allowing the tennis balls to be launched to the outside of the ball supply device 1000; the body unit 1200 performs a function of moving the ball supply device 1000 to another point; the plurality of sensors 1300 performs a function of assisting the ball to be launched according to a predetermined standard; and the ball storage housing 1400 performs a function to store a plurality of tennis balls. A detailed description of each configuration will be described later with reference to the drawings.

The power supply circuit 1500 includes a battery, and the battery may be embedded in the ball supply device 1000 or may be provided detachably from the outside. The power supply circuit 1500 may supply power needed from each component of the ball supply device 1000.

The user input unit 1600 may receive a user input for the ball supply device 1000. The received input may be transmitted to the controller 100. According to an embodiment, the user input unit 1600 may receive a user input through a touch display. Also, the user input unit 1600 may refer to a user interface screen on which a command is input from a user.

The display 1700 outputs a variety of information according to a control command of the controller 100. According to an embodiment, the display 1700 may output information through a display panel. More specifically, the display 1700 may output information related to tennis self-training through the display panel. However, the display 1700 is not limited to a display panel, and may include various means capable of outputting information, such as a speaker.

The communication circuit 1800 may include a wireless communication module and/or a wired communication module. Here, the wireless communication module may include a Wi-Fi communication module, a cellular communication module, and the like.

2.1.2 Launcher 2.1.2.1 General Structure of Launcher

Figure 4:
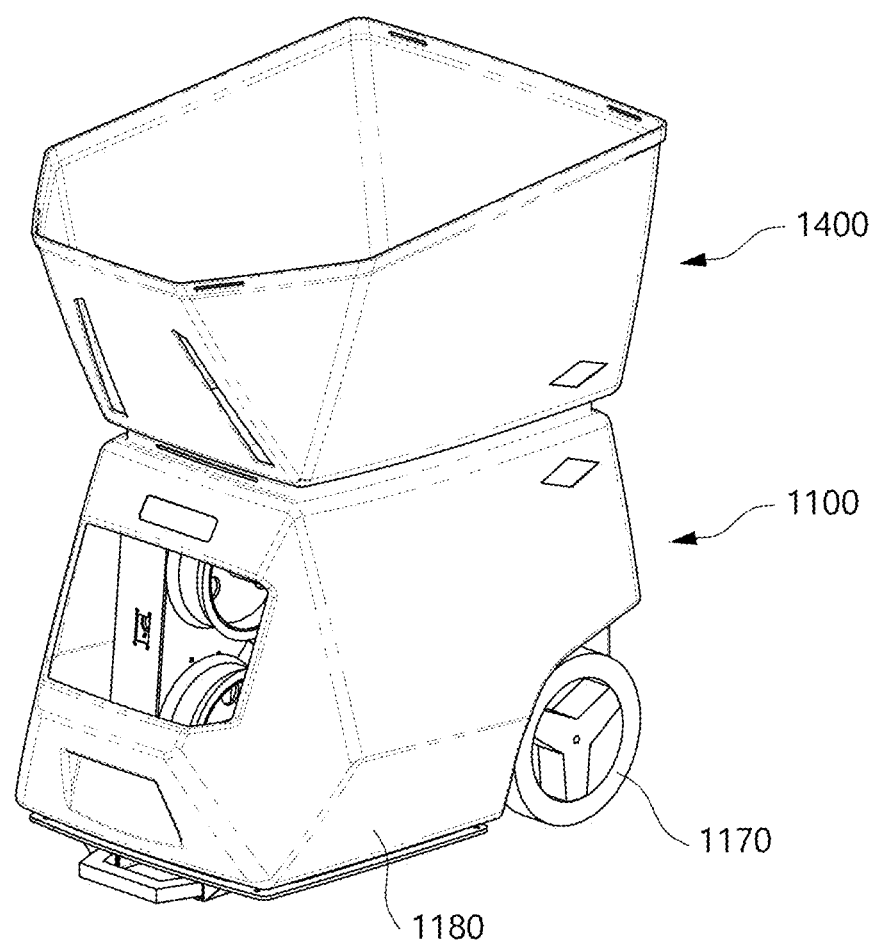
FIG. 4 is an exemplary view illustrating the launcher and the ball storage housing of the ball supply device.

FIG. 4 is an exemplary diagram for illustrating the launcher and the ball storage housing in the ball supply device. Referring to FIG. 4, the ball storage housing 1400 may be coupled detachably from the upper side of the launcher 1100.

The ball storage housing 1400 may accommodate a plurality of tennis balls therein. The shape of the ball storage housing 1400 is not limited to the shape shown in FIG. 4, but may have various shapes capable of accommodating a tennis ball.

The ball storage housing 1400 may perform a function of storing the tennis balls before the tennis balls are launched to the outside of the ball supply device 1000 through the launcher 1100.

The ball storage housing 1400 may have at least one or more openings, and thus sequentially deliver the plurality of tennis balls stored therein to the launcher 1100 through the opening based on the control signal. Herein, the opening may be formed in such a manner as to correspond to the size and shape of the tennis ball.

Here, since a method to allow the tennis balls stored in the ball storage housing 1400 to move to the launcher 1100 and a structure of the ball storage housing 1400 for performing the method correspond to a known method and a known structure, respectively, detailed descriptions thereof will be omitted.

The launcher 1100 may be coupled directly or indirectly to the ball storage housing 1400, and may perform a function of launching the balls provided from the ball storage housing 1400 to the outside of the ball supply device 1000. Here, the launcher 1100 and the ball storage housing 1400 may be coupled to each other in a detachable manner.

Figure 5:
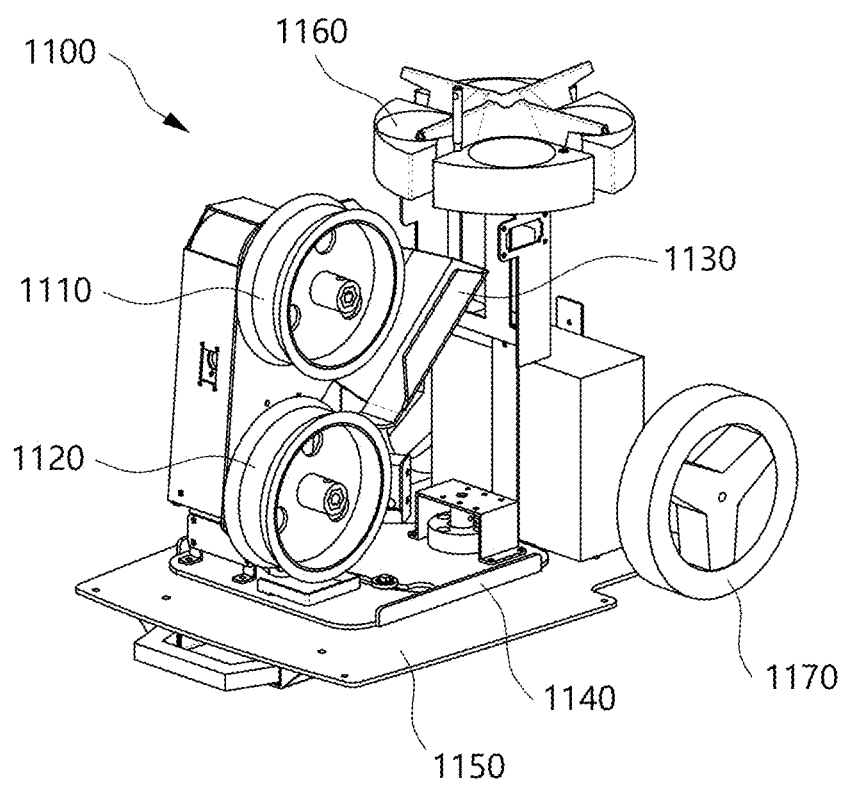
FIG. 5 is an exemplary view illustrating the internal structure of the launcher 1100.

FIG. 5 is an exemplary view illustrating an internal structure of the launcher 1100. Referring to FIG. 5, the launcher 1100 includes a first roller 1110, a second roller 1120, a ball guide 1130, a first lower plate 1140, a second lower plate 1150, a ball falling part 1160, and a driving unit 1170.

The controller 100 may control operations of the first roller 1110 and the second roller 1120. The controller 100 may individually control speeds of the first roller 1110 and the second roller 1120. The first roller 1110 and the second roller 1120 may rotate at a predetermined speed under the control of the controller 100. When the ball is entered into the first roller 1110 and the second roller 1120 through the ball guide 1130, the ball may be launched to the outside of the ball supply device 1000. A specific method for the controller 100 to control the first roller 1110 and the second roller 1120 will be described later.

The controller 100 may control the ball falling part 1160 so that any one of a plurality of tennis balls included in the ball storage housing 1400 falls into the launcher 1100. For example, the controller 100 may cause the ball falling part 1160 to rotate at a predetermined speed and/or time interval, so that any one of the plurality of tennis balls included in the ball storage housing 1400 may fall into the launcher 1100.

2.1.2.2 Left and Right Rotation Inside Housing

The controller 100 may perform control so that the first lower plate 1140 rotates to the left and right, in which the left and right direction in which the ball is launched may be determined according to the rotation of the first lower plate 1140.

More specifically, a first roller 1110 and a second roller 1120 may be directly or indirectly coupled to the first lower plate 1140. Accordingly, when the first lower plate 1140 rotates to the left or right according to the control signal from the controller 100, the first roller 1110 and the second roller 1120 may also rotate to the left or right correspondingly.

When the ball is launched in a state that the first lower plate 1140 rotates to the left, the ball may be launched to the left of the ball supply device 1000 as much as the first lower plate 1140 rotates to the left, and when the ball is launched in a state that the first lower plate 1140 rotates to the right, the ball may be launched to the right of the ball supply device 1000 as much as the first lower plate 1140 rotates to the right.

When the existing tennis ball supply device launches the ball to the left or right, the outer housing surrounding the launcher has been designed to rotate together with the launcher. For example, when the ball supply device attempts to launch a ball to the left, the ball has been launched in a state that the outer housing rotates to the left together with the ball supply device, and when the ball supply device attempts to launch a ball to the right, the ball has been launched in a state that the outer housing rotates to the right together with the ball supply device.

When the ball is launched while the outer housing rotates together, the player was able to predict the ball supply direction or the ball falling position in advance, which results that there was a problem of decreasing the tension in the practice. In addition, when conducting training in this manner, there was a limitation in that it was difficult to create a practice situation for an unexpected situation.

In order to overcome the limitations of the existing tennis ball supply device described above, the ball supply device according to an embodiment is configured so that the launcher 1100 launches the balls while rotating to the left and right in a state that the outer housing 1180 is fixed. As a result, the player may conduct training for a ball flying from an unexpected direction, whereby there is an effect of increasing the tension in the practice and improving the concentration of the training.

Referring FIGS. 4 and 5, the controller 100 may launch balls at various angles by controlling only the first lower plate 1140 to be rotated in the left or right direction, in a state that the housing 1180 of the ball supply device 1000 is maintained in a fixed state.

For example, when the controller 100 controls the launcher 1100 so that the ball is launched in the first direction, the controller may perform control so that the first lower plate 1140 rotates to the left by an angle corresponding to the first direction and then the ball is launched to the outside. Here, the housing 1180 may be fixed without being rotated.

More specifically, when the controller 100 controls the launcher 1100 so that the ball is launched in the first direction, the controller may perform control so that the first lower plate 1140 rotates to the left by an angle corresponding to the first direction and then any one of the tennis balls included in the ball storage housing 1400 moves to the ball guide 1130. Here, the balls that move to the ball guide 1130 may be launched to the outside through the first roller 1110 and the second roller 1120.

Figure 6:
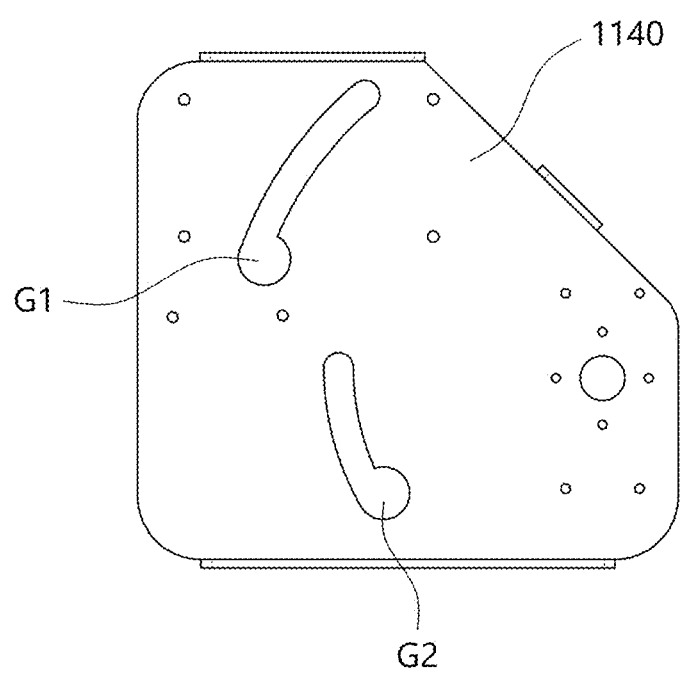
FIG. 6 is an exemplary view illustrating the shape and coupling structure of the first lower plate.

FIG. 6 is an exemplary view illustrating the shape and coupling structure of the first lower plate. Referring to FIG. 6, the first lower plate 1140 may have at least one guide groove formed.

The guide groove may be formed in an arc shape as shown in FIG. 6, but is not limited thereto. The guide groove may be formed in a shape that enables the first lower plate 1140 to be coupled rotatably on the second lower plate 1150.

According to an embodiment, since the first lower plate 1140 may include a first guide groove G1, the first lower plate 1140 may be indirectly coupled to the second lower plate 1150 through the first guide groove G1.

More specifically, one or more protruding members may be formed on the second lower plate 1150, and the protruding members may be formed in such a manner as to correspond to the guide grooves included in the first lower plate 1140. For example, the protruding member may be formed at a position, on the second lower plate 1150, which corresponds to the guide groove included in the first lower plate 1140, in such a manner as to have a number corresponding to the number of the guide grooves, and a shape corresponding to the shape of the guide grooves.

The first lower plate 1140 may be rotatably fastened to the protruding member formed on the second lower plate 1150 through the first guide groove G1, thereby causing the first lower plate 1140 and the second lower plate 1150 to be indirectly coupled each other.

The first lower plate 1140 is rotatably fastened to the protruding member formed on the second lower plate 1150 through the first guide groove G1, whereby only the first lower plate 1140 rotates to the left and right in the housing 1180 with the second lower plate 1150 being fixed.

The first lower plate 1140 may not be directly coupled to the housing 1180, but may be indirectly coupled to the housing 1180. Accordingly, even when the first lower plate 1140 rotates to the left or right, the housing 1180 may not rotate while being fixed.

For example, the second lower plate 1150 may be directly coupled to the housing 1180. Herein, the first lower plate 1140 may be indirectly coupled to the housing 1180 through the second lower plate 1150.

According to another embodiment, the first lower plate 1140 may include a plurality of guide grooves (e.g., a first guide groove G1 and a second guide groove G2). Herein, the first lower plate 1140 may be indirectly coupled to the second lower plate 1150 through the first guide groove G1 and the second guide groove G2.

For example, when the first lower plate 1140 is provided with a first guide groove G1 and a second guide groove G2, the second lower plate 1150 may also be provided with two protruding members at two positions corresponding to the guide grooves, respectively. Herein, the first lower plate 1140 may be rotatably coupled to the protruding member formed in the second lower plate 1150 through the first guide groove G1 and the second guide groove G2.

Meanwhile, as described above, since the housing 1180 is not directly coupled to the first lower plate 1140 but directly coupled only to the second lower plate 1150, the housing 1180 and the second lower plate 1150 may maintain a fixed state even when the first lower plate 1140 rotates to the left and right.

Accordingly, the ball supply device 1000 may launch the ball in various desired directions, such as left or right, through rotation of the first lower plate 1140 in a state in which the housing 1180 is fixed.

Figure 7:
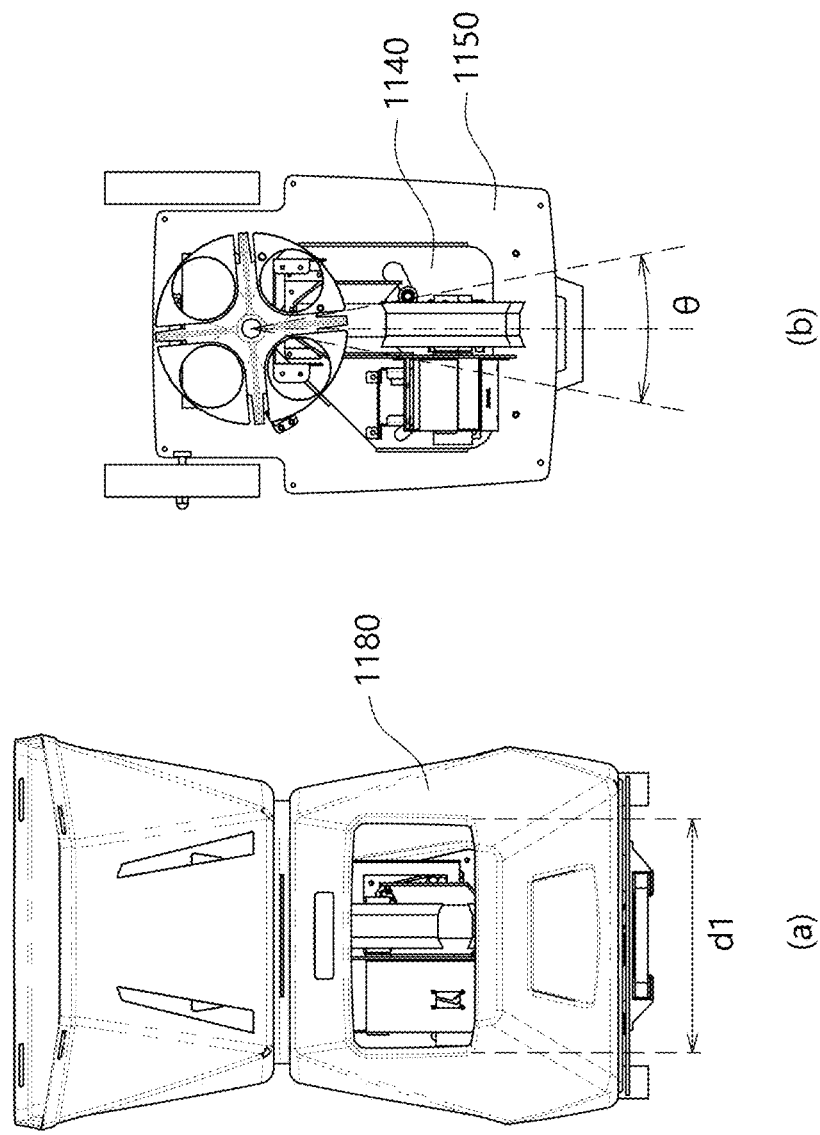
FIG. 7 is an exemplary view illustrating an opening formed in a housing.

FIG. 7 is an exemplary view illustrating an opening formed in the housing. Referring to FIG. 7, the housing 1180 according to an embodiment may have an opening formed therein. Here, the opening formed in the housing 1180 serves as a moving passage that allows the ball launched by the launcher 1100 to go out of the ball supply device 1000, and the shape, shape, and the like of the opening may be formed in various ways.

Since the ball supply device 1000 launches the ball to the outside while rotating only the launcher 1100 inside the housing 1180 in a state that the housing 1180 is fixed, the width of the opening formed in the housing 1180 needs to be formed in such a manner as to correspond to the rotation angle of the launcher 1100.

The opening formed in the housing 1180 according to an embodiment may be formed in a shape corresponding to the maximum rotation angle of the first lower plate 1140. The opening formed in the housing 1180 may be formed in a shape corresponding to the maximum rotation angle of the launcher 1100.

Referring to (a) of FIG. 7, the horizontal width d1 of the opening formed in the housing 1180 may be formed according to a predetermined criterion. For example, referring to (b) of FIG. 7, the maximum angle at which the launcher 1100 or the first lower plate 1140 may rotate to the left and right is determined. Herein, the horizontal width d1 of the opening may be defined to correspond to the maximum angel at which the launcher 1100 rotates to the left and right.

For example, when the maximum angle at which the launcher 1100 or the first lower plate 1140 may rotate to the left and right is 30 degrees in (b) of FIG. 7, the width d1 of the opening in the housing 1180 may be defined in such a manner as to correspond to 30 degrees in (a) of FIG. 7.

Since the opening of the housing 1180 needs to be defined in such a manner as to correspond to the maximum left and right rotation angle of the launcher 1100 or the first lower plate 1140, the shape of the opening may be restricted. For example, as compared to an existing ball supply device that rotates the housing itself to launch a ball, the ball supply device 1000 according to an embodiment may have a limited maximum ball launch angle. Herein, the ball supply device 1000 is coupled to the body unit so that the ball may be launched in a movable state, whereby it is possible to overcome the limitation in the maximum ball launch angle. A detailed description of the body unit will be described later.

Figure 8:
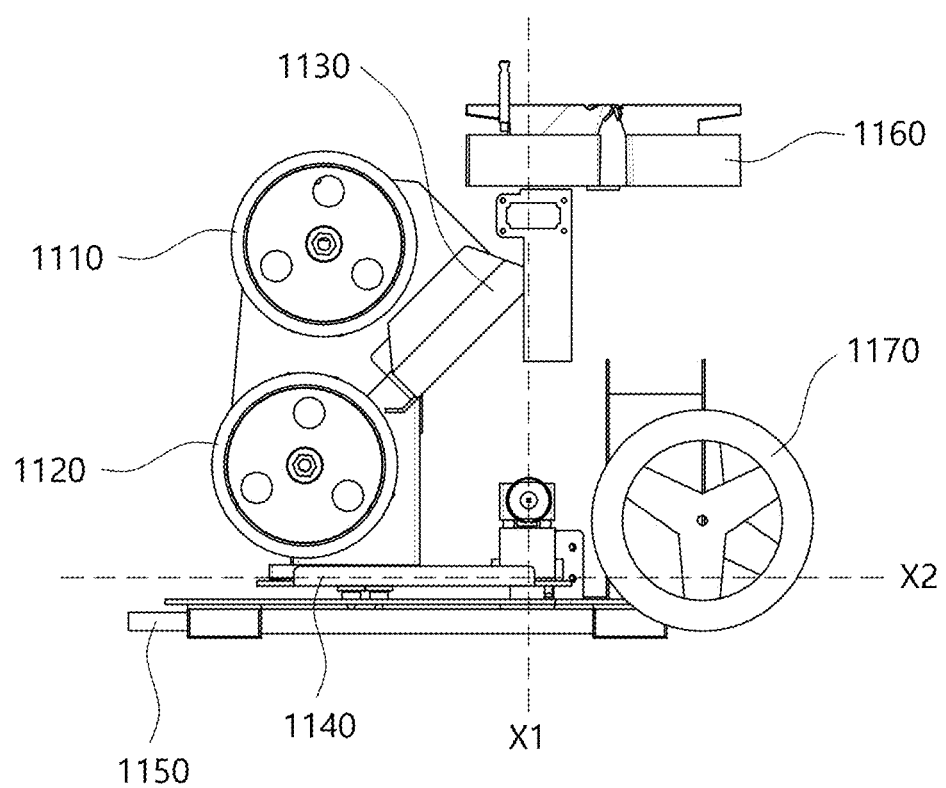
FIG. 8 is an exemplary view illustrating an axis on which each component of the launcher is disposed.

FIG. 8 is an exemplary view illustrating an axis on which each component of the launcher is disposed.

Referring to FIG. 8, a left and right rotation axis X1 of the launcher 1100 may be the same as the direction in which the ball moves from the ball storage housing 1400 to the launcher 1100. The ball included in the ball storage housing 1400 may move to the launcher 1100 along the left and right rotation axis X1 of the launcher 1100.

The ball included in the ball storage housing 1400 may move to the launcher 1100 along the left and right rotation axis X1 of the launcher 1100. The ball included in the ball storage housing 1400 not only moves to the launcher 1100 in the direction corresponding to the left and right rotation axis X1 of the launcher 1100, but also moves to the launcher 1100 along the left and right rotation axis X1 of the launcher 1100.

The point where the ball included in the ball storage housing 1400 contacts the ball guide 1130 of the launcher 1100 for the first time may be defined on the left and right rotation axis X1 of the launcher 1100. The ball included in the ball storage housing 1400 may fall on the left and right rotation axis X1 of the launcher 1100 toward the launcher 1100, in which the point where the falling ball meets the ball guide 1130 for the first time may be defined on the left and right rotation axis X1 of the launcher 1100.

The left and right rotation axis X1 of the launcher 1100 may be an axis perpendicular to the first lower plate 1140 or the second lower plate 1150. That is, the ball included in the ball storage housing 1400 may fall in a direction perpendicular to the first lower plate 1140 or the second lower plate 1150, in which the falling ball may meet the ball guide 1130 for the first time on the left and right rotation axis X1 of the launcher 1100.

2.1.3 Body Unit

Figure 9:
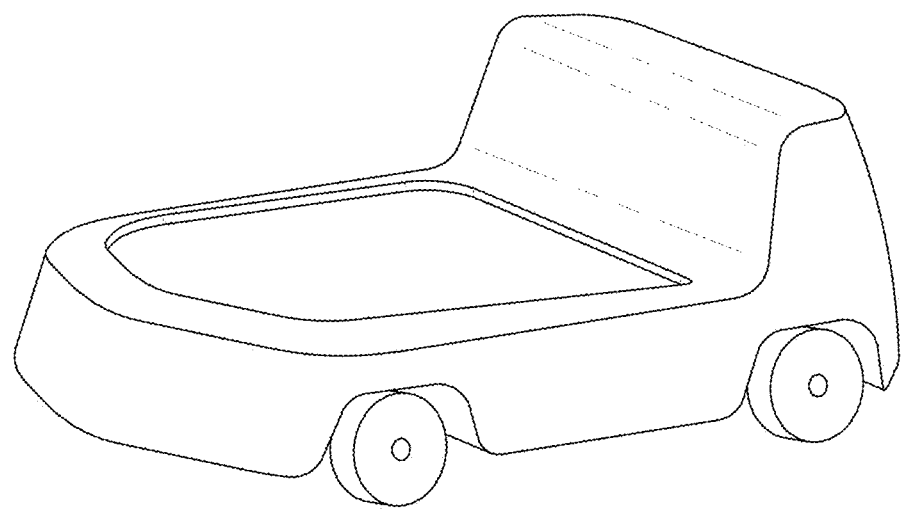
FIG. 9 is an exemplary view illustrating the shape of the body unit of the ball supply device according to an embodiment.

FIG. 9 is an exemplary view illustrating the shape of the body unit of the ball supply device according to an embodiment. Referring to FIG. 9, the body unit 1200 may perform a function of moving the launcher 1100. When the launcher 1100 receives information about the position from the mobile device 3000 or the external electronic device 2000, the launcher 1100 may drive the body unit 1200 to move to the corresponding position.

The body unit 1200 may include a swerve driving system or a mecanum wheel. The swerve driving system may operate in a driving manner in which a steering device is provided on each wheel included in the body unit 1200, more specifically, in a driving method in which each wheel changes direction as it rotates.

However, the driving method of the body unit 1200 is not limited to the swerve driving system or mecanum wheel described above, but various known methods suitable for efficiently moving the launcher 1100 on a tennis court may be applied to the drive system.

According to an embodiment, the body unit 1200 may include a plurality of rollers. For example, the body unit 1200 may include two driving rollers. When the body unit 1200 may operate on a tennis court, the body unit may be moved efficiently only with two driven rollers, since the tennis court generally does not have uneven floors.

The material of the roller included in the body unit 1200 may be, for example, a polyurethane material, but is not limited thereto. The material may be a material that does not damage the tennis court, and a material similar to that of general tennis shoes.

2.2 Sensor Included in Ball Supply Device 2.2.1 General Sensor

A tennis ball machine including a sensor performing various functions has not been common in the related art. Accordingly, in many cases, the tennis ball machine simply performs only a function of launching the ball in the related art, there is a limitation in that it is difficult to perform a function of checking whether the ball is dropping to the correct position, how much the ball is being launched, whether the speed of the roller that causes the ball to be launched is constant, or whether the ball is moving at a desired speed, etc.

The ball supply device 1000 according to an embodiment may include a plurality of sensors 1300 that is capable of performing various functions in order to overcome the above-described limitation. The plurality of sensors may include various known types of sensors that is capable of assisting the operation of the ball supply device 1000. The launcher 1100 and the body unit 1200 may include various known types of sensors capable of assisting their operation.

Figure 10:
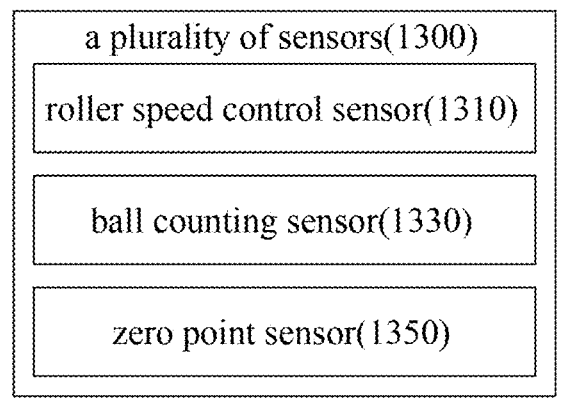
FIG. 10 is an exemplary view illustrating the type of sensor included in the ball supply device according to an embodiment.

2.2.2 Roller Speed Control Sensor 2.2.2.1 Types and Functions of Roller Speed Control Sensors FIG. 10 is an exemplary view illustrating the type of sensor included in the ball supply device according to an embodiment. Referring to FIG. 10, the ball supply device 1000 may include a plurality of sensors. For example, the ball supply device 1000 may include a roller speed control sensor 1310, a ball counting sensor 1330, and a zero point sensor 1350.

The existing tennis ball machines have been not often equipped with a separate device for determining whether the speed of the rollers is constantly operating. When the tennis ball machine operates continuously for more than a certain period of time, the roller speed may operate inconsistently, whereby there are problems that the launch speed of the ball may be different from the predetermined speed and the drop point of the ball may not be constant. Furthermore, when the roller speed is not precisely controlled, there is a problem that the spin direction and type of the ball may not be precisely controlled.

To solve the above problems, the ball supply device 1000 according to an embodiment may include a roller speed control sensor 1310 to determine whether a plurality of roller speeds included in the ball supply device 1000 are operating at a predetermined value.

The roller speed control sensor 1310 may be a sensor used to control the speed of a plurality of rollers included in the launcher 1100. The roller speed control sensor 1310 may be a sensor used to control the speeds of the first roller 1110 and the second roller 1120.

According to an embodiment, the roller speed control sensor 1310 may be a current sensor. A current value flowing through the roller may be obtained through the roller speed control sensor 1310, and the controller 100 may control the rotation speed of the roller based on the obtained current value.

When controlling the rotation speed of the roller based on the current value obtained through the roller speed control sensor 1310, the obtained current value may be a current value obtained as a predetermined time elapses after the roller is driven.

The controller 100 may control the rotation speed of the roller based on a current value measured by the roller speed control sensor 1310, at a second time point when a predetermined time has elapsed from the first time point when the roller starts to be driven.

A starting current may be generated from the first time point when the roller starts to be driven until the roller reaches the maximum speed. Since the current value measured before and after the starting current occurs may not be suitable for determining the speed of the roller, the controller 100 obtains a current value from the roller speed control sensor 1310 and controls the rotation speed of the roller through the obtained current value, at the time point when a current curve is stabilized after the starting current occurs.

For example, the value of the current flowing through the first roller 1110 and/or the second roller 1120 may be obtained through the roller speed control sensor 1310, and the controller 100 may determine whether the speed of the first roller 1110 and/or the second roller 1120 is constant based on the obtained current value.

The controller 100 may obtain a first current value flowing through the first roller 1110 from the roller speed control sensor 1310, and determine whether the rotation speed of the first roller 1110 is constant based on a change amount of the obtained first current value.

The controller 100 may obtain a first current value measured by the roller speed control sensor 1310 (in this case, the first current value is a current value flowing through the first roller 1110), and determine whether the rotation speed of the first roller 1110 is constant based on the change amount in the first current value for a predetermined time.

The controller 100 may obtain a second current value measured by the roller speed control sensor 1310 (in this case, the second current value is a current value flowing through the second roller 1120), and determine whether the rotation speed of the second roller 1120 is constant based on a change amount in the second current value for a predetermined time.

The time period in which the controller 100 determines the change amount of the first current value and the time period in which the change amount in the second current value is determined may be the same to or different from each other. The controller 100 may determine whether the rotational speed of the first roller 1110 and the second roller 1120 is constant based on the change amount of the first current value and the change amount of the second current value which are determined in the first time period. In addition, the controller 100 may determine whether the rotational speed of the first roller 1110 is constant based on the change amount in the first current value determined in the first time period, and determine whether the rotation speed of the second roller 1120 is constant based on the change amount in the second current value determined in the second time period.

The controller 100 may determine whether the rotation speed of the roller is constant based on whether the current value measured by the roller speed control sensor 1310 for the first time period falls within a predetermined range. For example, the controller 100 may determine that the rotation speed of the roller is not constant when the current value is out of the predetermined range during the first time period. In addition, the controller 100 may determine that the rotational speed of the roller is constant when the current value is not out of the predetermined range during the first time period.

The controller 100 may determine whether the rotational speed of the roller is constant based on whether the average of the current values measured from the roller speed control sensor 1310 for the first time period falls within a predetermined range. For example, the controller 100 may determine that the rotational speed of the roller is not constant when the average of the current values measured during the first time period is out of the predetermined range. In addition, the controller 100 may determine that the rotational speed of the roller is constant when the average of the current values measured during the first time period is within the predetermined range.

As another example, a current value flowing in the first roller 1110 and/or the second roller 1120 may be obtained through the roller speed control sensor 1310, and the controller 100 may determine the speed value of the first roller 1110 and/or the second roller 1120 based on the obtained current value.

The controller 100 may obtain a first current value flowing through the first roller 1110 from the roller speed control sensor 1310, and determine the rotation speed of the first roller 1110 based on the obtained first current value. The controller 100 may obtain a second current value flowing through the second roller 1120 from the roller speed control sensor 1310, and determine the rotation speed of the second roller 1120 based on the obtained second current value.

The controller 100 may obtain a first current value flowing through the first roller 1110 from the roller speed control sensor 1310 and determine the rotation speed of the first roller 1110 in consideration of the correlation between the current value and the rotational speed of the roller. The controller 100 may obtain a second current value flowing through the second roller 1120 from the roller speed control sensor 1310 and determine the rotation speed of the second roller 1120 in consideration of the correlation between and the current value and the rotational speed of the roller.

According to another embodiment, the roller speed control sensor 1310 may be a sensor capable of measuring the number of rotations of the roller. When the roller speed control sensor 1310 is a sensor capable of measuring the number of rotations of the roller, the controller 100 may determine whether the rotational speed of the roller is constant and/or what the rotational speed of the roller is, based on the number of rotations of the roller, which is obtained through the roller speed control sensor 1310.

2.2.2.2 Number of Roller Speed Control Sensors and Parallel Control

In order for users to effectively conduct tennis training, it is necessary to control the speed of the ball supplied by the ball supply device 1000 as desired, and adjust the type or degree of spin of the ball as desired.

The ball supply device 1000 according to an embodiment may supply a ball at a speed desired by the user, and may supply a ball with spin desired by the user, and the controller 100 included in the ball supply device 1000 may control the first roller 1110 and the second roller 1120 independently (or in parallel), whereby it is possible to control the speed of the ball, the direction of the spin, and the degree of spin.

The controller 100 may be configured so that the number of roller speed control sensors 1310 according to an embodiment may correspond to the number of rollers provided in the launcher 1100, in order to independently control the first roller 1110 and the second roller 1120. Herein, the roller speed control sensor 1310 may measure a current value for each of the rollers provided in the launcher 1100, in parallel.

When the launcher 1100 includes a first roller 1110 and a second roller 1120, the plurality of sensors 1300 may include two roller speed control sensors (a first sensor and a second sensor). Herein, the first sensor measures the current value of the first roller 1110, and the second sensor may measure a current value of the second roller 1120.

2.2.2.3 Roller Speed Control Method According to First Embodiment

Figure 11:
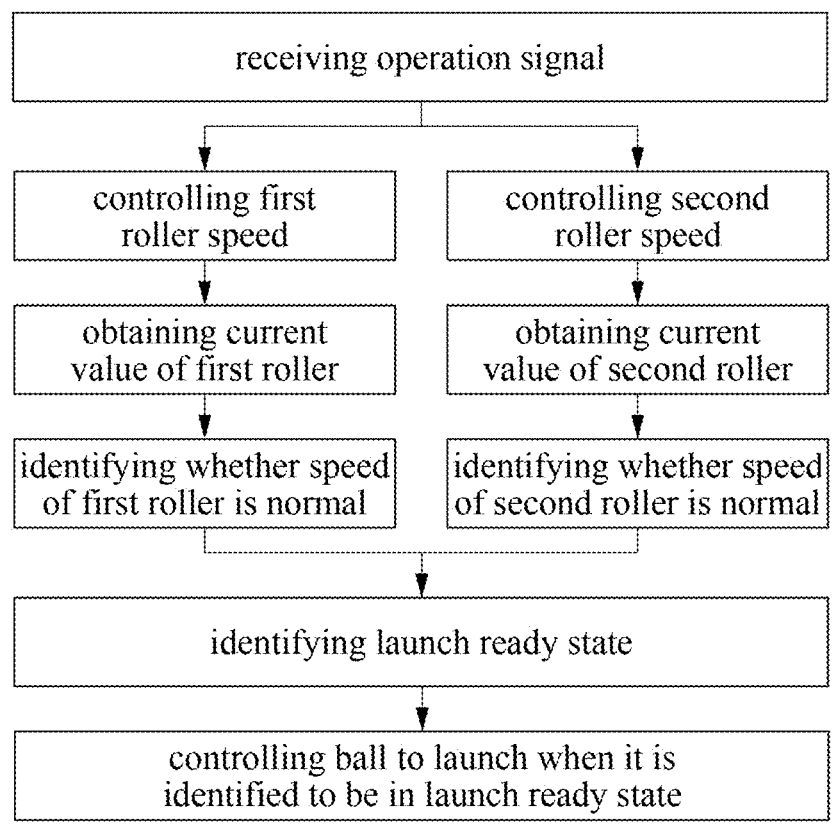
FIG. 11 is an exemplary view illustrating how the controller determines whether the roller speed is in normal before the ball supply device launches a ball.

FIG. 11 is an exemplary view illustrating how the controller determines whether the roller speed is in normal before the ball supply device launches a ball.

Referring to FIG. 11, the controller 100 according to an embodiment may receive an operation signal from the mobile device 3000 or the external electronic device 2000. The operation signal may be an operation signal instructing launcher 1100 to start control.

The controller 100 may control the operations of the first roller 1110 and the second roller 1120 included in the launcher 1100 after receiving the operation signal. More specifically, after receiving the operation signal, the controller 100 may perform control so that the first roller 1110 operates at a first predetermined speed, and the second roller 1110 operates at a second predetermined speed.

The first speed and the second speed may be values predetermined by the user, and the launch speed of the ball and/or a spin of the launched ball may be determined according to the first speed and the second speed.

For example, the higher the value of the first speed and/or the second speed, the higher the speed at which the ball is launched, and the lower the first velocity and/or the second velocity, the lower the velocity at which the ball is launched.

In addition, the type of spin of the ball may vary, and the degree of spin of the ball may vary, according to a difference between the first speed and/or the second speed. For example, when the first speed and the second speed are the same, the ball may be launched without spin, and when there is a difference between the first speed and the second speed, the ball may be launched in the form of topspin or backspin. As the difference between the first speed and the second speed increases, the degree of spin may become stronger.

The controller 100 may drive the first roller 1110 and then obtain a first current value of the first roller 1110 measured by the roller speed control sensor 1310. The controller 100 may drive the second roller 1120 and then obtain a second current value of the second roller 1120 measured by the roller speed control sensor 1310.

The controller 100 may determine from the second current value whether the speed of the first roller 1110 is constant and/or what the speed value of the first roller 1110 is, and the controller may determine from the second current value whether the speed of the second roller 1120 is constant and/or what the speed value of the second roller 1120 is. Since the method for the controller 100 to determine the speed of the roller has been described above, a redundant description will be omitted.

The controller 100 may determine whether the speed of the first roller 1110 is normal from the current value of the first roller 1110. Here, whether the speed of the first roller 1110 is normal may relate to whether the speed of the first roller 1110 is constant, or whether the speed of the first roller 1110 has reached a predetermined value.

Likewise, the controller 100 may determine whether the speed of the second roller 1120 is normal from the current value of the second roller 1120. Here, whether the speed of the second roller 1120 is normal may relate to whether the speed of the second roller 1120 is constant, or whether the speed of the second roller 1120 has reached a predetermined value.

The controller 100 may determine whether the launcher 1100 is in a launch ready state. Here, the launch ready state may mean a state in which the ball is ready to be launched from the launcher 1100. For example, the launch ready state may be a state in which the speed of the roller included in the launcher 1100 satisfies a predetermined condition, a state in which the left and right and/or vertical rotation angle of the launcher 1100 may satisfy a predetermined condition, a state in which the launcher 1100 may have moved to a predetermined point on the tennis court, and a state in which the zero point adjustment of the launcher 1100 may be finished, but is not limited thereto.

The controller 100 may determine whether the launcher 1100 is in the launch ready state based on the current values of the first roller 1110 and the current value of the second roller 1120. For example, after the controller 100 obtains the first current value of the first roller 1110 and obtains the second current value of the second roller 1120, when the first current value and the second current value satisfy predetermined conditions, it may be determined that the launcher 1100 is in the launch ready state.

As a more specific example, when the controller 100 determines that the speed of the first roller 1110 is constant based on the first current value for the first roller 1110 and the speed of the second roller 1120 is constant based on the second current value for the second roller 1120, it may be determined that the launcher 1100 is in the launch ready state.

As another example, when the controller 100 determines based on the first current value for the first roller 1110 that the speed of the first roller 1110 has reached a predetermined first speed value and the speed of the second roller 1120 has reached a predetermined second speed value, it may be determined that the launcher 1100 is in the launch ready state.

The controller 100 may determine whether the launcher 1100 is in the launch ready state based on the speed of the first roller 1110 and the second roller speed 1120. For example, when it is determined that the speed of the first roller 1110 and the speed of the second roller 1120 are both normal, the controller 100 may determine that the launcher 1100 is in the launch ready state.

When it is determined that the launcher 1100 is in the launch ready state, the controller 100 may control the launcher 1100 so that the ball is launched. That is, the ball supply device 1000 according to an embodiment may launch a ball only when the controller 100 determines that the launcher 1100 is in the launch ready state.

Compared to when the launcher 1100 launches the ball even though it is not in the launch ready state, when the launcher 1100 launches the ball only when it is determined that the launcher 1100 is in the launch ready state, the user may receive the ball according to the predetermined condition.

The controller 100 may control the ball falling part 1160, when it is determined that the launcher 1100 is in the launch ready state. When the controller 100 determines that the launcher 1100 is in the launch ready state, the controller 100 may control the ball falling part 1160 so that at least one of the plurality of balls accommodated in the ball storage housing 1400 falls to the ball guide 1130.

For example, when the controller 100 determines that the launcher 1100 is in a launch ready state, the controller 100 may perform control so that the ball falling part 1160 rotates, whereby at least one of the plurality of balls accommodated in the ball storage housing 1400 may move to the ball guide 1130 through the ball falling part 1160. When the ball moves from the ball storage housing 1400 to the ball guide 1130 through the ball falling part 1160, the ball may be moved along the ball guide 1130 and then launched to the outside by the first roller 1110 and the second roller 1120.

2.2.2.4 Roller Speed Control Method According to Second Embodiment

When it is determined that the roller speed is abnormal while the ball supply device is launching the ball, a problem may have occurred in the ball supply device, and thus the ball supply device should stop supplying balls.

According to an embodiment, the controller 100 may determine whether the roller speed is normal while the ball is being supplied and then perform control so that ball launch is stopped, if necessary, and the setting for launching balls is reconfigured according to the conditions desired by the user, whereby there is an effect of preventing problems for the purpose of safety in advance.

Figure 12:
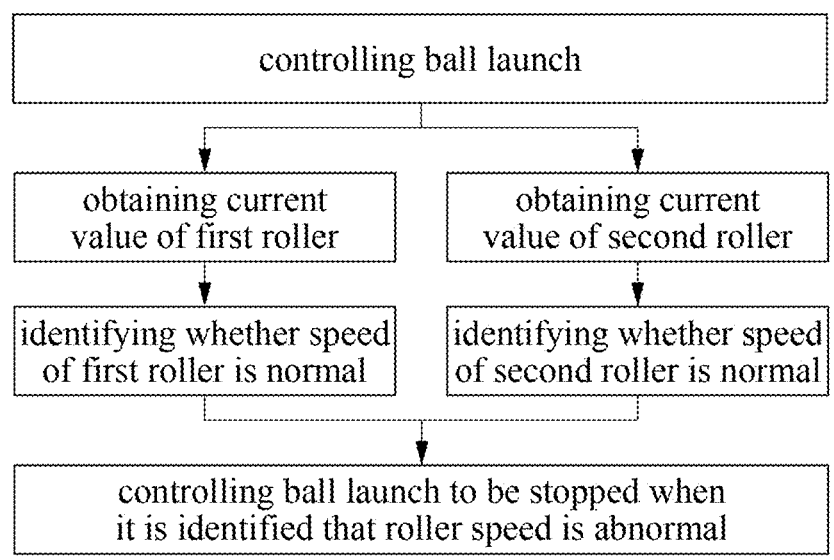
FIG. 12 is an exemplary view illustrating how the controller determines whether the roller speed is in normal while the ball supply device launches a ball.

FIG. 12 is an exemplary view illustrating how the controller determines whether the roller speed is in normal while the ball supply device launches a ball.

Referring to FIG. 12, the controller 100 according to an embodiment may determine whether the roller speed is normal while the launcher 1100 is launching the ball, and perform control so that the ball launching is stopped when it is determined that the speed of the roller is abnormal.

The controller 100 may determine whether the speeds of the first roller 1110 and the second roller 1120 are normal while the ball is launched to the outside through the first roller 1110 and the second roller 1120 of the launcher 1100.

The controller 100 obtains a first current value associated with the first roller 1110 measured through the roller speed control sensor 1310, and determine whether the speed of the first roller 1110 is normal based on the obtained first current value. The controller 100 obtains a second current value associated with the second roller 1120 measured through the roller speed control sensor 1310, and determine whether the speed of the second roller 1120 is normal based on the obtained second current value.

Whether the speed of the first roller 1110 and the second roller 1120 is normal is related to whether the speed of the first roller 1110 and the second roller 1120 is constant and/or what the speed values of the first roller 1110 and the second roller 1120 are. Since the specific method for determining this is the same as or corresponding to the content described above with reference to FIG. 11, the overlapping description will be omitted.

After the controller 100 obtains the current value of the first roller 1110 and determines whether the speed of the first roller 1110 is normal based on the obtained current value, when it is determined that the speed of the first roller 1110 is abnormal, the controller 100 may perform control so that the launcher 1100 stops ball launch. Similarly, after the controller 100 obtains the current value of the second roller 1120 and determines whether the speed of the second roller 1120 is normal based on the obtained current value, when it is determined that the speed of the second roller 1120 is abnormal, the controller 100 may perform control so that the launcher 1100 stops ball launch.

The controller 100 may control the launcher 1100 to stop launching the ball when it is determined that the obtained current value associated with the first roller 1110 does not satisfy a predetermined condition. Similarly, the controller 100 may control the launcher 1100 to stop launching the ball when it is determined that the obtained current value associated with the second roller 1120 does not satisfy a predetermined condition.

The controller 100 determines whether the speed of the first roller 1110 is normal and whether the speed of the second roller 1120 is normal, and when it is determined that at least one of the speed of the first roller 1110 and the speed of the second roller 1120 is abnormal, perform control so that the launcher 1100 stops ball launch, according to the above-described method.

The controller 100 may perform control so that the launcher 1100 stops ball launch, when it is determined that at least one of the obtained first current value associated with the first roller 1110 and the second current value associated with the second roller 1120 is abnormal.

For example, that the controller 100 controls the launcher 1100 to stop launching the ball may mean that the controller 100 performs control so that the speed of at least one of the first roller 1110 and the second roller 1120 is less than or equal to a predetermined value. Alternatively, it may mean that the controller 100 perform control so that the driving of at least one of the first roller 1110 and the second roller 1120 is terminated. Alternatively, it may mean that the controller 100 performs control so that the operation of the ball falling part 1160 terminates to make the ball included in the ball storage housing 1400 not to drop to the launcher 1100. However, it is not limited thereto, but it may mean that the controller 100 controls operations of components included in the launcher 1100 so that the operation of the launcher 1100 terminates.

After the controller 100 determines whether the speed of the first roller 1110 is normal and the speed of the second roller 1120 is normal according to the above-described method, when it is determined that both the speed of the first roller 1110 and the speed of the second roller 1120 are normal, the controller may perform control so that the ball is launched by the launcher 1100.

2.2.2.5 Roller Speed Method According to Second Embodiment

When it is determined that the roller speed is abnormal while the ball is being launched by the ball supply device, the speed of the roller needs to be controlled again so that the ball may be launched according to the conditions desired by the user, since the ball may not be launched according to the conditions desired by the user.

According to an embodiment, the controller 100 may determine whether the roller speed is normal while the ball is being supplied, and then perform control so that the speed of the roller satisfies the predetermined condition, if necessary. Accordingly, when conditions such as the drop point of the supplied ball differ from the conditions set in advance by the user, the speed of the roller is adjusted to enable the ball to be launched according to the conditions desired by the user.

Figure 13:
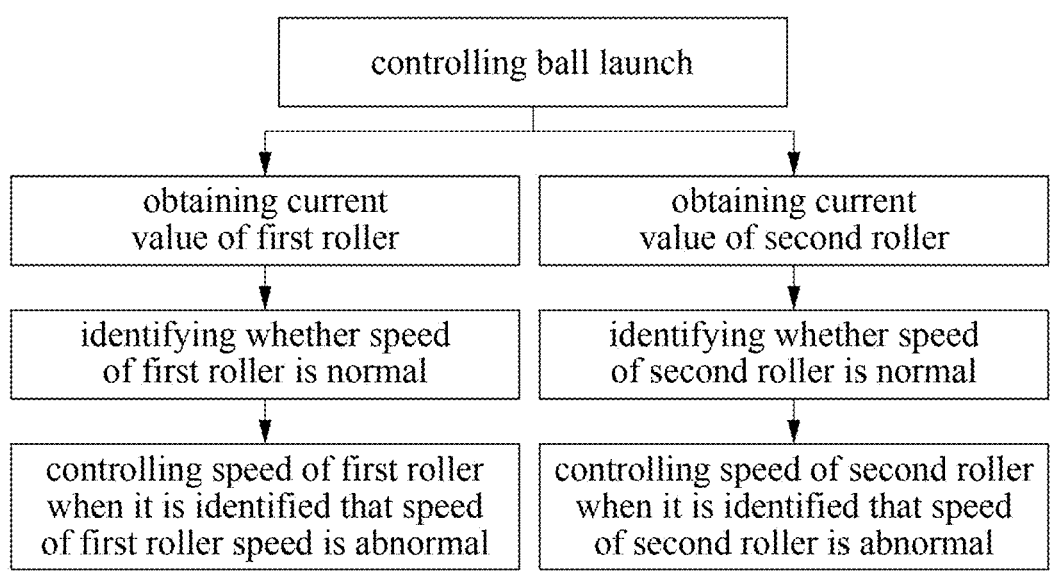
FIG. 13 is an exemplary view illustrating how the controller determines whether the roller speed is in normal while the ball supply device launches a ball.

FIG. 13 is an exemplary view illustrating how the controller determines whether the roller speed is in normal while the ball supply device launches a ball.

Referring to FIG. 13, the controller 100 according to an embodiment may determine whether the roller speed is normal while the launcher 1100 is launching the ball. When the controller 100 determines that the roller speed is abnormal, it is possible to control the speed of the roller that is determined to be abnormal.

By the controller 100, a method of obtaining the current value of the first roller 1110 and determining whether the speed of the first roller 1110 is normal based on the obtained current value and a method of obtaining the current value of the second roller 1120 and determining whether the speed of the second roller 1120 is normal based on the obtained current value are the same or correspond to the above-described method, a redundant description thereof will be omitted.

The controller 100 may control the speed of the first roller 1110 when it is determined that the speed of the first roller 1110 is abnormal. The controller 100 may control the first roller 1110 so that the speed of the first roller 1110 may be a predetermined speed, when it is determined that the speed of the first roller 1110 is not constant. When it is determined that the speed of the first roller 1110 is not within a predetermined range within an allowable error range, the controller 100 may control the first roller 1110 so that the speed of the first roller 1110 falls within the predetermined range.

The controller 100 may control the speed of the second roller 1120 when it is determined that the speed of the second roller 1120 is abnormal. The controller 100 may control the second roller 1120 so that the speed of the second roller 1120 becomes a predetermined speed, when it is determined that the speed of the second roller 1120 is not constant. When it is determined that the speed of the second roller 1120 is not within a predetermined range within an allowable error range, the controller 100 may control the second roller 1120 so that the speed of the second roller 1120 falls within the predetermined range.

The controller 100 may separately control the speed values of the first roller 1110 and the second roller 1120 during ball launch. According to the conditions preset by the user, the first roller 1110 may rotate with a first speed value, and the second roller 1120 may rotate with a second speed value. Herein, the first speed value and the second speed value may be the same as or different from each other.

In the case that the first roller 1110 rotates at the first value, and the second roller 1120 rotates at the second value, the controller 100 may perform control so that the first roller 1110 rotates at the first value when it is determined that the speed of the first roller 1110 is abnormal, and the controller may perform control so that the second roller 1120 rotates at the second value when it is determined that the speed of the second roller 1120 is abnormal.

2.2.3 Ball Counting Sensor

Referring to FIG. 10, the plurality of sensors 1300 may include a ball counting sensor 1330. The ball counting sensor 1330 may be provided in the ball supply device 1000, and may count the number of balls launched through the ball supply device 1000, together with the controller 100. In other words, the controller 100 may determine the number of balls launched using the ball counting sensor 1330.

For example, the ball counting sensor 1330 may be a sensor using a physical contact method or a sensor using a non-contact method, but not limited thereto, and may be a variety of known sensors used for counting balls.

When the ball counting sensor 1330 is a sensor using a non-contact method, it may be an ultrasonic sensor. Herein, compared to a sensor using a physical contact method, the ball counting sensor 1330 may be used for a long time without failure even when many tennis balls are launched.

2.2.4 Zero Point Sensor

When the ball supply device 1000 is used for more than a certain period of time, an error may occur in the launch direction and launch angle of the launcher (1100). In order to compensate for the error, the zero point of the launcher 1100 needs to be adjusted before the ball is launched.

However, in the case of an existing ball supply device, a separate supplementary function was not performed for the errors that may occur in the launcher, whereby when the ball supply device is used for a long period of time, there was a problem that the ball could not be launched in the desired direction.

The ball supply device 1000 according to an embodiment may perform a function of adjusting a zero point so that the launcher 1100 may accurately launch a ball in a direction and an angle that are preset according to a predetermined condition.

More specifically, the controller 100 may rotate the launcher 1100 to the left and right by a predetermined angle so that the ball may be launched to a desired position on the tennis court. For example, to launch the ball to a desired position on the tennis court, the launcher 1100 needs to be disposed in a first direction towards a specific point on the tennis court. Accordingly, the controller 100 may perform control so that the launcher 1100 faces the first direction.

The controller 100 may rotate the launcher 1100 by a predetermined angle from the central point so that the launcher 1100 faces the first direction. Herein, since the launcher 1100 starts to move from the central point and rotates by a predetermined angle, the position of the launcher 1100 needs to be positioned at a position corresponding to the center point before launching the ball.

Finally, the controller 100 may perform a task of adjusting the launcher 1100 to be positioned at the central point before the launcher 1100 is set in the direction toward the point desired by the user, which may be referred to as zero point adjustment.

The ball supply device 1000 may perform a function of adjusting the zero point of the launcher 1100 before initiating ball launch, and also perform a function of adjusting the zero point of the launcher 1100 when the ball launch is performed for a certain time or longer.

Since the ball supply device 1000 performs a function of adjusting the zero point of the launcher 1100, the ball may be accurately launched under a preset condition. In addition, when the ball supply device 1000 moves to a specific point by performing the zero point adjustment function of the ball launcher 1100, the ball supply device 1000 may be moved in a state that the center of gravity thereof is aligned, thereby preventing mechanical defects that possibly occur during movement.

Hereinafter, a method of adjusting the zero point of the ball supply device 1000 will be described with reference to the drawings.

Figure 14:
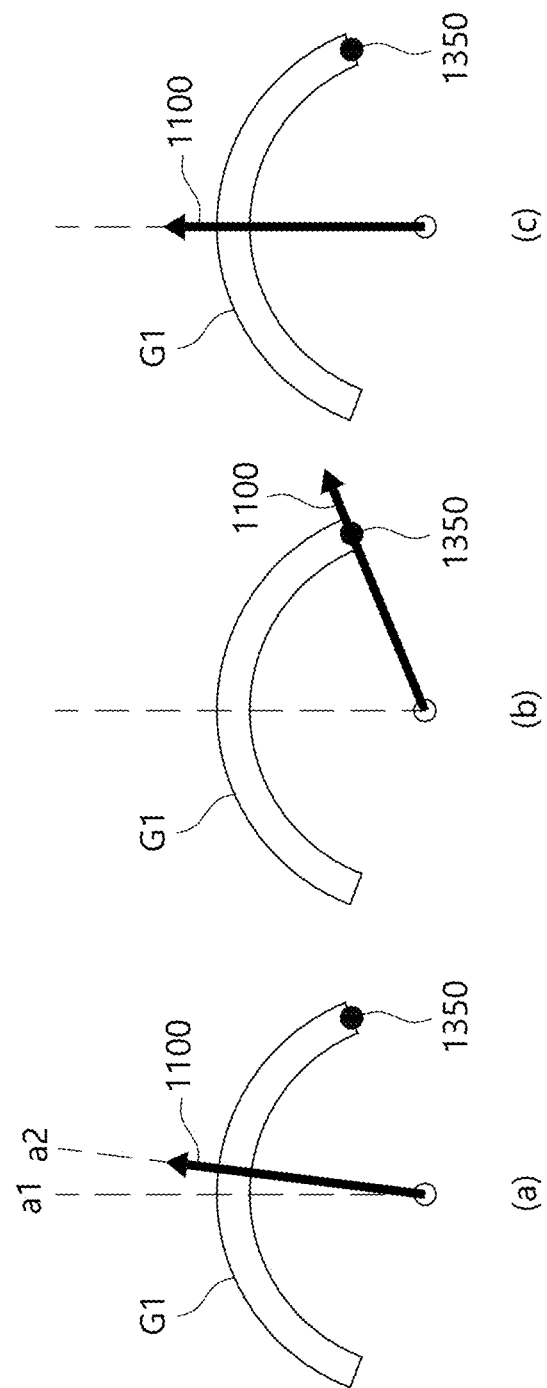
FIG. 14 is a schematic view illustrating a zero point adjustment method of a ball supply device according to an embodiment.

FIG. 14 is a schematic view illustrating a zero point adjustment method of a ball supply device according to an embodiment. Referring to FIG. 14, the controller 100 according to an embodiment may adjust the zero point of the launcher 1100 by using the zero point sensor 1350.

Referring to (a) of FIG. 14, the launcher 1100 may be oriented in the second axial direction a2 before launching the ball. As described above, the launcher 1100 must be located at the center point before launching the ball, in which the central point may be a point corresponding to the first axis a1 toward the center of the ball supply device 1000.

The controller 100 rotates at least a part of the launcher 1100 in the first direction to the reference point, and then rotates at least a part of the launcher 1100 in a second direction opposite to the first direction by a predetermined distance, thereby adjusting the zero point of the launcher 1100.

Referring to (b) of FIG. 14, the controller 100 may perform control so that the launcher 1100 rotates to a reference point for zero adjustment. The controller 100 may perform control so that the launcher 1100 rotates until the launcher 1100 is detected by the sensor for zero point adjustment. The sensor may be the zero point sensor 1350 described above with reference to FIG. 10.

Referring to (c) of FIG. 14, when it is determined that the launcher 1100 has rotated to the reference point in the first direction, the controller 100 may perform control so that the launcher 1100 rotates by a predetermined distance (or predetermined angle) in a second direction opposite to the first direction, when it is determined that the first lower plate 1140 rotates to the reference point in the first direction, the controller 100 may perform control so that the first lower plate 1140 rotates by a predetermined distance (or predetermined angle) in the second direction.

When it is determined that the launcher 1100 rotates in the first direction to be detected by the sensor, the controller 100 may perform control so that the launcher 1100 rotates by a predetermined distance (or a predetermined angle) in a second direction opposite to the first direction. When it is determined that the first lower plate 1140 rotates in the first direction to be detected by the sensor, the controller 100 may rotate the first lower plate by a predetermined distance (or predetermined angle) in the second direction.

Figure 15:
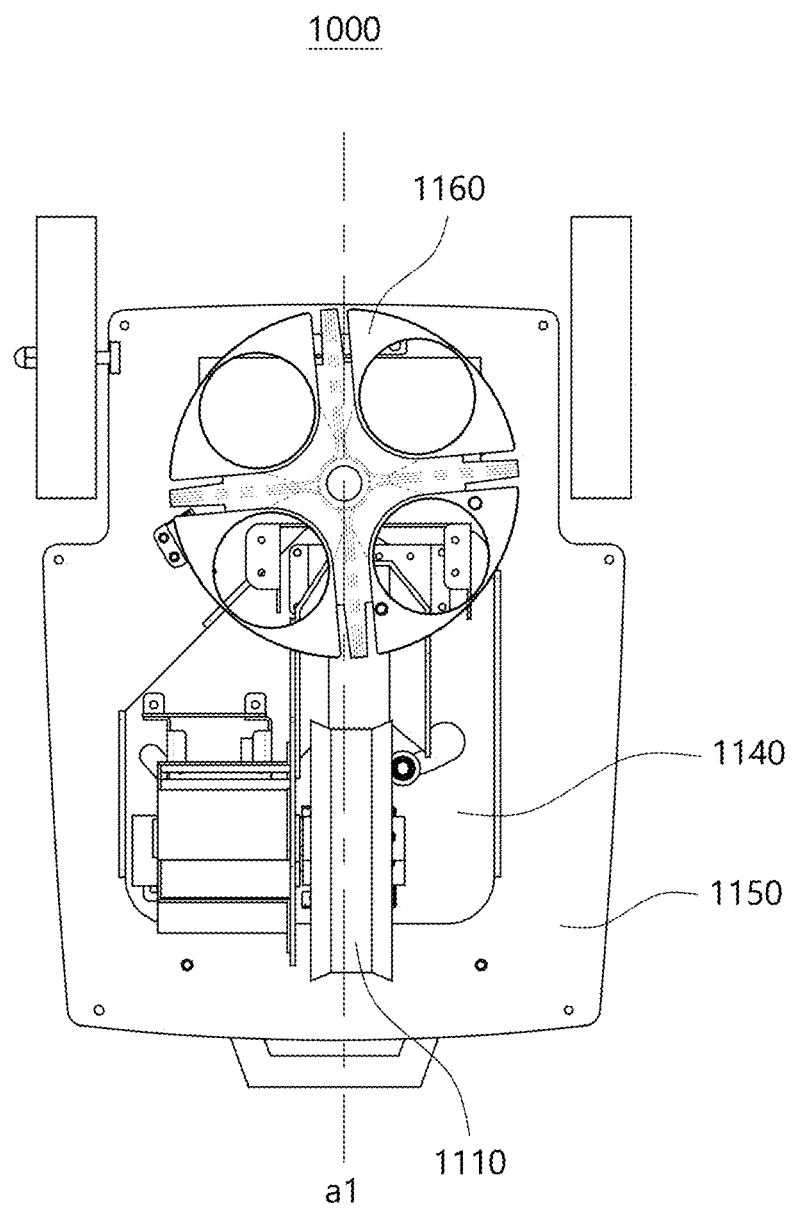
FIGS. 15 and 16 are views illustrating a left and right zero point adjustment method according to an embodiment.
Figure 16:
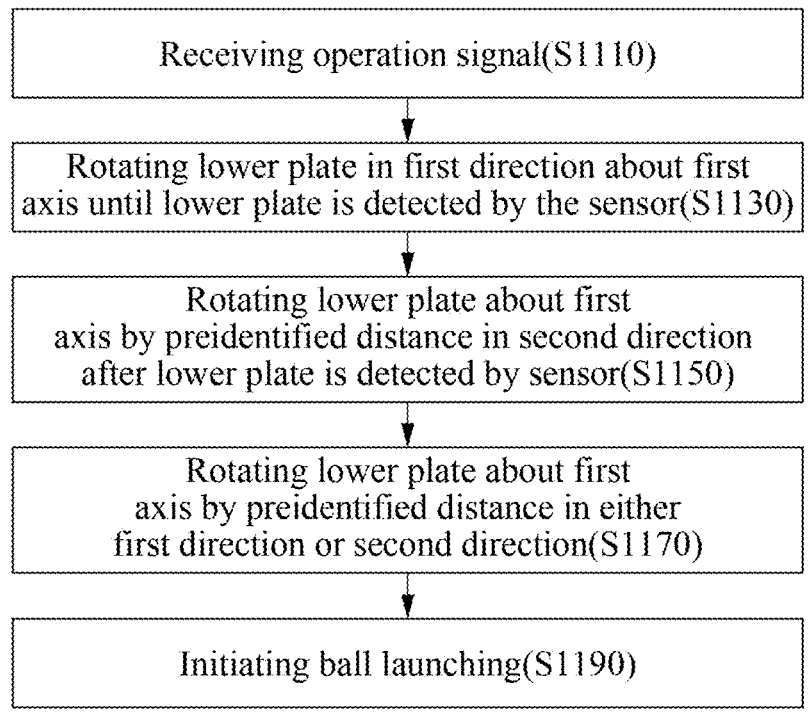

FIGS. 15 and 16 are views illustrating a left and right zero point adjustment method according to an embodiment.

Referring to FIG. 15, the controller 100 may perform a zero point adjustment operation so that the ball launcher 1100 may face the center of the ball supply device 1000.

The launcher 1100 needs to be positioned at the center point before launching the ball, and the central point may be a point corresponding to the first axis a1 toward the center of the ball supply device 1000.

The first axis a1 may be an axis oriented toward the center of the ball supply device 1000, and may be an axis corresponding to the center of the ball supply device 1000 in the front direction. The first axis a1 may be an axis in which the launcher 1100 faces the front of the ball supply device 1000. The first axis a1 may be an axis pointing toward a point corresponding to the center on the left and right rotation radius of the launcher 1100. The first axis a1 may be an axis toward the center of an open portion of the housing 1180 of the launcher 1100.

The controller 100 may control the launcher 1100 so that the zero point of the launcher 1100 is adjusted. That is, the controller 100 may perform control so that the launcher 1100 faces the direction of the first axis a1, before the launcher 1100 launches the ball (or while launching the ball).

Referring to FIG. 16, the controller 100 may perform a left and right zero point adjustment operation of the launcher 1100 before launching the ball, by receiving the operation signal (S1110), rotating the lower plate in the first direction about the first axis until the lower plate is detected by the sensor (S1130), rotating the lower plate about the first axis by a predetermined distance in the second direction after the lower plate is detected by the sensor (S1150), rotating the lower plate about the first axis by a predetermined distance in either the first direction or the second direction (S1170), and controlling the initiation of the ball launch (S1190).

The controller 100 may receive an operation signal based on a user input. The controller 100 may receive the operation signal and control the ball launcher 1100, so that the left and right zero point adjustment operation of the ball launcher 1100 may be performed before the ball launch.

The controller 100 may perform control so that the lower plate rotates about the first axis in the first direction until the lower plate is detected by the sensor. The controller 100 may perform control so that the launcher 1100 rotates for zero point adjustment in the first direction until the launcher 1100 is detected by the sensor. The sensor may be the zero point sensor 1350 described above with reference to FIG. 10.

The first direction may be a direction perpendicular to the first axis. The first direction may be any one of a left rotation direction or a right rotation direction of the ball launcher 1100.

The controller 100 may perform control so that the lower plate rotates in any one of the left or right directions, in which the lower plate may be rotated until the sensor detects the lower plate. The controller 100 may perform control so that the lower plate rotates in any one of the left or right directions until the sensor detects the lower plate.

The controller 100 may perform control so that the lower plate rotates about the first axis to the reference point in the first direction. The controller 100 may perform control so that launcher 1100 rotates to a reference point about the first axis in the first direction.

The reference point may correspond to a point when the launcher 1100 is maximally rotated to the left or right. The reference point may correspond to a point at which the launcher 1100 is rotated to the left or right at the maximum when it is rotated while being guided by the first guide groove G1. The reference point may be a point at which the first lower plate 1140 is detected by a sensor while being rotated.

The controller 100 may perform control so that the lower plate rotates about the first axis by a predetermined distance in the second direction when the lower plate is detected by the sensor. The controller 100 may perform control so that the launcher 1100 rotates about the first axis by a predetermined distance in the second direction when the lower plate is detected by the sensor.

The controller 100 may perform control so that the lower plate rotates about the first axis by a predetermined distance in the second direction, when it is determined that the lower plate has been rotated to the reference point. The controller 100 may perform control so that the ball launcher 1100 rotates about the first axis by a predetermined distance in the second direction, when it is determined that the lower plate has been rotated to the reference point. Herein, the controller 100 may determine whether the lower plate has rotated to the reference point using the zero point sensor 1350.

The second direction may be a direction perpendicular to the first axis. The second direction may be any one of a left rotation direction or a right rotation direction of the ball launcher 1100, but may be opposite to the first direction.

The predetermined distance (or predetermined angle) may be a value preset by a user input. The controller 100 obtains a setting value from the user, and set the predetermined distance (or predetermined angle) as the setting value.

The predetermined distance (or predetermined angle) may be determined based on the maximum left and right rotation angle of the launcher 1100. The predetermined distance (or predetermined angle) may be determined based on an angle value at which the lower plate included in the launcher 1100 may be rotated at the maximum.

For example, the predetermined distance (or predetermined angle) may be half of the maximum left and right rotation angle of the launcher 1100. The predetermined distance (or predetermined angle) may be half of the angle at which the lower plate included in the launcher 1100 can be rotated to the left and right at the maximum. More specifically, when the maximum left and right rotation angle of the launcher 1100 or lower plate is A, the predetermined distance (or predetermined angle) may be A/2.

The controller 100 receives the operation signal (S1110), rotates the lower plate in the first direction about the first axis until the point is detected by the sensor (S1130), and then rotates the lower plate about the first axis by a predetermined distance in the second direction after the lower plate is detected by the sensor (S1150), thereby performing left and right zero point adjustment operation of the ball launcher 1100.

After the zero point adjustment operation is performed, the controller 100 may rotate the lower plate in either the first direction or the second direction so that the ball launcher 1100 may be positioned toward any point on the preset tennis court.

After the controller 100 performs the zero point adjustment operation described above, when the lower plate of the ball launcher 1100 rotates by a predetermined value in the first direction or the second direction, the ball launcher 1100 may be positioned to face an exact position desired by the user.

When the ball launcher 1100 is positioned to face the position desired by the user, the controller 100 may perform control so that the ball is launched through the step (S1190) of controlling the initiation of the ball launch.

Figure 17:
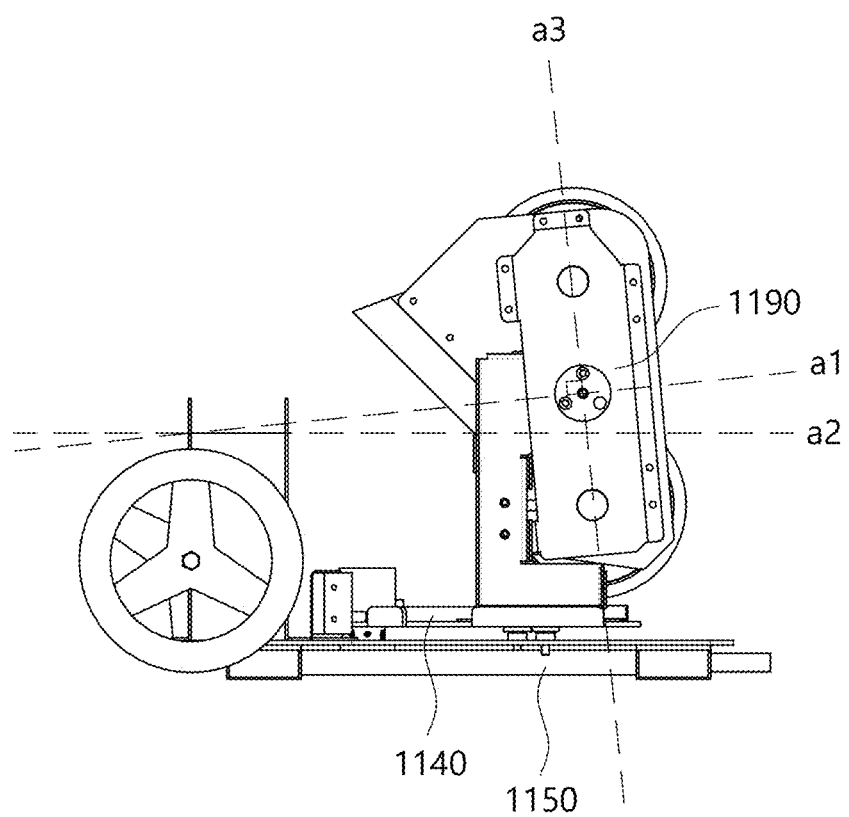
FIGS. 17 and 18 are views illustrating a vertical zero point adjustment method according to an embodiment.
Figure 18:
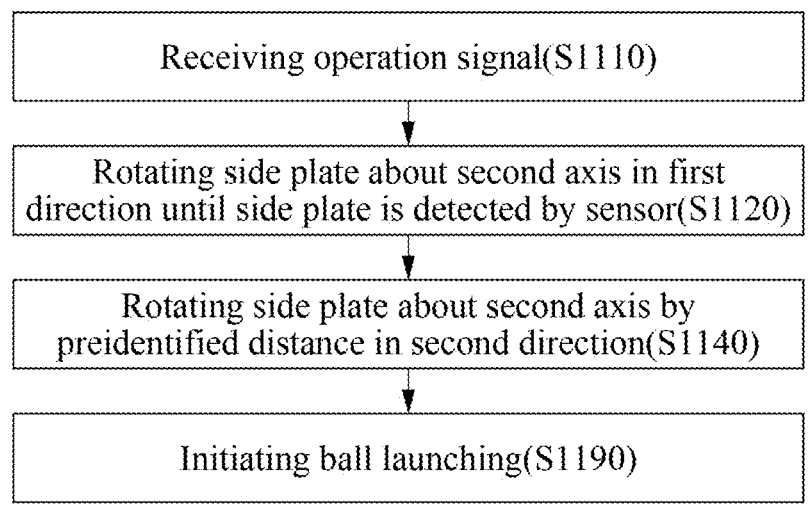

FIGS. 17 and 18 are views illustrating a vertical zero point adjustment method according to an embodiment.

Referring to FIG. 17, the controller 100 may perform a zero point adjustment operation so that the ball launcher 1100 faces a direction forming a predetermined angle with the bottom surface of the ball supply device 1000. The controller 100 may perform control so that the vertical rotation angle of the ball launcher 1100 becomes the lowest launch angle, before initiating the ball launch.

When the ball supply device 1000 moves in a state that the center of gravity is aligned, the components included in the ball supply device 1000 are prevented from being deteriorated in durability and prevented from malfunctioning.

When the ball launcher 1100 is disposed at the lowest launch angle within the ball supply device 1000, the ball supply device 1000 may be centered, and therefore the ball launcher 1100 needs to be disposed at the lowest launch angle before the ball is launched.

The controller 100 may control the ball launcher 1100 so that the ball launcher 1100 achieves the lowest launch angle. The controller 100 may control the side plate 1190 included in the ball launcher 1100 for the purpose of vertical zero adjustment of the ball launcher 1100.

The lowest launch angle may be the lowest angle of angles between the side plate 1190 and the lower plate. The lowest launch angle may mean the lowest angle of angles at which the ball launcher 1100 may rotate up and down with respect to the lower plate.

For example, as shown in FIG. 17, the angles between the axis a1 corresponding to the side plate 1190 and the axis a2 corresponding to the first lower plate 1140 or the second lower plate 1150 are the vertical rotation angles of the ball launcher 1100, in which the lowest value may correspond to the lowest launch angle.

Referring to FIG. 18, the controller 100 may perform an vertical zero point adjustment operation of the launcher 1100 before launching the ball, by receiving the operation signal (S1110), rotating the side plate about the second axis in the first direction until to the side plate is detected by the sensor (S1120), rotating the side plate about the second axis by a predetermined distance in the second direction (S1140), and controlling the initiation of the ball launch (S1190).

The controller 100 may receive an operation signal based on a user input. The controller 100 receives the operation signal and then controls the ball launcher 1100 to perform the vertical zero point adjustment operation of the ball launcher 1100 before launching the ball.

The controller 100 may perform control so that the side plate 1190 rotates about the second axis until the sensor detects the side plate 1190 in the first direction. The controller 100 may perform control so that the launcher 1100 rotates in the first direction until the launcher 1100 is detected by the sensor for the purpose of zero point adjustment. The sensor may be the zero point sensor 1350 described above with reference to FIG. 10.

The first direction may be a direction perpendicular to the second axis. The first direction may be any one of an upper rotation direction or a lower rotation direction of the ball launcher 1100.

The second axis may be a vertical rotation axis of the ball launcher 1100. The second axis may be an axis perpendicular to the first axis described above with reference to FIGS. 16 and 17.

The controller 100 may perform control so that the side plate 1190 rotates in the downward direction, until the side plate 1190 is detected by the sensor. The controller 100 may perform control so that the side plate 1190 rotates in the downward direction, until the side plat 1190 is detected by the sensor.

The controller 100 may perform control so that the side plate 1190 rotates about the second axis to the reference point in the first direction. The controller 100 may perform control so that the ball launcher 1100 rotates about the second axis to the reference point in the first direction.

The reference point may correspond to a point when the launcher 1100 is rotated to the bottom at the maximum. The reference point may correspond to a point when the launcher 1100 is disposed at the lowest launch angle. The reference point may correspond to a point when the side plate 1190 is rotated to the bottom at the maximum. The reference point may correspond to a point when the side plate 1190 is disposed to form the lowest launch angle. The reference point may be a point at which the side plate 1190 is detected by the sensor while being rotated.

The controller 100 receives the operation signal (S1110), and rotates the side plate about the second axis in the first direction until the side plate is detected by the sensor (S1120), thereby performing the vertical zero point adjustment operation of the ball launcher 1100.

After the zero point adjustment operation is performed, the controller 100 may rotate the side plate 1190 about the second axis in the second direction by a predetermined angle so that the launched ball may be dropped to any one point on the tennis court.

The predetermined angle may be set in consideration of a ball launch speed, a type of spin, and the like so that the ball can be dropped to any point, intended by the user, on the tennis court.

The second direction may be a direction perpendicular to the second axis. The second direction may be any one of an upper rotation direction or a lower rotation direction of the ball launcher 1100, and may be opposite to the first direction.

After the zero point adjustment operation described above is performed by the controller 100, when the side plate 1190 of the ball launcher 1100 rotates by a predetermined value in the second direction, the ball launcher 1100 may be set so that the ball may be dropped to an exact position desired by the user.

The controller 100 may control the initiation of the ball launch (S1190), after the ball launcher 1100 is set as described above.

The controller 100 may perform an operation to adjust the zero point of the ball launcher 1100, in which the zero point adjustment may include the left and right zero point adjustment described above with reference to FIGS. 15 and 16 and the vertical zero point adjustment described above with reference to FIGS. 17 and 18.

The controller 100 may determine that the zero point adjustment of the ball launcher 1100 is completed when it is determined that both left and right zero adjustment and vertical zero adjustment have been completed. Alternatively, the controller 100 may determine that the zero point adjustment of the ball launcher 1100 is completed when it is determined that any one of the left and right zero adjustments and the upper and lower zero adjustments have been completed.

Figure 19:
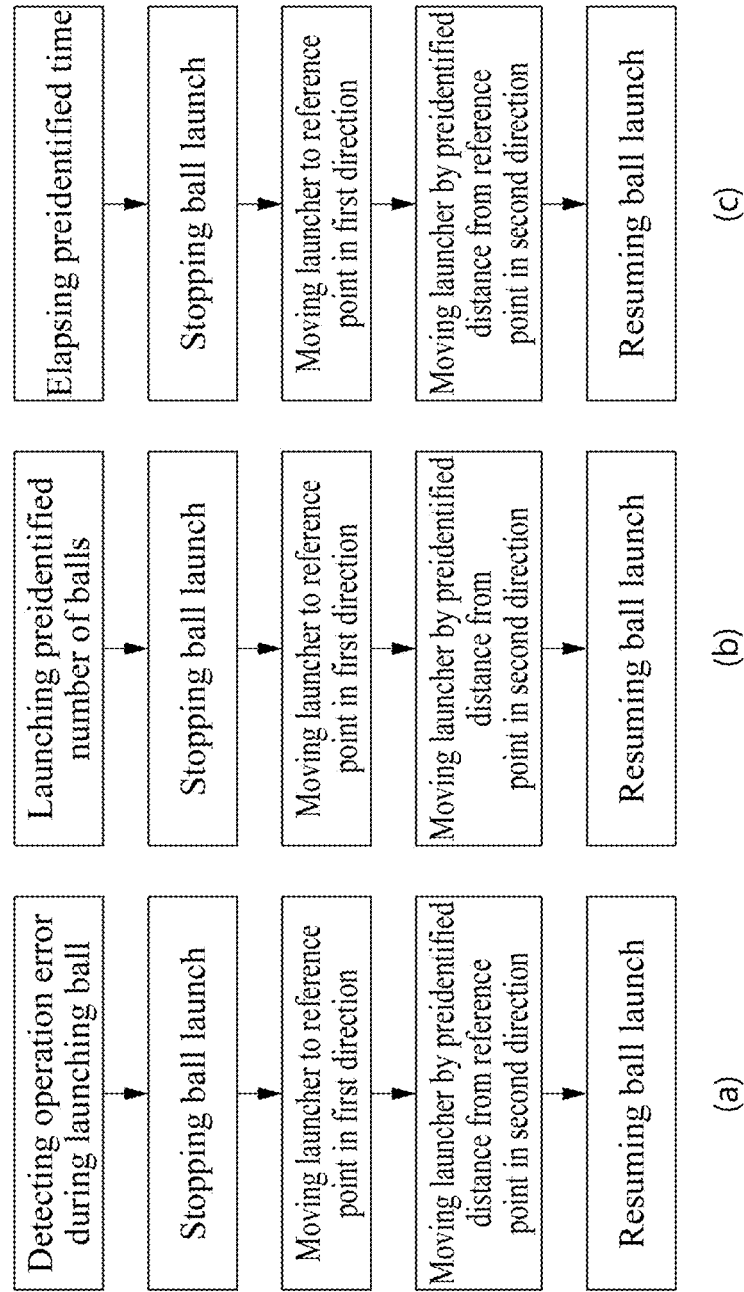
FIG. 19 is a view illustrating how the ball supply device performs a zero point adjustment operation according to another embodiment.

The controller 100 may control the launcher 1100 so that the ball is launched, when it is determined that the zero point adjustment of the launcher 1100 is completed, FIG. 19 is a view illustrating how the ball supply device performs a zero point adjustment operation according to another embodiment. Referring to FIG. 19, the controller 100 may perform an operation of adjusting the zero point of the ball launcher 1100 while the ball supply device 1000 is launching the ball.

Referring to (a) of FIG. 19, the controller 100 may perform an operation of adjusting the zero point of the ball launcher 1100, when it is determined that an operation error is detected while the ball is being launched, The controller 100 may perform control so that the ball launch is stopped, when it is determined that the sensor detects the operation error related to the ball supply device 1000.

For example, the operation error related to the ball supply device 1000 may be detected by a current sensor. The controller 100 may determine that the current value is abnormal and the operation error related to the ball supply device 1000 is detected, when the current sensor detects that the current value of the ball launcher 1100 is out of a predetermined range.

As another example, the operation error related to the ball supply device 1000 may be detected by an operation detection sensor. The controller 100 may determine that an operation error related to the ball supply device 1000 is detected, when the motion detection sensor detects an external shock to the ball supply device 1000, As another example, the operation error related to the ball supply device 1000 may be determined based on ball launch information. The ball launch information is information related to the ball launched by the ball launcher 1100, in which the information may include information related to a launch rating, a type of spin, a degree of spin, an angle of launch, and a ball drop point.

More specifically, the controller 100 analyzes the ball launched by the ball launcher 1100, and determine that an operation error related to the ball supply device 1000 is detected, when it is determined that a value related to at least one of a launch rating, a type of spin, a degree of spin, a launch angle, and a ball drop point, which are derived through the analysis result, does not satisfy the predetermined setting value.

The controller 100 may perform control so that the ball launch is stopped and thereafter the zero point adjustment operation of the ball launcher 1100 is performed, when it is determined that an operation error related to the ball supply device 1000 is detected. Thereafter, the controller 100 may perform control so that the ball launch is resumed, when it is determined that the zero point adjustment of the ball launcher 1100 is completed.

The zero point adjustment operation may include at least one of a vertical zero point adjustment operation and a left and right zero point adjustment operation. Since the controller 100 adjusts the zero point of the ball launcher 1100 as described above, a redundant description will be omitted.

Referring to (b) of FIG. 19, the controller 100 may perform an operation of adjusting the zero point of the ball launcher 1100, when it is determined that a predetermined number of balls have been launched during launching the balls. When the number of balls to be launched exceeds a predetermined number, the zero point of the ball launcher 1100 may be disrupted, thereby causing the controller 100 to perform the zero point adjustment operation of the ball launcher 1100 based on the number of launched balls.

The controller 100 may determine the number of balls launched through a sensor, and perform the zero point adjustment operation of the ball launcher 1100 when it is determined that more than the predetermined number of balls have been launched.

The controller 100 may perform the zero point adjustment operation of the ball launcher 1100, on the basis of the number of launched balls determined through a sensor and the time point when the zero point adjustment of the ball launcher 1100 is last performed. For example, the controller 100 may perform an operation of adjusting the zero point of the ball launcher 1100, when it is determined that the number of balls launched through the ball launcher 1100 is greater than or equal to the predetermined value after the zero point adjustment of the ball launcher 1100 is last performed.

The zero point adjustment operation may include at least one of a vertical zero point adjustment operation and a left and right zero point adjustment operation. Since the controller 100 adjusts the zero point of the ball launcher 1100 has been described above, a redundant description will be omitted.

Referring to (c) of FIG. 19, the controller 100 may perform an operation of adjusting the zero point of the ball launcher 1100 when a predetermined time elapses during launching the ball. Since the zero point of the ball launcher 1100 may be disrupted when the ball supply device 1000 is operated for more than a certain period of time, the controller 100 may perform the zero point adjustment operation of the ball launcher 1100 when a predetermined time has elapsed.

The controller 100 may determine the operation time of the ball launcher 1100 and perform the zero point adjustment operation of the ball launcher 1100 when it is determined that the operation time is equal to or longer than the predetermined time.

The zero point adjustment operation may include at least one of a vertical zero point adjustment operation and a left and right zero point adjustment operation. Since the controller 100 adjusts the zero point of the ball launcher 1100 has been described above, a redundant description will be omitted.

In addition to that described through FIG. 19, the controller 100 may perform an operation to adjust the zero point of the ball launcher 1100 when a specific event occurs. For example, the controller 100 may perform an operation of adjusting the zero point of the ball launcher 1100, when it is determined that the ball supply device 1000 has moved to the second point while launching the ball at the first point. As another example, the controller 100 may perform an operation of adjusting the zero point of the ball launcher 1100 whenever the ball launcher 1100 stops the ball launch.

2.3 How to Operate the Ball Supply Device

In the existing tennis ball supply device, only the ball launch operations were performed according to a set condition, but operations for enhancing user convenience before and after the ball launch were not provided. The ball supply device 1000 according to an embodiment may enhance user's convenience by performing a sequence of operations before launching the ball or by performing a sequence of operations after launching the ball.

Figure 20:
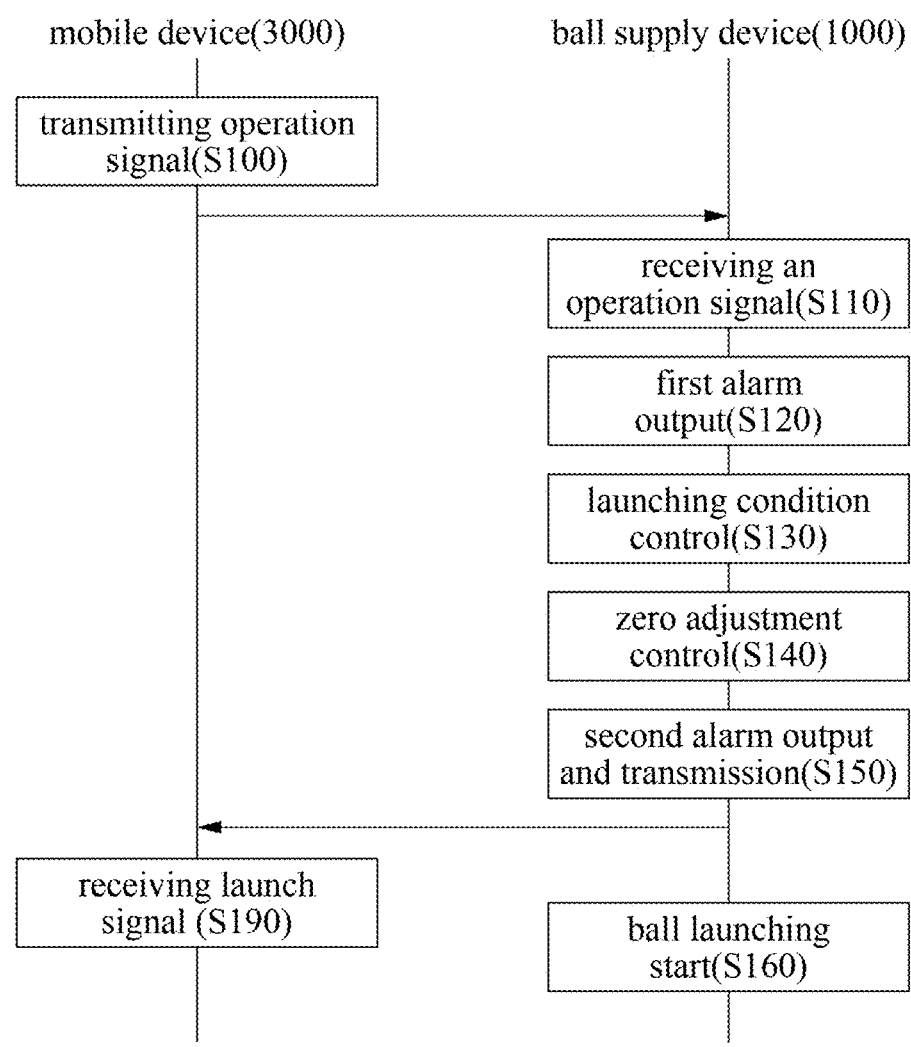
FIG. 20 is an exemplary view illustrating a series of operations performed before the ball supply device launches a ball according to an embodiment.

FIG. 20 is an exemplary view illustrating a series of operations performed before the ball supply device launches a ball according to an embodiment.

Referring to FIG. 20, the ball supply device 1000 may perform a step (S110) of receiving an operation signal from the mobile device 3000, a first alarm output step (S120), a launch condition control step (S130), a zero adjustment control step (S140), a second alarm output and transmission step (S150), and then a ball launch start step (S160).

The controller 100 of the ball supply device 1000 may receive an operation signal from the mobile device 3000. The operation signal may be a signal that instructs to perform a series of operations performed by the ball supply device 1000. The controller 100 may perform control so that the ball supply device 1000 performs the series of operations after receiving the operation signal.

The controller 100 may perform control so that the first alarm is output after receiving the operation signal from the mobile device 3000. The first alarm may be an alarm informing that the ball supply device 1000 has legally received the operation signal from the mobile device 3000.

The controller 100 may perform control so that the first alarm indicating that the operation signal has been received is selectively or necessarily output, after receiving the operation signal from the mobile device 3000.

The controller 100 may control the operation of the ball launcher 1100 based on a predetermined launch condition, after the operation signal is received from the mobile device 3000 and the first alarm is selectively or necessarily output.

The controller 100 may control the operation of the ball launcher 1100 to satisfy the preset launch conditions. The launch condition may be a condition related to at least one of a launch angle, a launching direction, a launch speed, a type of spin, a degree of spin, and a rotation speed of the ball falling part 1160.

The launch angle may be an angle corresponding to the vertical rotation angle of the ball launcher 1100. For example, the launch angle may be an angle corresponding to the rotation angle of the side plate 1190. The launch angle may be determined based on a predetermined ball drop point.

The launch direction may be an angle corresponding to the left and right rotation angle of the ball launcher 1100. For example, the launch direction may be an angle corresponding to the rotation angle of the lower plate. The launch direction may be a direction in which the ball launcher 1100 faces a predetermined point on the tennis court.

The launch speed may correspond to the speed of each of the first roller 1110 and the second roller 1120 included in the ball launcher 1100. For example, the higher the speed of each of the first roller 1110 and the second roller 1120, the higher the launch speed, and the lower the speed of each of the first roller 1110 and the second roller 1120, the lower the launch speed. The launch rating may be determined based on a predetermined drop point on the tennis court.

The type of spin may mean a type of spin applied to a ball to be launched, and may include backspin and backspin. The type of spin may be controlled by adjusting the speed of the first roller 1110 and the speed of the second roller 1120. For example, when the speed of the first roller 1110 and the speed of the second roller 1120 are the same, spin may not be applied to the ball, when the speed of the first roller 1110 is higher than the speed of the second roller 1120, topspin may be applied to the ball, and when the speed of the second roller 1110 is lower than the speed of the second roller 1120, backspin may be applied to the ball.

The degree of spin may relate to the degree of spin (e.g., backspin or topspin) applied to the ball. For example, as described above, when the speed of the first roller 1110 is higher than the speed of the second roller 1120, topspin may be applied to the ball. Herein, as the speed difference between the speed of the first roller 1120 and the speed of the second roller 1120 increases, the degree of spin may increase. Similarly, when the speed of the first roller 1110 is lower than the speed of the second roller 1120, backspin may be applied to the ball. Herein, as the speed difference between the speed of the first roller 1110 and the speed of the second roller 1120 increases, the degree of spin may increase.

The rotation speed of the ball falling part 1160 may be related to the launching interval of the ball. As described above, as the ball falling part 1160 rotates, any one of the balls included in the ball storage housing 1400 may move to the ball launcher 1100, in which the faster the rotation speed of the ball falling part 1160, the narrower the interval between the balls falling from the ball storage housing 1400 to the ball launcher 1100. That is, as the rotation speed of the ball falling part 1160 is controlled, the ball launch interval through the ball launcher 1100 may be controlled.

The controller 100 may perform control so that the ball launcher 1100 satisfies the above-described launch conditions through the launch condition control step S130, and determine whether the launch condition control is completed for the ball launcher 1100.

The controller 100 may determine that the launch condition control for the ball launcher 1100 is completed, when it is determined that the plurality of launch conditions is satisfied for the ball launcher 1100.

The controller 100 may determine that the launch condition control for the ball launcher 1100 is completed, when it is determined that any one of the above launch conditions for the ball launcher 1100 is satisfied, For example, the controller 100 may perform control so that the ball launcher 1100 operates at a predetermined launch rating, and determine that the launch condition control for the ball launcher 1100 is completed when it is determined that the ball launcher 1100 satisfies the launch rating condition. Since it takes most time to control the launch rating of the launch conditions, the controller 100 may determine that the launch condition control is completed for the ball launcher 1100 when it is determined that the control for the launch rating has been completed.

More specifically, the controller 100 may control the speed of the first roller 1110 and the second roller 1120 based on a predetermined launch rating, and determine that the control of the launch conditions of the ball launcher 1100 is completed when it is determined that the speed values of the first roller 1110 and the second roller 1120 measured by the sensor correspond to the predetermined launch rating.

When the controller 100 determines that the launch condition control for the ball launcher 1100 is completed, it is possible to control the zero point of the ball launcher 1100 through the zero point adjustment control step (S140). Herein, since the detailed method of adjusting the zero point of the ball launcher 1100 has been described above, the overlapping description will be omitted.

Meanwhile, although the launch condition control step (S130) is performed before the zero point adjustment control step (S140) in the drawings, but is not limited thereto, and the zero point adjustment control step (S140) may be performed prior to the launch condition control step (S130).

In other words, the controller 100 may complete the zero point adjustment operation for the ball launcher 1100 through the zero point adjustment control step (S140) and then perform the launch condition control step (S130).

The controller 100 may determine that it is ready to initiate the ball launch, when it is determined that the launch condition control and zero point adjustment control are completed. The controller 100 may output a second alarm indicating that it is ready to initiate the ball launch, when the launch condition control and the zero point adjustment control are completed.

The second alarm may be an alarm by which the controller 100 notifies the user that the launch condition control and the zero point adjustment control for the ball launcher 1100 have been completed. The second alarm may be an alarm provided to the user before initiating the ball launch, after the controller 100 performs the launch condition control and zero point adjustment control for the ball launcher 1100, The controller 100 may selectively or necessarily provide the second alarm to the user. When the controller 100 provides the second alarm to the user, there are advantages that the user may recognize that the ball launch has initiated through the second alarm, and accordingly take a ready posture corresponding thereto.

When the second alarm is not provided, the user may not know the exact time when the ball launch is initiated, so that there are disadvantages that the user is at risk of being injured by the ball launched at an unexpected time and is not taking proper ready posture.

The time point at which the second alarm is provided to the user may be related to the time point when the launch rating control of the controller 100 is completed. As described above, when the controller 100 performs the launch conditions and zero point adjustment control for the ball launcher 1100, since it takes most time to control the launch rating, which is one of the launch conditions, when the launch speed control of the ball launcher 1100 is completed, it is determined that the launch conditions and zero point adjustment control have been completed, and a second alarm may be output. That is, the controller 100 may output the second alarm after the time point when the control of the launch speed of the ball launcher 1100 is completed.

Similarly, the time point at which the second alarm is provided to the user may be determined according to the speeds of the first roller 1110 and the second roller 1120. The controller 100 may control the speed of the first roller 1110 and the second roller 1120 through the launch condition control step S130, and perform control so that a second alarm is output when it is determined that the speed satisfies a predetermined condition.

As a more specific example, since it takes at least 7 seconds after the control is initiated until the speed control of the first roller 1110 and the second roller 1120 is completed by the controller 100, the time point at which the second alarm is output may be 7 seconds after the control is initiated.

The type of the first alarm and/or the second alarm may be an alarm providing an audible effect or alarm providing a visual effect. For example, the first alarm and/or the second alarm may be provided through an LED device and may be provided through a speaker.

The type of the first alarm and/or the second alarm may be determined in consideration of a surrounding environment. The type of the first alarm and/or the second alarm may be determined by a user based on a surrounding environmental condition or may be automatically determined through an algorithm or artificial intelligence. For example, depending on the place where the ball supply device 1000 is located (e.g., indoor tennis court, outdoor tennis court) and/or the time during which the ball supply device 1000 is operating (e.g., daytime, nighttime), the type of the first alarm and/or the second alarm may be set differently.

Figure 21:
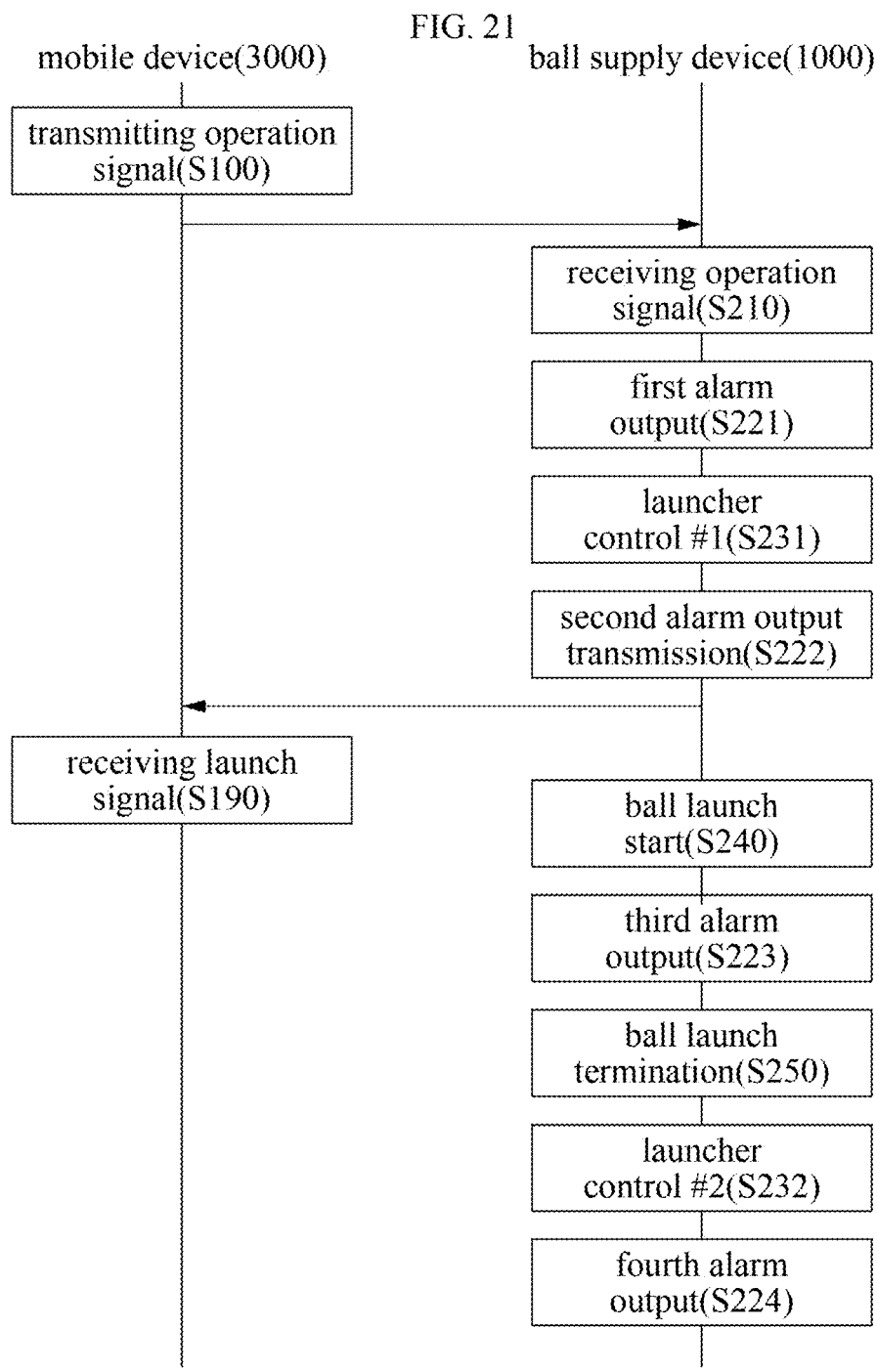
FIG. 21 is an exemplary view illustrating a series of operations performed until the ball supply device terminates ball launch according to an embodiment.

FIG. 21 is an exemplary view illustrating a series of operations performed until the ball supply device terminates ball launch according to an embodiment.

Referring to FIG. 21, the ball supply device 1000 may perform a step of receiving an operation signal from the mobile device 3000 (S210), a first alarm output step (S221), a launcher adjustment step (S231), a second alarm output step (S222), a ball launch start step (S240), a third alarm output step (S223), a ball launch end step (S250), launcher adjustment step (S232), and fourth alarm output step (S224).

The controller 100 of the ball supply device 1000 may receive an operation signal from the mobile device 3000. The operation signal may be a signal that instructs to perform a series of operations performed by the ball supply device 1000. The controller 100 may perform control so that the ball supply device 1000 performs a series of operations after receiving the operation signal.

The controller 100 may perform control so that the second alarm is output after receiving the operation signal from the mobile device 3000. Since a series of operations performed by the controller 100 through the first alarm output step S221 may correspond to the first alarm output step S120 described with reference to FIG. 20, a redundant description will be omitted.

The controller 100 may control the ball launcher 1100 through the launcher adjustment step (S231). For the ball launcher 1100, the launch condition control may be performed, and zero point adjustment control may be performed, in the launcher adjustment step S231. Since this may correspond to the launch condition control step (S130) and the zero point adjustment control step (S140) described with reference to FIG. 20, a redundant description will be omitted.

The controller 100 may output a second alarm when the control for the ball launcher 1100 through the launcher adjustment step (S231) is completed. Since a series of operations performed by the controller 100 through the second alarm output step S222 may correspond to the second alarm output step S150 described with reference to FIG. 20, a redundant description will be omitted.

The controller 100 may control the ball launcher 1100 so that the ball may be launched through the ball launch start step (S240). Thereafter, the controller 100 may provide an alarm to the user in advance before the ball launch is terminated through the third alarm output step S223.

The controller 100 may perform control so that a third alarm is output to the user, when it is determined that the number of remaining balls is n in consideration of the number of balls that has been launched. Accordingly, it is possible to provide the effect of allowing the user to know in advance the number of remaining balls until the launch is finished.

The controller 100 may terminate the ball launch when a predetermined condition is satisfied. The predetermined condition may be related to at least one of the number of balls launched, ball launch time, success rate of a specific operation, accuracy of a specific operation, ball motion, human motion, and abnormal motion detection through a situational awareness algorithm.

The controller 100 may terminate the ball launch when it is determined that a predetermined number of balls have been launched. The controller 100 may terminate the ball launch when it is determined that the ball supply device 1000 has operated for a predetermined time.

The controller 100 determines a success rate for a user's specific operation (e.g., forehand operation, backhand operation, serve operation, receive operation, and the like) through user analysis, and terminates the ball launch when the success rate satisfies a predetermined condition. The controller 100 determines the accuracy of the user's specific operation (e.g., forehand operation, backhand operation, serve operation, receive operation, etc.) through user analysis, and terminate the ball launch when it is determined that the accuracy satisfies a predetermined condition.

The controller 100 may analyze the motion of the ball, and terminate the ball launch when it is determined that there is no ball returning from the user as a result of the analysis. The controller 100 can analyze the motion of a person, and terminate the ball launch when the user is not recognized on the tennis court as a result of the analysis.

The controller 100 may terminate the ball launch when an abnormal operation is detected through a context-aware algorithm.

For example, the controller 100 may terminate the ball launch when it is determined that the ball supply device 1000 is disconnected from the external communication device. The ball supply device 1000 may operate in communication with an external device for safety reasons. For example, since there is a risk of malfunction when the connection between the ball supply device 1000 and the external communication device is disconnected, the ball launch needs to be stopped.

As another example, the controller 100 may determine that an abnormal operation has occurred and terminate the ball launch, when it is determined that the current value for the ball supply device 1000 is excessively measured or an error has occurred in the setting of the roller speed.

The controller 100 may additionally control the ball launcher 1100 through a launcher adjustment step (S232) after the ball launch is finished.

Since the ball launcher 1100 may be set according to the launch conditions when the ball launch is performed, it is necessary to return the setting of the ball launcher 1100 to the initial state.

The ball supply device 1000 must be moved to a storage position after the ball launch is finished, in which the ball supply device 1000 may be safely moved without failure only in a state in which the center of gravity of the ball launcher 1100 is aligned, which is one of components constituting the ball supply device 1000. Accordingly, the controller 100 may perform control so that the center of gravity of the ball launcher 1100 is aligned through the launcher adjustment step (S232) after the ball launch operation is terminated.

The controller 100 may perform the zero point adjustment operation of the ball launcher 1100 through the launcher adjustment step (S232). Herein, since the specific method of adjusting the zero point of the ball launcher 1100 has been described above, a redundant description will be omitted.

The controller 100 may optionally or necessarily output a fourth notification indicating that the ball launch is finished, after the launcher adjustment step (S232) is completed. The controller 100 may selectively or necessarily output a fourth notification indicating that the operation of the ball supply device 1000 has terminated, after the launcher adjustment step (S232) is finished.

Figure 22:
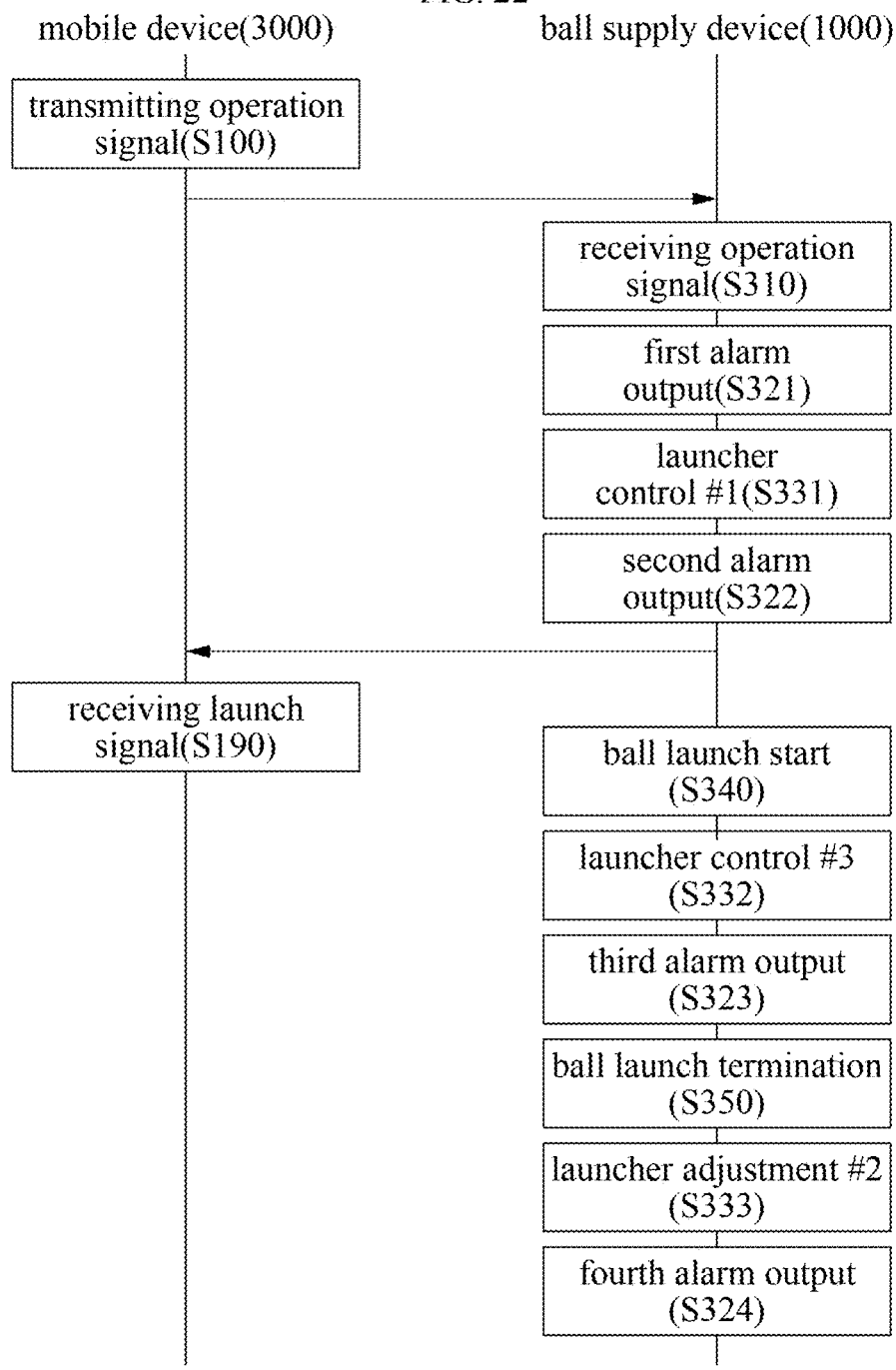
FIG. 22 is an exemplary view illustrating a series of operations performed until the ball supply device terminates ball launch according to another embodiment.

FIG. 22 is an exemplary view illustrating a series of operations performed until the ball supply device terminates ball launch according to another embodiment.

Referring to FIG. 22, the ball supply device 1000 may perform a step of receiving an operation signal from the mobile device 3000 (S310), a first alarm output step (S321), a launcher control step (S331), a second alarm output step (S322), a ball launch start step (S340), a launcher control step (S332), a third alarm output step (S323), a ball launch termination step (S350), a launcher adjustment step (S333), and a fourth alarm output step (S324).

The operation signal reception step (S310), the first alarm output step (S321), the launcher adjustment step (S331), the second alarm output step (S322), the ball launch start step (S340) that are performed by the controller 100 of the ball supply device 1000 corresponds to the operation signal reception step (S210), the first alarm output step (S221), the launcher adjustment step (S231), the second alarm output step (S222), the ball launch start step (S240) which are described above with reference to FIG. 21, respectively, and thus a redundant description thereof will be omitted.

The controller 100 may perform the launcher adjustment step (S332) during launching the ball. The controller 100 may perform the launcher adjustment step (S332) when a predetermined condition is met while the ball is being launched. For example, the predetermined condition may relate to the number of launches, an operation time of the ball supply device, a current value measured through a sensor, a drop position of a ball, and the like.

When it is determined that a predetermined number of balls have been launched, the controller 100 may determine that zero point adjustment is necessary, and thus perform the zero point adjustment control operation of the ball launcher 1100. When it is determined that the ball supply device 1000 has operated for more than a predetermined time, the controller 100 may determine that zero point adjustment is necessary, and thus perform the zero point adjustment control operation of the ball launcher 1100. When it is determined that the current value measured through the plurality of sensors is abnormal, the controller 100 may determine that zero point adjustment is necessary, and thus perform the zero point adjustment control operation of the ball launcher 1100. After analyzing the movement of the ball, when it is determined that the ball is not accurately dropping to a preset point based on the analyzed result, the controller 100 may determine that the zero point adjustment is necessary, and thus perform the zero point adjustment control operation of the ball launcher 1100.

Thereafter, the third alarm output step (S332), the ball launch end step (S350), the launcher adjustment step (S333) and the fourth alarm output step (S324) performed by the controller 100 may correspond to steps described above through FIG. 21. Since the descriptions thereof have been described above, a detailed description thereof will be omitted.

3 External Electronic Device 2000

3.1 Structure and Function of External Electronic Device

Figure 23:
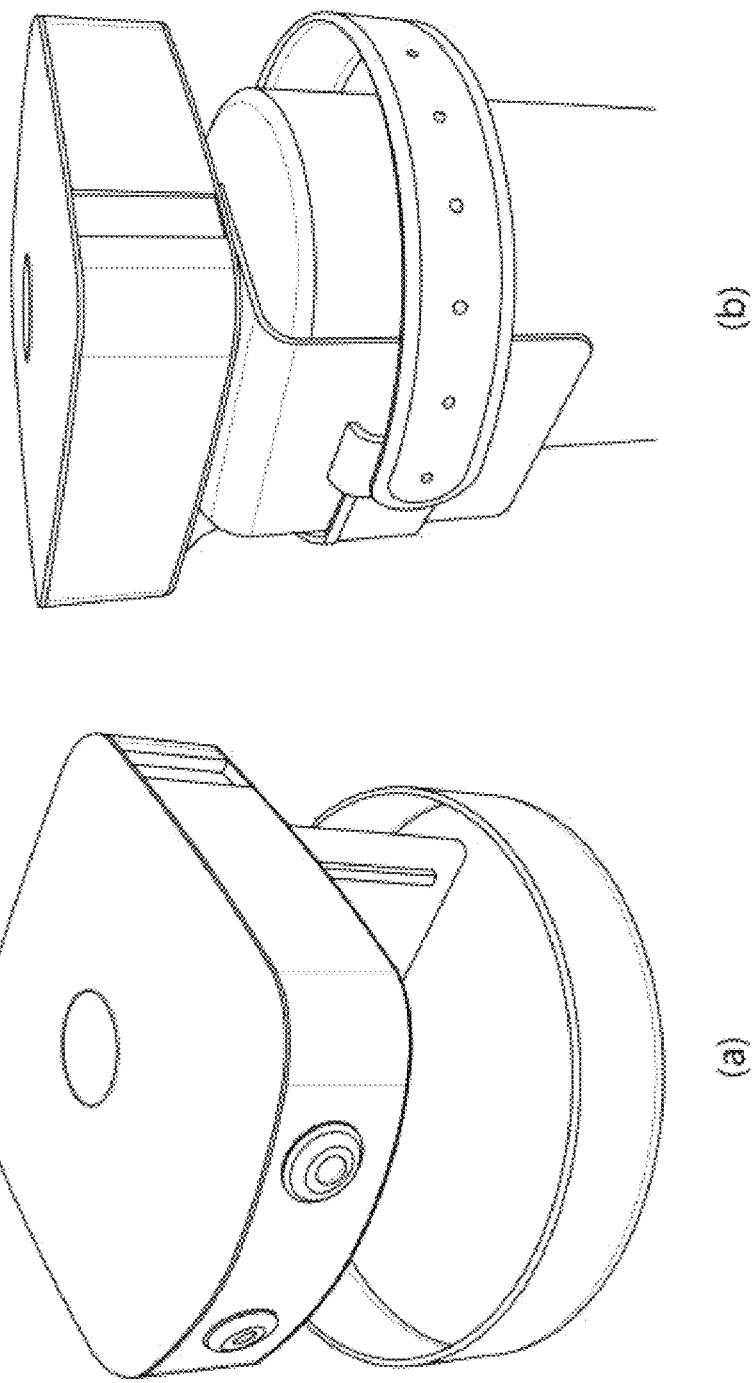
FIG. 23 is a view illustrating a external electronic device according to an embodiment.

FIG. 23 is a view illustrating an external electronic device according to an embodiment. Referring to FIG. 23, the tennis self-training system may include an external electronic device 2000 that is communicatively connected through a network.

The external electronic device 2000 may obtain image by capturing a tennis practice procedure of a player, convert the image into image data, and generate predetermined data through a vision recognition algorithm. The external electronic device 2000 derives a control signal based on the predetermined data, and the ball supply device 1000 may receive the control signal from the external electronic device 2000 and may launch a practice ball to the player according to the control signal. At least some of the predetermined data may be stored or processed and provided to the user through the mobile device 3000. The mobile device 3000 may output image captured by the external electronic device 2000 or analysis data derived through the image data to the user on the screen. In addition, the mobile device 3000 may transmit the control signal to the ball supply device 1000 in response to a user input from the user. The server 4000 may receive the image data, etc. from the external electronic device 2000 or the mobile device 3000 and provide coaching data that may help the user through data processing. As described above, the tennis self-training system is configured to enable the player to practice tennis training by himself/herself and receive a training program optimized for him/her, thereby performing self-training.

The external electronic device 2000 may be installed on one side of the net. For example, the external electronic device 2000 may be installed on one of the two posts supporting the net. As another example, a pair of external electronic devices 2000 may be installed on one tennis court. In addition, a pair of external electronic device 2000 may be installed on each of the two posts supporting the net.

In the case of the pair of external electronic devices 2000, a portion of a first field of view (FOV) of the image capturer provided in the first external electronic device may overlap a portion of a second field of view (FOV) of the image capturer provided in the second external electronic device. For example, one of the pair of external electronic devices may be installed to face the other. When two or more cameras are installed in one external electronic device, the first angle of view may mean a sum of fields of view of the two or more cameras, and the second angle of view is also the same. However, the first angle of view and the second angle of view do not necessarily overlap. For example, the first angle of view may cover one half-court, and the second angle of view may cover the other half-court.

The external electronic device 2000 may include an image capturer, an display, a controller, a storage, and a communication circuit.

The image capturer may capture the position and motion of the player or the ball supply device, the position and motion in which the player hit the ball (standing point), overall motion video, player momentum, ball in/out record, ball trajectory, ball drop position and stadium, etc.

The image capturer may include one or more cameras. The camera includes an image sensor capable of capturing the visible light region, in which the image sensor may mean a CCD (Charge Coupled Device) sensor or a CMOS (Complementary Metal-Oxide Semiconductor) sensor, but is not limited thereto, and it will be appreciated by those skilled in the art that any image sensor may be used as long as it is a sensor capable of capturing an image. The image captured by the image capturer may be converted into image data and transmitted to the ball supply device 1000, the mobile device 3000, the server 4000, and the like.

For example, the image capturer may include two cameras. For example, the first camera may capture one half-court, and the second camera may capture the other half-court. In this case, a part of the field of view of the first camera may overlap a part of the field of view of the second camera. For example, both the first camera and the second camera may capture a predetermined area near the net.

The display may provide information to the user. The display may provide information to the user through sound. In this case, the display may include a speaker. The display may provide information to the user visually through an image or video. Herein, the display may include a display. The display may provide information to the user through a light such as an LED.

An operation performed by the external electronic device 2000 may be performed by the controller or may be performed by causing the controller to control other components of the external electronic device 2000.

The controller may perform processing and calculation for a variety of information within the external electronic device 2000, and the controller may control other components constituting the external electronic device 2000.

The controller may be implemented in a computer or similar device according to hardware, software, or a combination thereof. In terms of hardware, the controller may be one or a plurality of processors. Alternatively, the controller may be provided as processors that are physically separated and operate together via communication. Examples of controllers may include a central processing unit (CPU), a graphics processing unit (GPU), a digital signal processing unit (DSP), a state machine, and an application specific Integrated Circuit (ASIC), a radio-frequency integrated circuit (RFIC), and the like, but is not limited thereto. In terms of software, the controller may be provided in the form of a program or application that drives the hardware controller.

The controller may perform at least some of the following based on the image data: tennis court recognition, ball recognition, ball tracking, ball drop timing determination, player hit timing determination, ball drop position determination, ball in-out determination, score calculation, ball drop position prediction, ball drop timing prediction, position identification of machine unit and player, and control signal generation and transmission to control the ball supply device.

The controller may recognize the tennis court. For example, a controller may recognize the lines of a tennis court. The controller may recognize the tennis court based on the image data, to derive court information.

According to an embodiment, the controller may recognize a tennis court based on a user input. Here, the user input may indicate a position of a specific point, line, or region on the tennis court. The controller may recognize the tennis court according to the criteria obtained through the user input. For example, the controller may recognize the tennis court by using a specific point input from the user as the reference point. As another example, the controller may recognize the tennis court using a line input from the user as the reference line. As another example, the controller may recognize the tennis court by using an area input by the user as the reference area.

3.2 Zero Adjustment of Ball Supply Device 3.2.1 General Example of Zero Point Adjustment The ball supply device 1000 may be provided with an autonomous driving technology according to an embodiment, and accordingly may move and operate autonomously on the tennis court.

In order for the ball supply device 1000 according to an embodiment to operate using the autonomous driving technology, it is necessary to initially check the point where the ball supply device 1000 is located on the tennis court. The position of the ball supply device 1000 on the tennis court should be specified, in order for the ball supply device 1000 to move to a point on the tennis court, which is desired by the user. Hereinafter, a method for specifying the position of the ball supply device 1000 will be described. Although the method of specifying the position of the ball supply device 1000 may be performed by the controller 100 or the external electronic device 2000, it will be described below that the method is performed by the controller 100 for convenience of description.

Figure 24:
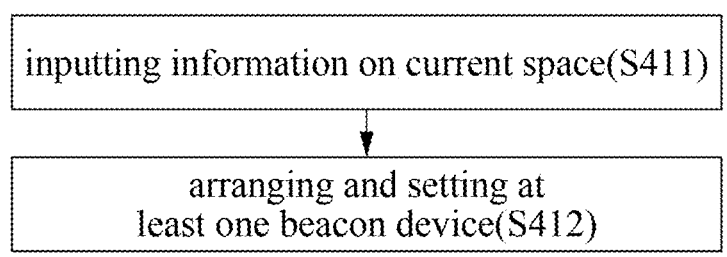
FIGS. 24 to 26 are views illustrating a method of specifying the position of the ball supply device according to an embodiment.
Figure 25:
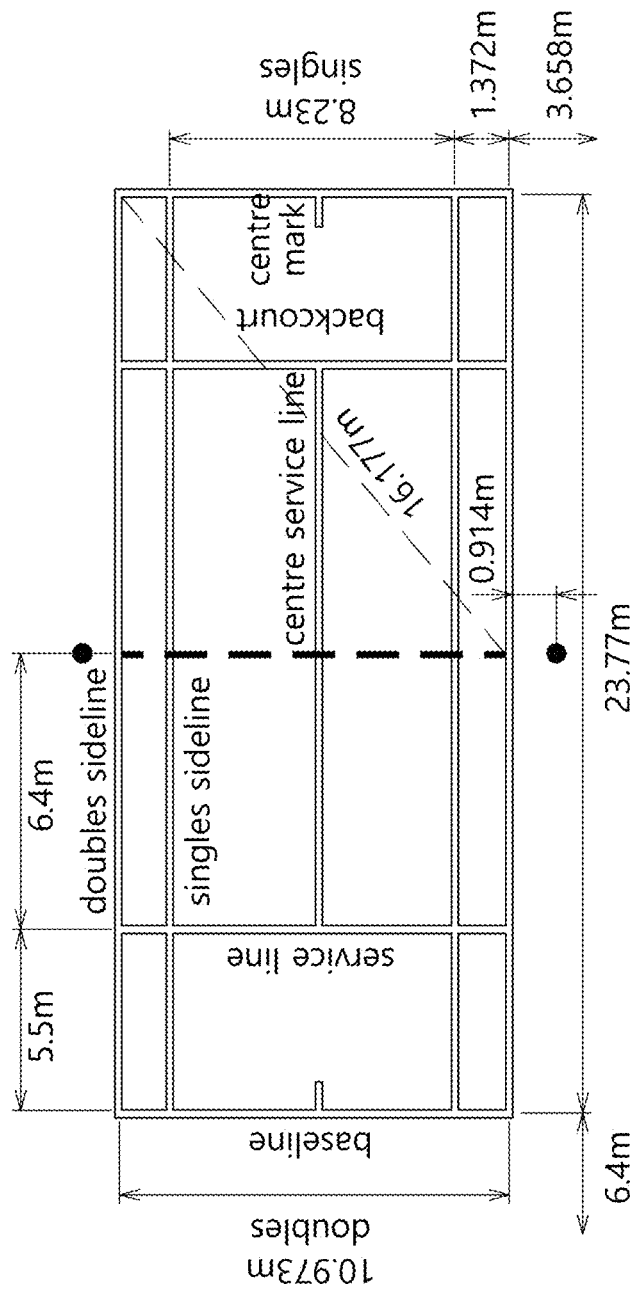
Figure 26:
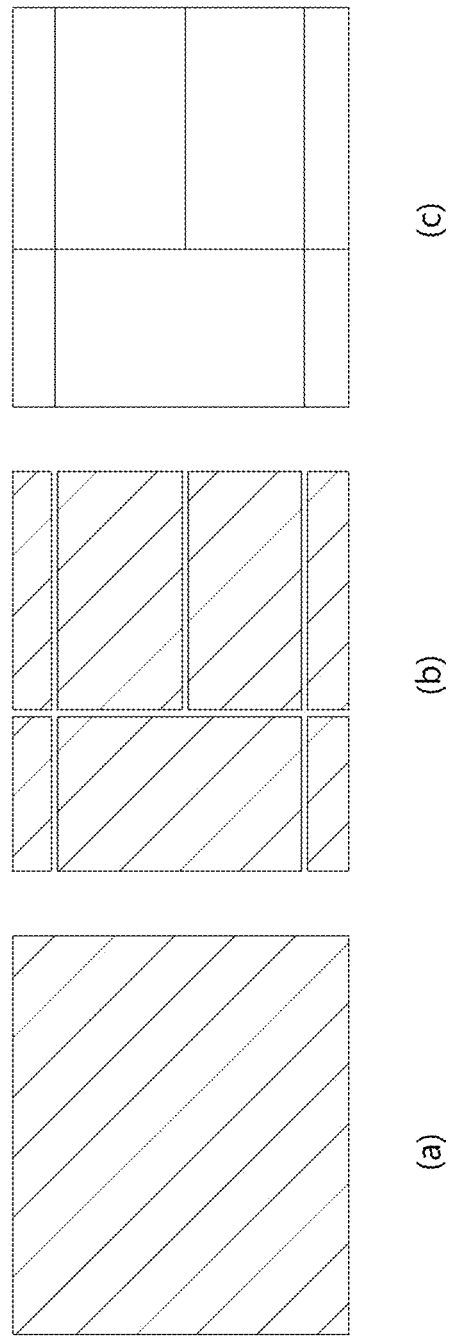

FIGS. 24 to 26 are views illustrating a method of specifying the position of the ball supply device according to an embodiment. Referring to FIG. 24, the controller 100 obtains information about the current space, and arranges and sets at least one or more beacon devices, thereby to specifying a point on the tennis court where the ball supply device is located.

The controller 100 may acquire information about the current space in which the ball supply device 1000 is placed. The information about the current space may be information about the tennis court, and more specifically relate to the size, standard, area information, and line information of the tennis court. The controller 100 may obtain information about the current space from a user input, as well as from external or internal devices.

As a more specific example, referring to FIG. 25, the tennis court may be formed according to a certain standard. The tennis court may be divided into a plurality of areas, and each area may be defined by a predetermined specific value. In addition, there may be a plurality of lines (e.g., base line, service line, doubles sideline, singles sideline, center service line, etc.) dividing each area on the tennis court.

Referring to FIG. 26, the controller 100 may acquire information on the current space based on the information on the tennis court. For example, referring to (a) of FIG. 26, the information on the current space may relate to the entire area (or half-court area) of the tennis court, a plurality of areas constituting the tennis court as shown in (b) of FIG. 26, and a plurality of lines serving as a reference that enables the tennis court to be divided into a plurality of areas as shown in (c) of FIG. 26.

The controller 100 may arrange at least one beacon device at a fixed point on the space where the ball supply device 1000 is located.

The beacon device may be arranged in a space based on a tennis court standard or information on the current space, in which the arrangement position and the arrangement number may also be determined based on tennis court standard or information on the current space. As example, two or more beacon device may be disposed at a fixed position on a tennis court (e.g., two posts supporting a net).

The controller 100 may specify a point at which the ball supply device 1000 is located on the tennis court based on signal received from the beacon device and the above-described information on the current space.

Meanwhile, although not shown in the drawings, the controller 100 may specify the current position of the ball supply device 1000 based on the image captured by an external capturing device. The controller 100 may specify the current position of the ball supply device 1000 based on the image captured by the external electronic device 2000.

For example, the external capturing device or external electronic device 2000 may capture the tennis court, and the controller 100 may acquire the above-described current spatial information based on the captured image. The external capturing device or external electronic device 2000 may capture the movement of the ball supply device 1000, and thee controller 100 may specify a point where the ball supply device 1000 is located on the tennis court based on the captured image.

A method of recognizing the current spatial information related to the tennis court based on the captured image and determining the movement of the ball supply device 1000 may utilize a known vision recognition technology, and thus a detailed description thereof will be omitted.

3.2.2 Zero Point Adjustment Extended Example

The position of the ball supply device 1000 on the tennis court may be specified in the above-described method, and the controller 100 may perform control so that the ball supply device 1000 moves to the reference point on the tennis court and then performs the ball launch operation. In addition, the controller 100 may perform control so that the ball supply device 1000 moves to a reference point on the tennis court after the ball launch is terminated.

Figure 27:
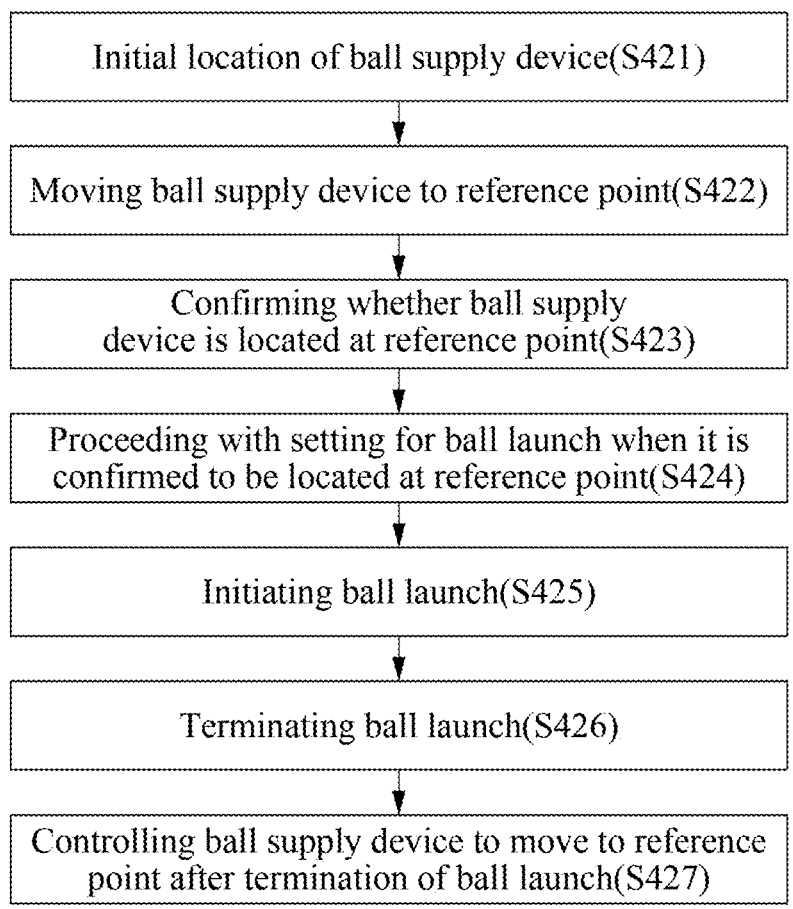
FIGS. 27 and 28 are views illustrating how the ball supply device moves to the reference point on the tennis court and then to the launching point, according to an embodiment.
Figure 28:
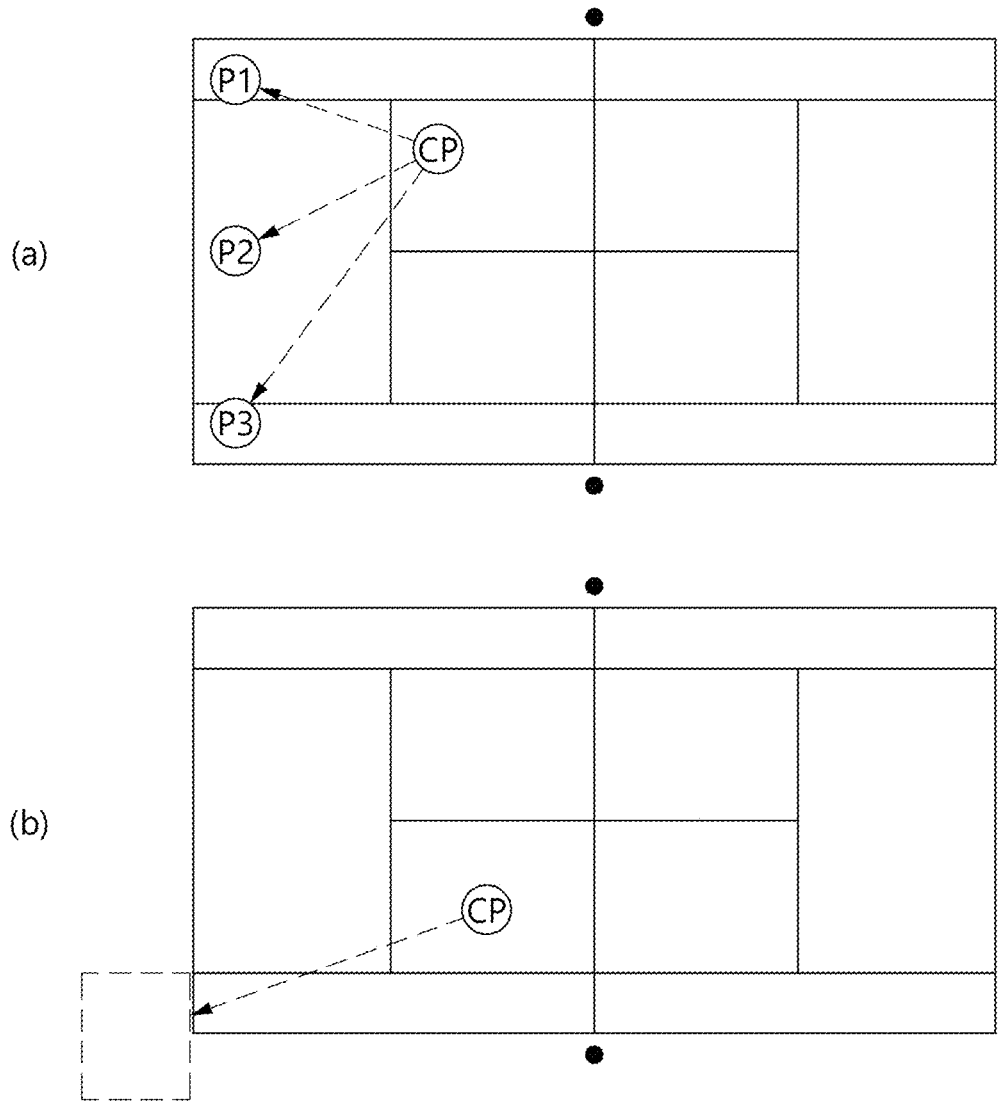

FIGS. 27 and 28 are views illustrating how the ball supply device moves to the reference point on the tennis court and then to the launching point, according to an embodiment.

Referring to (a) of FIG. 27, after the ball supply device 1000 completes the ball launch operation, it may be located at any one point CP on the tennis court. In order to perform the ball launch motion again, the ball supply device 1000 should first move to the reference points P1-P3 on the tennis court, and then move back to a predetermined launch point.

In the case that the ball supply device 1000 moves to the predetermined launch point, when it starts from the reference points P1-P3, the ball supply device 1000 may reach the launch point more accurately compared to when it does not starts from the reference points P1-P3.

Each of the reference points P1-P3 is any one point on the tennis court, such as the center, the left side, or the right side of the court. Although it is described, in FIG. 28, that the first reference point P1 is the left edge of the tennis court, the second reference point P2 is the central end of the tennis court, the third reference point P3 is an edge of the tennis court, but is not limited thereto, and may be any one point on the tennis court that is determined in advance.

Referring to (b) of FIG. 27, the ball supply device 1000 may be located at any one point CP on the tennis court after completing the ball launch operation and then moved to a safety space which is any space outside the tennis court.

The safety space may be formed outside the tennis court or may be formed within the tennis court, and may be a space in which the ball supply device 1000 may be safely stored when the operation of the ball supply device 1000 is not performed.

Referring to FIG. 28, the controller 100 performs steps of determining an initial position of the ball supply device (S421), moving the ball supply device to the reference point (S422), checking whether the ball supply device is located at the reference point (S423), proceeding with setting for ball launch (S424) when it is confirmed that the ball supply device is located at the reference point, initiating the ball launch (S425), terminating the ball launch (S426), and controlling the ball supply device to move to the reference point after the termination of the ball launch (S427).

The controller 100 may determine the initial position of the ball supply device 1000 in the method described above with reference to FIGS. 24 to 26. Thereafter, the controller 100 may perform control so that the ball supply device moves to the reference point on the tennis court.

The controller 100 may check whether the ball supply device 1000 is located at the reference point on the tennis court and perform control so that the setting for the ball launch may be made. The setting for the ball launch may be made with respect to controlling the ball launch device 1000 to move to a predetermined ball launch point, as well as controlling the above-described ball launch conditions.

Meanwhile, the controller 100 perform control so that the ball launch device 1000 first moves to a predetermined ball launch point, and then the ball launch device 1000 satisfies a predetermined launch condition (e.g., launch rating, launch angle, number of launches, zero point adjustment, and the like). In this way, when the controller 100 performs control so that the ball launch device 1000 moves to the ball launch point and then satisfies the launch conditions, it is possible to reduce errors capable of occurring in the process of moving the ball launch device 1000.

When the setting for ball launch are completed, the controller 100 may control the ball launcher 1100 so that the ball launch is initiated, and when a predetermined condition is satisfied, the ball launcher 1100 can be controlled so that the ball launch is terminated.

After the ball launch is terminated, the controller 100 may perform control so that the ball supply device 1000 moves to the safety space. Herein, the safety space may be the same as the reference point on the tennis court described above, or any space in which the device is stored, outside the tennis court.

3.3 Autonomous Driving Control of Ball Supply Device 3.3.1 General Example

An operation of the ball supply device 1000 according to the instruction of the external electronic device 2000 will be described in more detail.

According to an embodiment, the external electronic device 2000 may analyze the training situation in real time and instruct the ball supply device 1000 to move and launch the ball according to the analysis result. Hereinafter, a series of processes in which the tennis self-training system analyzes the training situation in real time and provides training to the players according to the results is referred to as an interactive training program. In comparison, the set of processes in which a tennis self-training system provides training to players according to a predetermined pattern is referred to as a general training program.

The external electronic device 2000 may calculate a position to which the ball supply device 1000 should move in order to launch a ball (hereinafter referred to as a "ball launch position"). The external electronic device 2000 may predict the drop position of the ball hit by the player to calculate the ball launch position. The ball launch position may be the same as or near the predicted ball drop position. The external electronic device 2000 may transmit a control signal including the ball launch position to the ball supply device 1000 to instruct the ball supply device 1000 to move to or near the ball launch position. The ball supply device 1000 may move to or near the ball launch position according to the control signal.

The ball launch position may be expressed as an absolute position. For example, the ball launch position may be expressed as a specific position or a coordinate on a tennis court.

Alternatively, the ball launch position may be expressed as a relative position. For example, the ball launch position may be expressed as a relative distance or direction compared to the current position, in which the ball supply device 1000 needs to move.

As described above, when the external electronic device 2000 first predicts the drop position of the ball and then secondarily corrects the fall position to predict the final drop position, the external electronic device 2000 transmits a primary message of first predicting the drop position and instructing the ball supply device 1000 to move to the primarily predicted drop position, and then transmits a secondary message instructing the ball supply device 100 to move to the secondary corrected final fall position. As the message is transmitted to the ball supply device 1000 twice, the ball supply device 1000 may move to the vicinity of the final drop position in advance according to the first message after receiving the first message and before receiving the second message, whereby the ball supply device 1000 may move to the final drop position faster compared to when transmitting a message to the ball supply device 1000 only once after predicting the final drop position. Even when the external electronic device 2000 predicts the drop position three or more times, the ball supply device 1000 may move similarly to the case of predicting the drop position twice.

The external electronic device 2000 may calculate a time point at which the ball supply device 1000 will launch a ball (hereinafter referred to as a "ball launch time"). The external electronic device 2000 may calculate the ball launch time, based on at least some of a position where the player hit the ball, a time point when the player hits the ball, ball recognition information, ball tracking information, speed of the ball hit by the player, prediction information of the drop position of the ball hit by the player, drop time point prediction information, and ball quality of the ball hit by the player. The external electronic device 2000 may transmit a control signal including the ball launch time to the ball supply device 1000 to instruct the ball supply device 1000 to launch the ball at the ball launch time. The ball supply device 1000 may launch the ball at the ball launch time according to the control signal.

The ball launch time may be calculated to be the same as or similar to the time point when the player hits the ball when playing against a real person. For example, the time point when the ball hit by the player is predicted to drop on the opposite half-court may be the time point at which the ball is launched. As another example, the time point after a predetermined time (Example: 0.01 sec, 0.02 sec, 0.03 sec, 0.1 sec, 0.2 sec, 0.3 sec, etc.) from the time point when it is predicted that the ball hit by the player will fall on the opposite half-court may be the ball launch time. Accordingly, the players may perform self-training as if they are actually playing with an opponent.

The ball supply device 1000 may move at a different speed depending on the situation. For example, the ball supply device 1000 may move at a speed determined based on at least one of the ball launch position and the ball launch time. As a specific example, the ball supply device 1000 may move at a speed that allows the ball launch position to be reached before the ball launch time has elapsed, in consideration of the distance between the current position and the ball launch position and the ball launch time.

Alternatively, the ball supply device 1000 may move at a constant speed. For example, the ball supply device 1000 may move at an initially set speed. Alternatively, the ball supply device 1000 may move at a specific speed input by the user.

When the ball supply device 1000 reaches the ball launch position before the ball launch time, the ball supply device 1000 may not launch the ball until the ball launch time.

The moving speed of the ball supply device 1000 may be determined by at least one of the external electronic device 2000 and the ball supply device 1000.

The external electronic device 2000 may monitor the position of the ball supply device 1000 to confirm whether the movement to the indicated position has been completed. When the ball supply device 1000 does not move to the indicated position, the external electronic device 2000 may transmit a control signal to the ball supply device 1000, to additionally move to the indicated position. Accordingly, the ball supply device 1000 may be additionally moved to the indicated position.

The external electronic device 2000 may calculate ball attribute information, including at least some of properties of the ball to be launched, such as the position where the ball to be launched by the ball supply device 1000 reaches (hereinafter referred to as the "ball arrival position"), the direction of the ball to be launched, the ball quality of the ball to be launched, and the speed of the ball to be launched. The external electronic device 2000 may transmit the control signal including the ball attribute information to the ball supply device 1000 to instruct the ball supply device 1000 to launch a ball according to the ball attribute information. The ball supply device 1000 may launch a ball with an attribute based on the ball attribute information according to the control signal.

The external electronic device 2000 may calculate the ball attribute information in consideration of at least one of the position of the player and the position of the ball supply device 1000.

The external electronic device 2000 may calculate the ball arrival position that is included within a predetermined distance range from the player's position. Herein, the predetermined distance range may vary according to difficulty level of the self-training. For example, the higher the difficulty level of self-training, the wider the predetermined distance range. As a specific example, the difficulty level may include an easy mode, a normal mode, and a hard mode, in which the easy mode may be set to a radius of 1-1.5 m from the player's position, the normal mode may be set to 2-4 m, and the hard mode may be set to 5-10 m, but is not limited thereto. In addition to the ball reaching position, the spin of the ball to be launched or the speed of the ball to be launched may vary depending on the difficulty level of self-training. For example, the higher the difficulty level of self-training, the more difficult the pitch of the ball to be launched (e.g., increase in the amount of spin of the ball, etc.) or the more the speed of the ball to be launched.

The ball supply device 1000 may adjust its direction in consideration of the ball arrival position. The ball supply device 1000 may launch a ball to the left and right within a predetermined angle range based on its direction. Therefore, when the ball arrival position is not included within the above angle range, the ball supply device 1000 may adjust its direction and then launch the ball so that the ball arrival position is included within the angle range.

The ball supply device 1000 may move to a preset position after launching the ball. The predetermined position may be a central position of the half court. Herein, the ball supply device 1000 repeats processes of waiting at the predetermined position, moving according to instructions of the external electronic device 2000, launching the ball, returning to the predetermined position, and then waiting again, thereby providing players with training.

Alternatively, the ball supply device 1000 repeats processes of waiting at the position where the ball is launched, moving according to the instruction of the external electronic device 2000, launching the ball, and then waiting for the next instruction from the external electronic device 2000 without returning back to the original position, thereby providing players with training.

An example in which the external electronic device 2000 and the ball supply device 1000 cooperate to provide interactive training to the player based on the contents described above will be described as follows.

The external electronic device 2000 predicts the position and the point at which the ball hit by the player will drop on the opposite half-court, and determines the position of the ball supply device 1000.

The external electronic device 2000 calculates a ball launch position, a ball launch time, and ball attribute information in consideration of the predicted drop position and drop time, and the current position of the ball supply device 1000.

The external electronic device 2000 transmits the ball launch position, the ball launch time, the ball arrival position, and the ball launch speed to the ball supply device 1000, and the ball supply device 1000 receives the ball launch position, the ball launch time, the ball arrival position, and the ball launch speed from the external electronic device 2000.

The ball supply device 1000 moves to the received ball launch position. While the ball supply device 1000 is moving or after the ball supply device 1000 completes the movement, the external electronic device 2000 may check the position of the ball supply device 1000 and transmit a control signal related to an additional movement for moving to an accurate ball launch position.

The ball supply device 1000 controls its orientation based on the received ball arrival position. The ball supply device 1000 launches the ball at the received ball launch speed when it reaches the received ball launch time. The ball supply device 1000 may launch the ball and then return back to an original position before moving.

The embodiment in which the position and the time point where and when the ball hit by the player drops on the opposite half court are predicted, and then the ball supply device moves and launches the ball has been described in consideration of the predicted position and time point was described in the foregoing. However, the implementation of the system presented by the present application is not limited to the above-described embodiment.

Hereinafter, another embodiment will be further described. According to another embodiment, the external electronic device 2000 may instruct the ball supply device 1000 to move and then launch the ball according to a predetermined pattern. The predetermined pattern may include information on at least some of a movement path, a ball launch position, a ball launch time, a ball arrival position, a ball launch speed, the number of ball launches, a ball launch interval, and a ball launch spin. Herein, the tennis self-training system may provide players with general training program.

The predetermined pattern may be selected by a user. For example, the user may select the predetermined pattern from among a plurality of patterns. The user may select the predetermined pattern through the mobile device 3000. The pattern selected by the user is transmitted to the external electronic device 2000, and the external electronic device 2000 may generate a control signal according to the pattern selected by the user. The external electronic device 2000 transmits the generated control signal to the ball supply device 1000, and the ball supply device 1000 may move and launch a ball according to the pattern selected by the user.

The predetermined pattern may be a pattern set by a user. For example, the user may set the predetermined pattern through the mobile device 3000. More specific details related to the user setting the pattern will be described later.

According to another embodiment, the ball supply device 1000 may operate according to a user's manipulation. The user may operate the ball supply device 1000 by inputting a user input through the mobile device 3000. The user input is transmitted to the external electronic device 2000, and the external electronic device 2000 may generate a control signal according to the user input. The external electronic device 2000 transmits the generated control signal to the ball supply device 1000, and the ball supply device 1000 may move and launch a ball according to the user input. More specific details regarding to the user's operation of the ball supply device 1000 through the mobile device 3000 will be described later.

Meanwhile, although it has been described that the external electronic device 2000 generates a control signal with respect to the operation of the ball supply device 1000 in the foregoing, the control signal may be generated by the mobile device 3000. In this case, the control signal generated by the mobile device 3000 may be transmitted from the mobile device 3000 to the ball supply device 1000 without going through the external electronic device 2000 or be transmitted from the mobile device 3000 to the ball supply device 1000 through the external electronic device 2000.

Meanwhile, as shown in FIG. 3, the ball supply device 1000 may include a controller 100, a body unit 1200, a launcher 1100, and a communication circuit 1800.

The operation performed by the ball supply device 1000 may be performed by the controller 100 or by causing the controller 100 to control other components of the ball supply device 1000.

Same or similar to the controller of the above-described external electronic device 2000, the controller 100 may perform processing and calculation for a variety of information within the ball supply device 1000, or may control other components constituting the ball supply device 1000. A description of the controller 100 overlapping with the controller of the external electronic device 2000 will be omitted.

3.3.3 Specific Mode of Operation

FIGS. 29 to 32 are views illustrating how the ball supply device operates according to an embodiment. Hereinafter, a method of operating the ball supply device 1000 according to an embodiment will be described with reference to FIGS. 29 to 32, and the operation method of the ball supply device 1000 may be performed by the external electronic device 2000 or the controller 100. Herein, for convenience of description, it will be described the method is performed by the controller 100.

Figure 29:
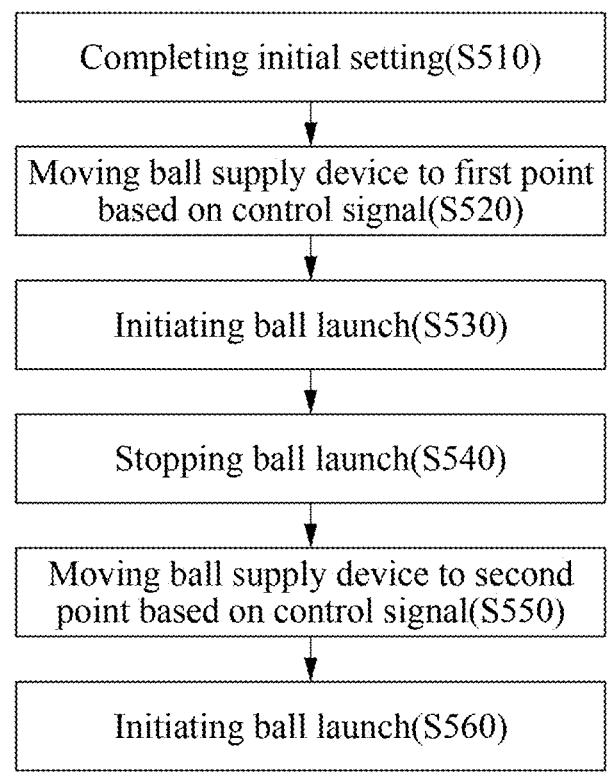
FIGS. 29 to 32 are views illustrating how the ball supply device operates according to an embodiment.

Referring to FIG. 29, the controller 100 performs control so that the ball supply device 1000 completes the initial setting for the ball supply device 1000 and then moves to the first point based on the control signal. Herein, the initial setting is related to the launch condition, and since it has been described above, a redundant description thereof will be omitted.

The controller 100 may perform control so that the ball launch is initiated when it is determined that the ball supply device 1000 has reached the first point, and the ball launch is terminated when it is determined that a predetermined condition is satisfied.

The controller 100 may perform control so that the ball supply device 1000 moves to the second point based on the control signal when it is determined that the ball launch is stopped. Herein, the second point may be a different point from the first point.

The controller 100 performs control so that ball launch restarts when it is determined that the ball supply device 1000 has reached the second point, and the ball launching is stopped when it is determined that a predetermined condition is satisfied.

Figure 30:
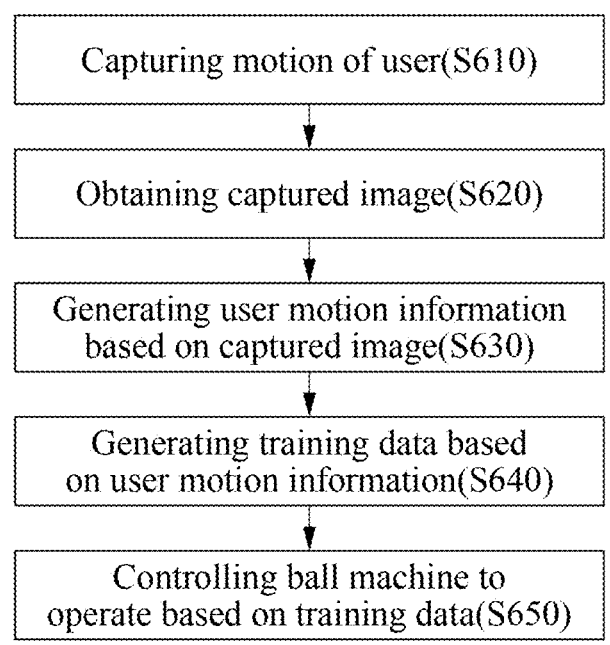

Referring to FIG. 30, the controller 100 may obtain an image by capturing the user's exercise motion and generate user exercise information based on the obtained image. The user exercise information is information capable of being extracted from the image obtained by capturing a user's motion, such as information about the user's strengths, the user's weakness, the user's athletic ability, and the like, which are analyzed through an algorithm or artificial intelligence based on the image.

The controller 100 may generate training data based on the user exercise information. For example, the training data may be a "weakness supplement program" that may supplement the strengths and weaknesses of the user identified from the user exercise information, and a "difficulty level control program" related to the exercise ability of the user identified from the user exercise information.

The controller 100 may perform control so that the ball supply device 1000 operates based on the training data. More specifically, the controller 100 may perform control so that the ball supply device 1000 operates in accordance with the launch conditions (e.g., ball launch position, launch angle, launch direction, launch speed, spin direction, spin degree, etc.) based on the training data.

Figure 31:
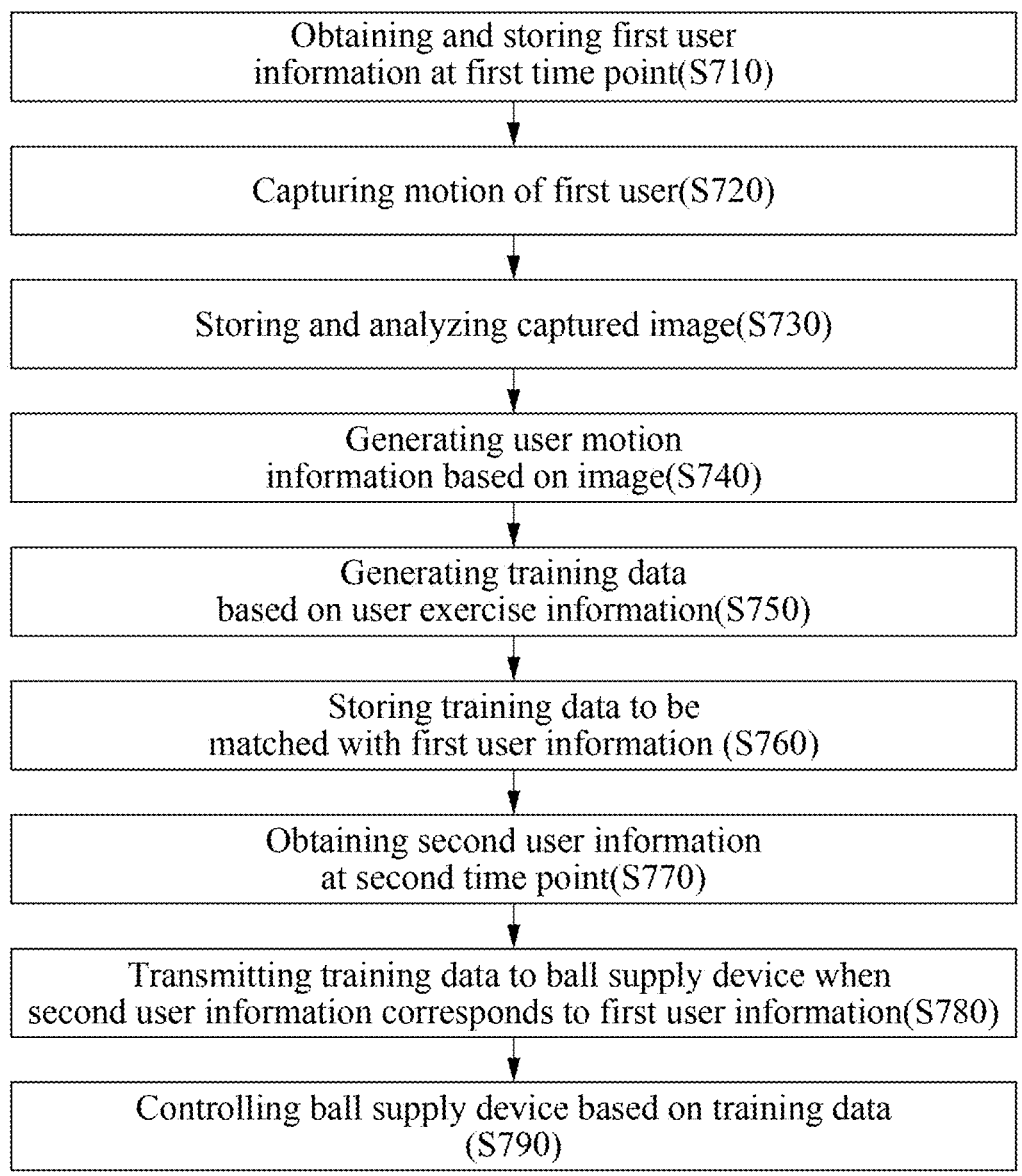

Referring to FIG. 31, since the controller 100 stores the user's exercise information and training data generated based on the same, the controller may perform control so that the ball supply device 1000 operates based on the previously stored training data when the same user wants to use the ball supply device 1000.

The controller 100 may obtain and store information on the first user at a first time point, and the controller 100 may obtain an image by capturing an exercise motion of the first user and then analyze the same.

The controller 100 may generate information on the user exercise from the image obtained by capturing an exercise motion of the first user, and generate training data based on the information on the user exercise. Herein, the information on the user exercise and training data may be the same as or correspond to those described above with reference to FIG. 30.

The controller 100 may match the training data with the first user information and store the same in a storage or an external device (e.g., a server).

The controller 100 may acquire information on the second user at a second time point, in which the second time point may be later than the first time point. When it is determined that the information on the second user obtained at the second time point matches the first user information, the controller 100 acquires the previously stored training data, and causes the ball supply device 1000 to be operated based on the same.

The controller 100 has stored information obtained by matching user information and training data in the past, and then perform control so that the ball supply device 1000 operate based on the training data stored in advance when the same user accesses, thereby providing the user with user-customized training data.

Figure 32:
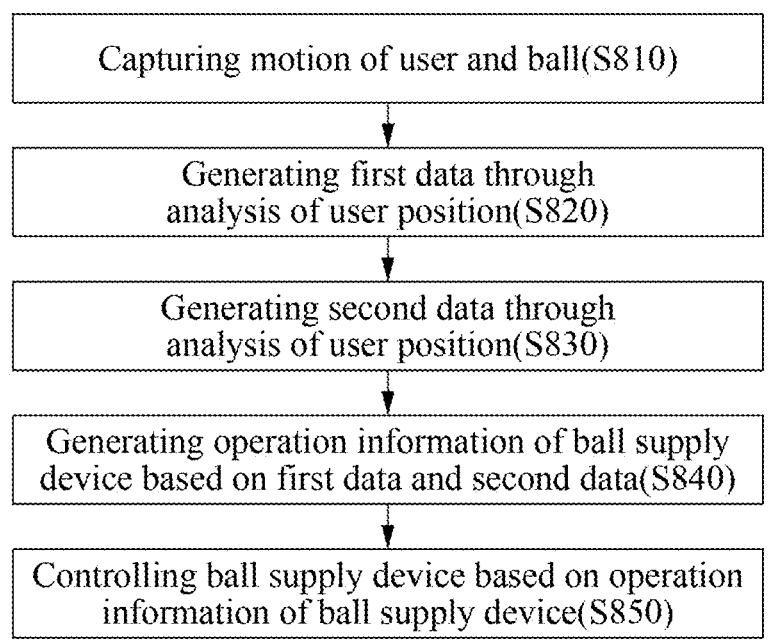

Referring to FIG. 32, the controller 100 may determine the position of the user and the ball in real time, and perform control so that the ball supply device 1000 operates based on the same. Accordingly, the user may play a practice game with the ball supply device 1000 as if he/she plays a game in real time.

The controller 100 may is configured to acquire an image related to the user and the movement of the ball, generate the first data about the user's position through a predetermined algorithm or artificial intelligence, and generate the second data regarding the position and movement of the ball.

The controller 100 may generate operation information of the ball supply device based on the first data and the second data, and perform control so that the ball supply device 1000 operates according to the operation information of the ball supply device. The operation information of the ball supply device may be generated based on the first data and the second data, and the operation information of the ball supply device may be determined by additionally considering the user's exercise information (e.g., the user's strengths, weaknesses, exercise skills, etc.). That is, the ball supply device 1000 may operate not only based on the user's position and the position of the ball, but also based on information obtained by reflecting the user's exercise skill and strengths and weaknesses, thereby enabling the user to practice tennis more effectively.

4 Mobile Device 3000

4.1 User Interface Configuration

As described above, the ball supply device 1000 according to an embodiment is capable of precise operation and control, and accordingly there is a need for a method that allows the user to remotely perform the precise operation and control. For example, the user may precisely manipulate and control the ball supply device 1000 using an application installed on the mobile device 3000. Accordingly, there is a need for efficient and user-friendly application development for controlling the operation of the ball supply device 1000.

The mobile device 3000 according to an embodiment may output a user interface for controlling the operation of the ball supply device 1000 on the display. The mobile device 3000 may receive a user input for the user interface, and may generate a control signal capable of controlling the operation of the ball supply device 1000 based on the received user input.

FIGS. 33 to 39 are exemplary views illustrating a user interface output from a mobile device according to an embodiment. Hereinafter, a user interface output by the mobile device 3000 through the display will be described with reference to the drawings.

Referring to (a) to (d) of FIG. 33, the mobile device 3000 may display an interface capable of inputting initial settings of an application on the display. For example, as shown in (a) to (d) of FIG. 33, the mobile device 3000 may display a login screen used for inputting user information, a screen used for selecting a device to communicate with, and a screen used for setting other environments.

Referring to (e) to (g) of FIG. 33, the mobile device 3000 may display a screen related to the operation of the ball supply device 1000 on the display. For example, control information of the ball supply device 1000 set by a user input (e.g., launching mode, launch speed, launching interval, launching number, use time, etc.), or one or more objects that enable controlling the operation of the ball supply device 1000 (e.g., an operation start object, a pause object, an operation stop object, etc.) may be displayed on the screen.

Referring to FIG. 34, the mobile device 3000 may display a screen explaining how to use an application on the display. As will be described later, the user may control the ball supply device 1000 to operate in various ways through the manipulation of the application, in which the mobile device 3000 may display a manipulation method of such an application through an interface.

Figure 35:
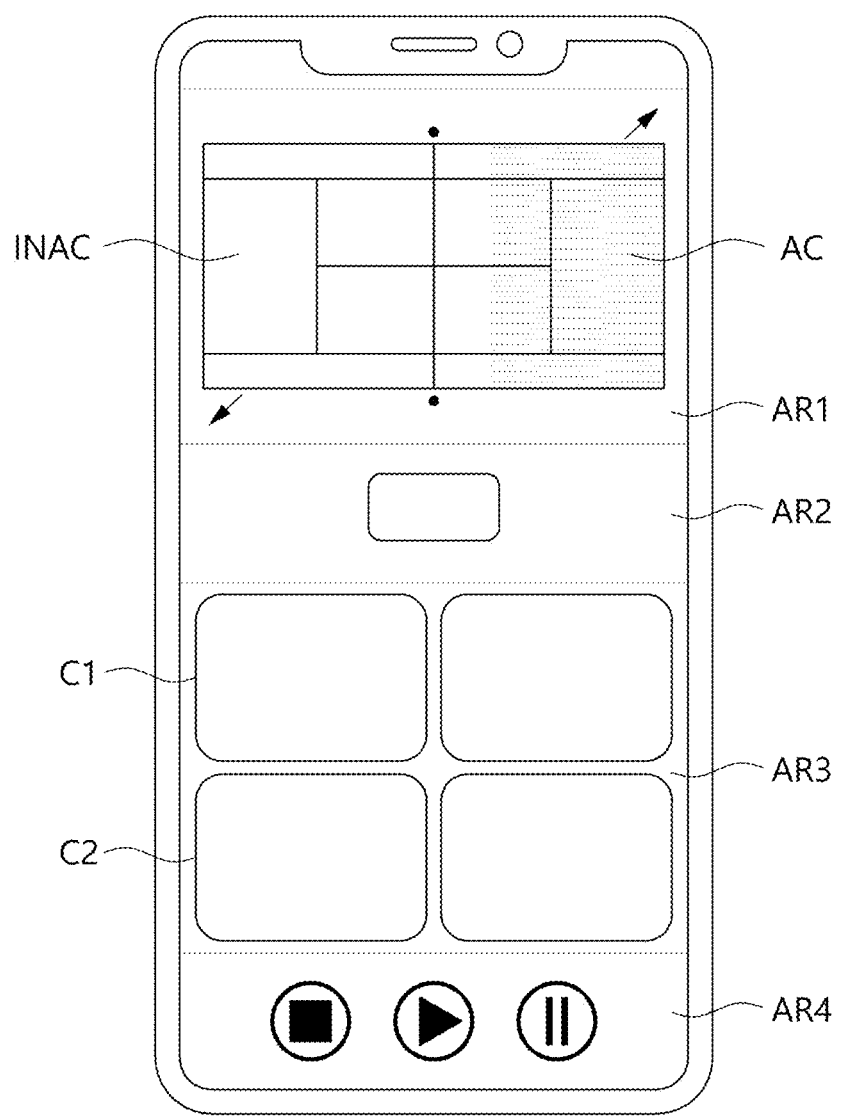
Figure 38:
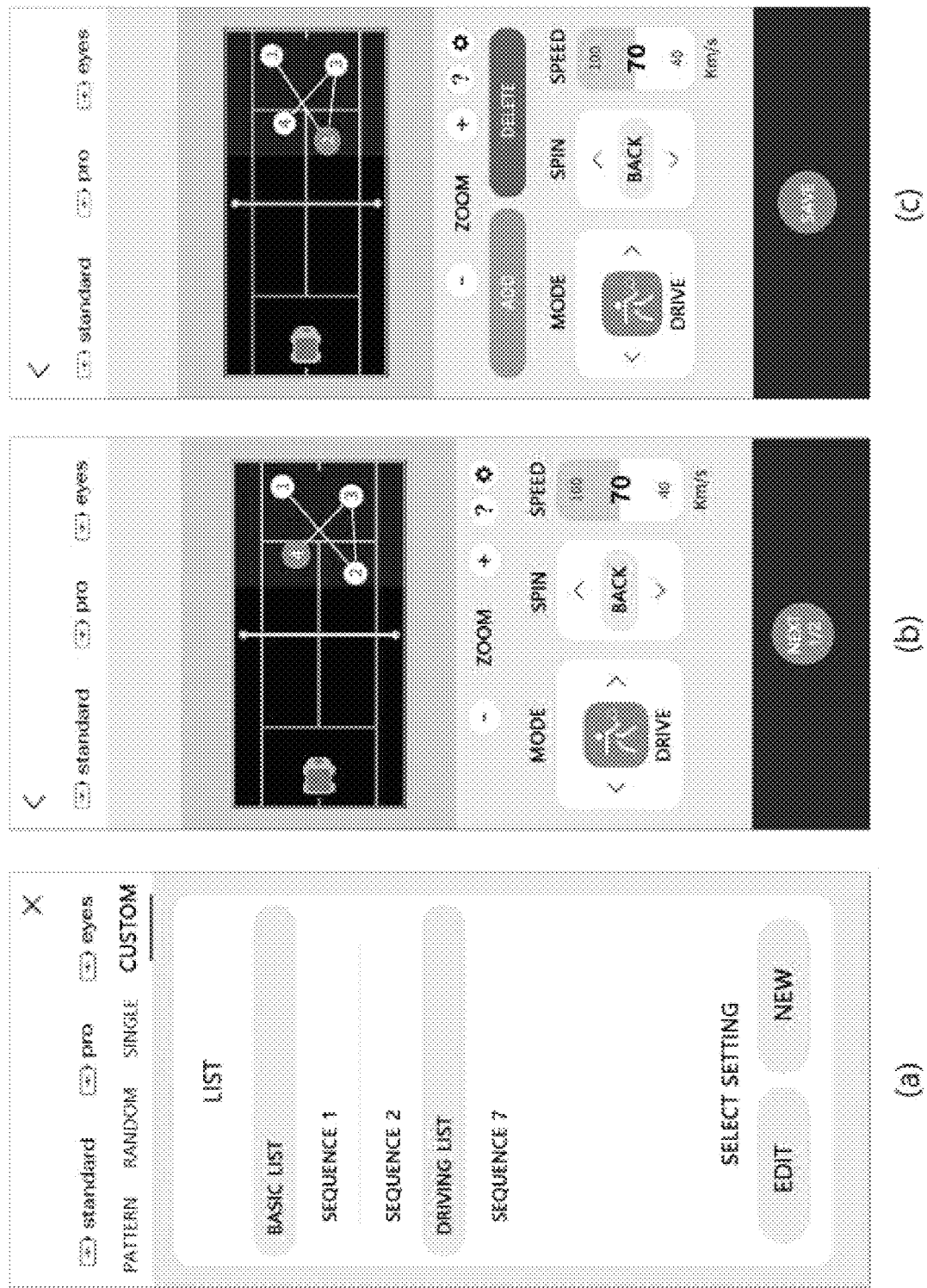
Figure 39:
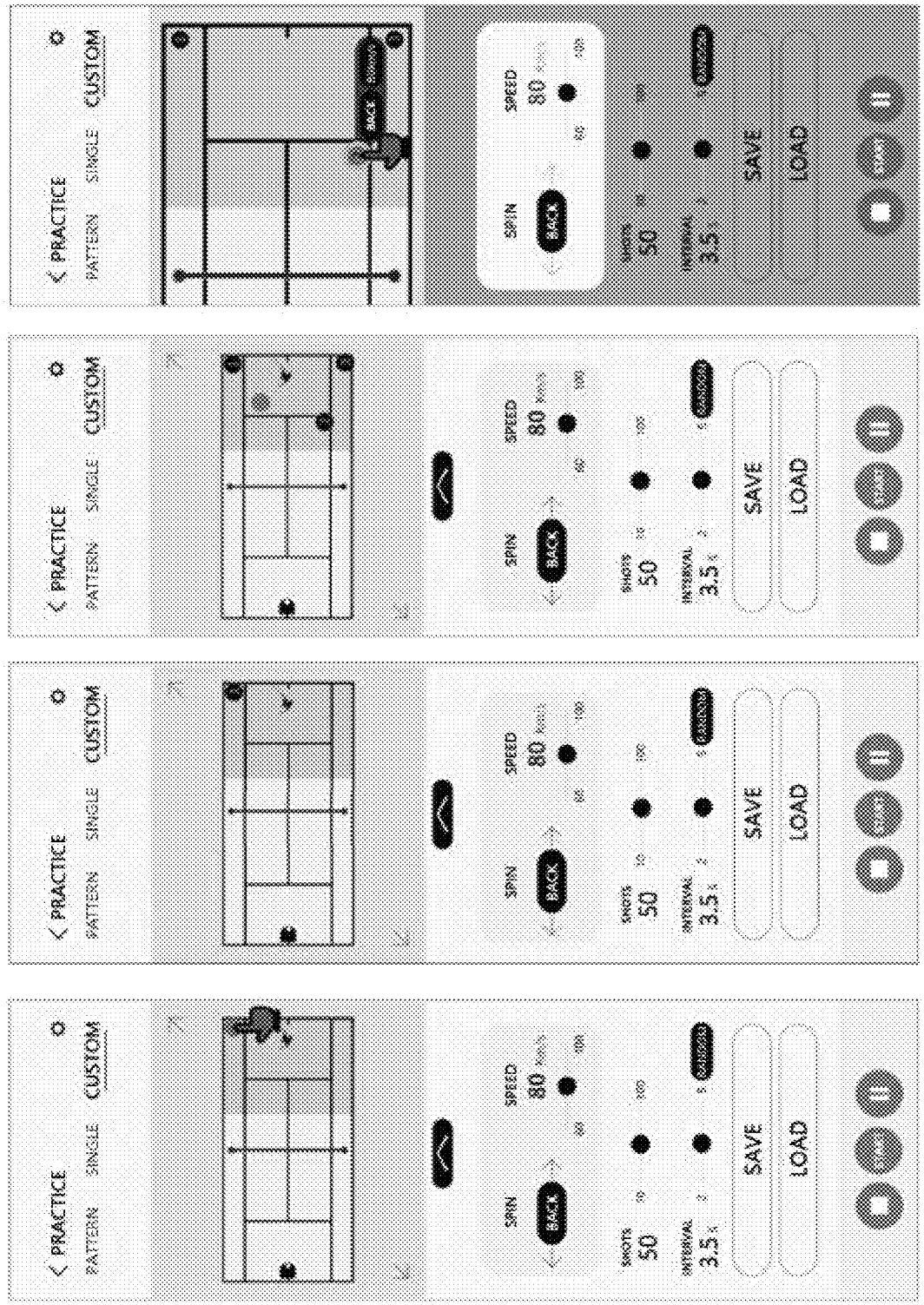

Referring to FIG. 35, the mobile device 3000 may output a user interface used for controlling the operation of the ball supply device 1000 on the display.

The display may display a first area AR1, a second area AR2, a third area AR3, and a fourth area AR4 capable of receiving the user input.

A tennis court image may be output to the first area AR1. A tennis full court image or a tennis half court image may be output to the first area AR1. Herein, the tennis court image output to the first area AR1 may be enlarged or reduced.

The first area AR1 may be an area in which a user input for at least one point on the tennis court is received. Herein the mobile device 3000 obtains the user input for the first area AR1, and generates a control signal for controlling the ball supply device 1000 so that the ball is dropped on any one point on the tennis court based on the same.

The first area AR1 may include an active area AC and an inactive area INAC. The active area AC may be an area in which a user input may be obtained, and the inactive area INAC may be an area in which a user input may not be obtained. In other words, when the user touches any one point in the active area AC, the mobile device 3000 may obtain the user input. When the user touches any one point of the inactive area INAC, the mobile device 3000 does not obtain a user input. That is, the user input may be not obtained in any area other than the active area AC in the first area AR1.

Since the ball launched by the ball supply device 1000 may drop only on a certain area on the tennis court, it is necessary to obtain the user input only for the active area AC which is an area where the ball may actually fall, in the case of the first area AR1 which is a screen where the user may select a desired ball drop point.

The mobile device 3000 may obtain a user input for the active area AC, and generate a control signal for controlling the ball supply device 1000 so that the ball is dropped to any one point on the tennis court based on the same.

An icon related to a user may be additionally displayed in the active area AC, and an icon related to the ball supply device 1000 may be additionally displayed in the inactive area INAC.

The active area AC may be output to be visually distinguishable from the inactive area INAC. In order to induce the user input to the active area AC in the first area AR1, the active area AC may be output to be visually distinguished from the inactive area INAC.

The first area AR1 may be displayed at an upper end of the display than the second area AR2 to the fourth area AR4. Since it is necessary to select a point on the tennis court to select the ball drop point, in order for the user to control the operation of the ball supply device 1000, the first area AR1 may be displayed at an upper end of the display than the second area AR2 to the fourth area AR4 in consideration of user convenience, so that the user first performs the user input regarding the ball drop point. However, the present invention is not limited thereto, and the first to fourth regions AR1 to AR4 may be displayed in various ways in a different order.

When it is confirmed that the mobile device 3000 has obtained the user input for the first area AR1, the second area AR2 to the fourth area AR4 may be activated. The mobile device 3000 first activates the first area AR1, and when the user input for the same is confirmed, the mobile device 3000 sequentially activates the second area AR2 to the fourth area AR4. This is to preferentially obtain the user input for the first area AR1 as described above, since it is necessary to first select a point on the tennis court to select the ball drop point, in order for the user to control the operation of the ball supply device 1000.

The second area AR2 may display an object capable of reflecting the launch condition set by the user, and the mobile device 3000 may obtain a user input for the object, and generate a control signal capable of controlling the operation of the ball supply device 1000 according to the ball launch condition set by the user based on the same.

The third area AR3 may display a plurality of objects related to a ball launch condition. The ball launch condition may be at least one of a spin type, a spin degree, a launch speed, the number of launches, and a launching interval.

The plurality of objects may include a first object capable of controlling an operation related to spin, a second object capable of controlling an operation related to the launch rating, a third object capable of controlling an operation related to the number of shots, and a fourth object capable of controlling an operation related to the launch interval.

The mobile device 3000 may obtain a user input for at least one of the first object to the fourth object, and generate a control signal capable of controlling the operation of the ball supply device 1000 based on the same.

The mobile device 3000 may obtain a user input for the first object, determine the spin type and the degree of spin of the ball based on the user input, and then generate a control signal that controls the ball supply device 1000 to operate according to the same. Herein, the type of spin of the ball may include backspin and topspin, and the degree of spin may vary depending on the speed of the roller, and since this has been described above, a redundant description will be omitted.

The mobile device 3000 may obtain a user input for the second object, and generate a control signal for controlling the operation of the ball supply device 1000 so that the ball may be launched at the ball launch speed determined based on the same.

The mobile device 3000 may obtain a user input for the third object, and generate a control signal that controls the ball supply device 1000 to operate according to the number of balls determined based on the same.

The mobile device 3000 may obtain a user input for the fourth object, and generate a control signal that controls the ball supply device 1000 to operate according to the ball launch interval determined based on the same.

Meanwhile, when the drop position of the ball, the launch rating, the type and degree of spin are determined by the user input to the first area AR1 and the third area AR3, the vertical rotation angle of the ball launcher 1100 may be automatically determined.

The mobile device 3000 may obtain user inputs for the first to fourth objects sequentially or in parallel.

Considering that the mobile device 3000 sequentially acquires user inputs for the first to fourth objects, when a user input is obtained for the first area AR1 and a user input for a first object is obtained in the third area AR3, information about the drop position of the ball and the spin of the ball may be determined.

Herein, based on the information about the drop position of the ball and the spin of the ball, a maximum and minimum value of a user input value for any one of the second to fourth objects may be determined. As a more specific example, when the information on the drop position of the ball and the spin of the ball is determined by the user input, the maximum ball launch speed and the minimum ball launch speed may be determined based on factors, such as the maximum vertical rotation angle of the ball launcher 1100.

As described above, the mobile device 3000 may obtain the user input for the first area AR1, obtain the user input for the first object, and then obtain user inputs for the second to fourth objects.

The third area AR3 may output at least one object used for controlling the operation of the ball supply device 1000 to start, pause, or terminate. The mobile device 3000 may obtain a user input for the object, and generate a control signal that controls the operation of the ball supply device 1000 to start, pause, or terminate based on the same.

For example, referring to FIGS. 36 to 39, a user interface output through the first area AR1 to the fourth area AR4 may be output. As described above, the mobile device 3000 may generate the control signal through the user input for the plurality of objects displayed in the first area AR1 to the fourth area AR4.

In addition, as shown in FIGS. 36 to 39, the application may provide "pattern mode", "random mode", "single mode" or "custom mode", in which each mode may be set based on the user input obtained through the above-described first area AR1 to fourth area AR4.

According to another embodiment, the ball supply device 1000 may include a body unit, and the mobile device 3000 may output a user interface for controlling the ball supply device 1000 having the body unit through the display.

Figure 40:
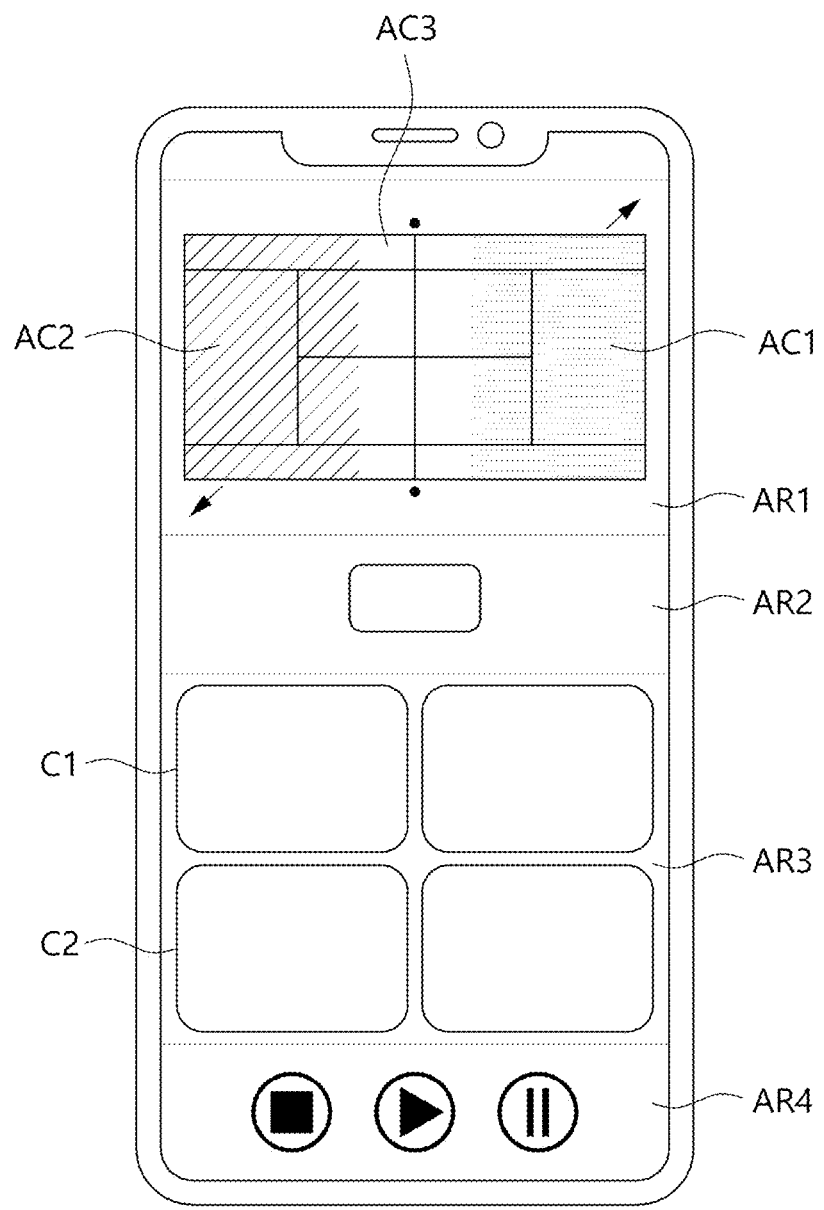
FIGS. 40 and 41 are exemplary views illustrating a user interface output through a mobile device according to another embodiment.
Figure 41:
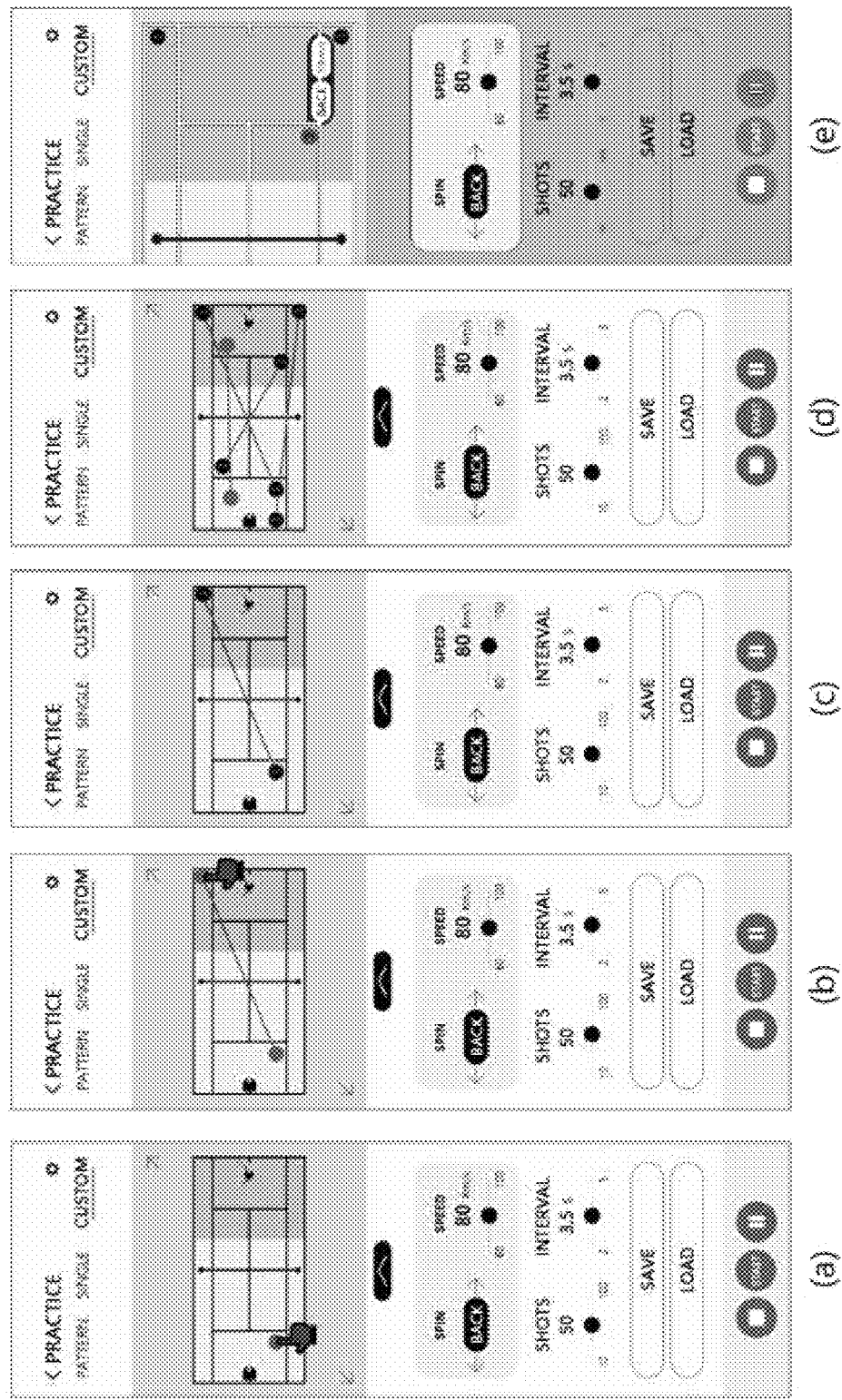

FIGS. 40 and 41 are exemplary views illustrating a user interface output through a mobile device according to another embodiment.

Referring to FIG. 40, when the ball supply device 1000 is equipped with a body unit to be movable, the mobile device 3000 may output a plurality of active areas AC1 and AC2 on the first area AR1 of the display. Both the first active area AC1 and the second active area AC2 may be areas in which the user input may be obtained.

When the user input for the first active area AC1 is obtained, the mobile device 3000 may determine a point at which the ball is to drop on the tennis court based on the same, and accordingly, generate a control signal that enables the ball supply device 1000 to be operated.

When the user input for the second active area AC2 is obtained, the mobile device 3000 may determine a point at which the ball supply device 1000 is to launch the ball on the tennis court based on the same, and thus generate a control signal that enables the ball supply device 1000 to be operated.

Referring to FIG. 41, when the ball supply device 1000 is provided with a body unit, the mobile device 3000 may output a user interface for controlling the ball supply device 1000 through the display. As shown in FIG. 41, the mobile device 3000 may obtain a plurality of user inputs for the first to fourth areas, and generate a control signal for controlling the operation of the ball supply device 1000 based on the same.

Figure 42:
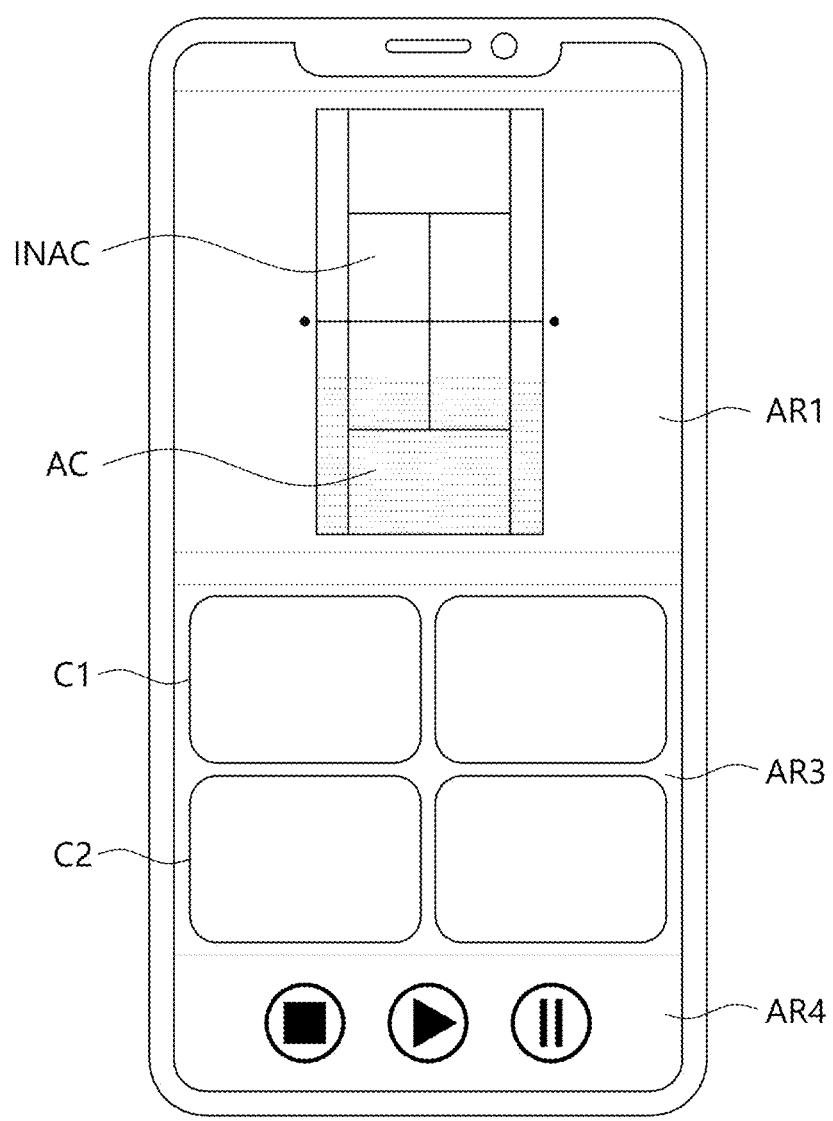
Figure 43:
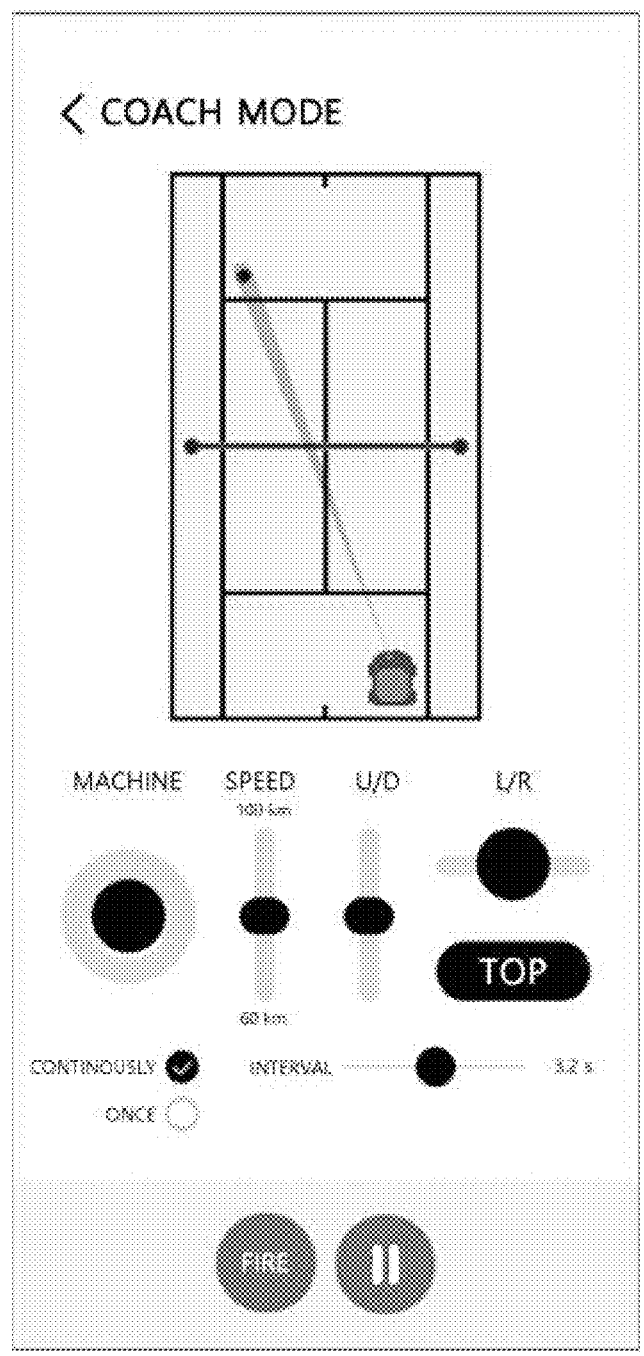

FIGS. 42 to 44 are exemplary views illustrating a user interface output through a mobile device according to another embodiment.

FIGS. 42 and 43, the mobile device 3000 may output a user interface that allows the ball supply device 1000 to be operated in the coaching mode through the display. Herein, the first region AR1 to the fourth region AR4 may substantially correspond to the region described above with reference to FIGS. 35 and 40, and since the description for this has been described above, a redundant description thereof will be omitted.

The mobile device 3000 may display the current position of the ball supply device 1000 on the display in real time, and may output information on a ball flying trajectory, the ball launch, and the like in real time, when the ball supply device 1000 is operated in coaching mode.

The mobile device 3000 may output a first object corresponding to the controller on the display, obtain a user input for the first object, and control the position of the ball supply device 1000 in real time based on the same, when operating the ball supply device 1000 in coaching mode, Accordingly, when the ball supply device 1000 operates in the coaching mode, the tennis coach may change the position of the tennis ball supply device 1000 in real time through the application, and may control ball launch conditions.

FIG. 44 is a diagram illustrating another example of a user interface by which the mobile device 3000 outputs to operate the ball supply device 1000 in the coaching mode through the display. The mobile device 3000 may provide a coaching mode through a user interface as shown in FIG. 44.

Figure 45:
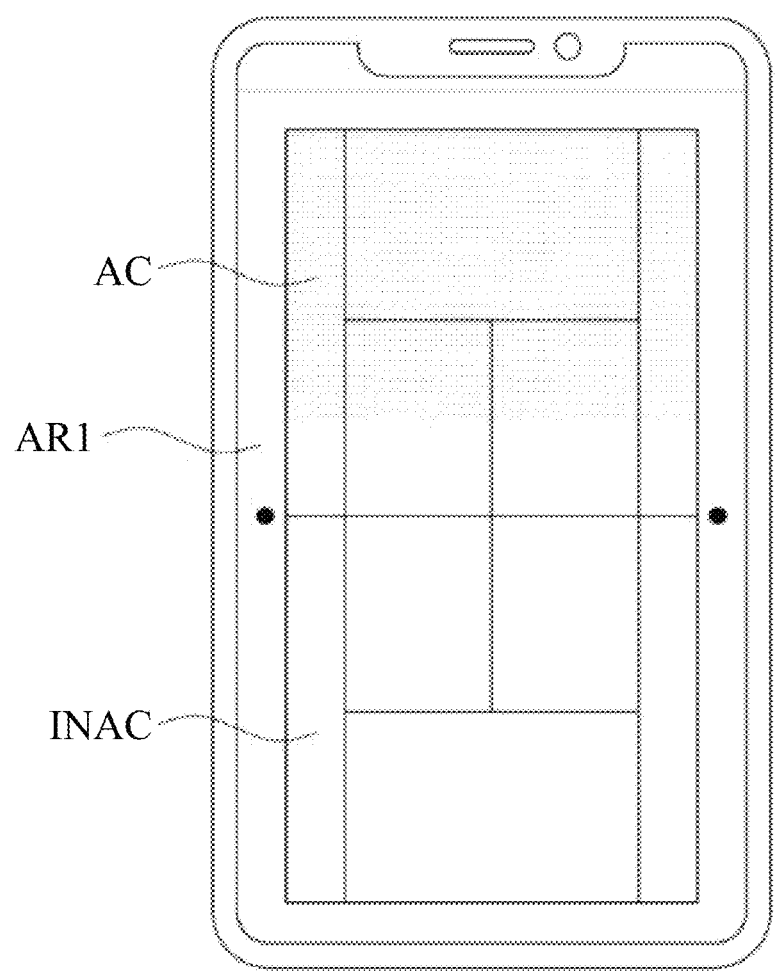
FIG. 45 is an exemplary view illustrating a user interface output through a mobile device according to another embodiment.

FIG. 45 is an exemplary view illustrating a user interface output through a mobile device according to another embodiment. Referring to FIG. 45, the user interface may be provided to be horizontally arranged on the display of the mobile device 3000. Even in this case, the display may output a tennis court image, and the mobile device 3000 may generate a control signal that controls the operation of the ball supply device 1000 based on type of the user input to the display and the region on the display in which the user input is obtained.

4.2 How to Operate User Interface

FIGS. 46 to 49 are exemplary views illustrating a method of operating an application according to an embodiment. Hereinafter, a detailed operation method of the application described above with reference to FIGS. 33 to 45 will be described with reference to FIGS. 46 to 49.

The user may set a routine in such a manner as to touch the screen of the mobile device 3000 (when the screen is a touch screen) or perform click with an input device such as a mouse, or in a corresponding manner.

Figure 46:
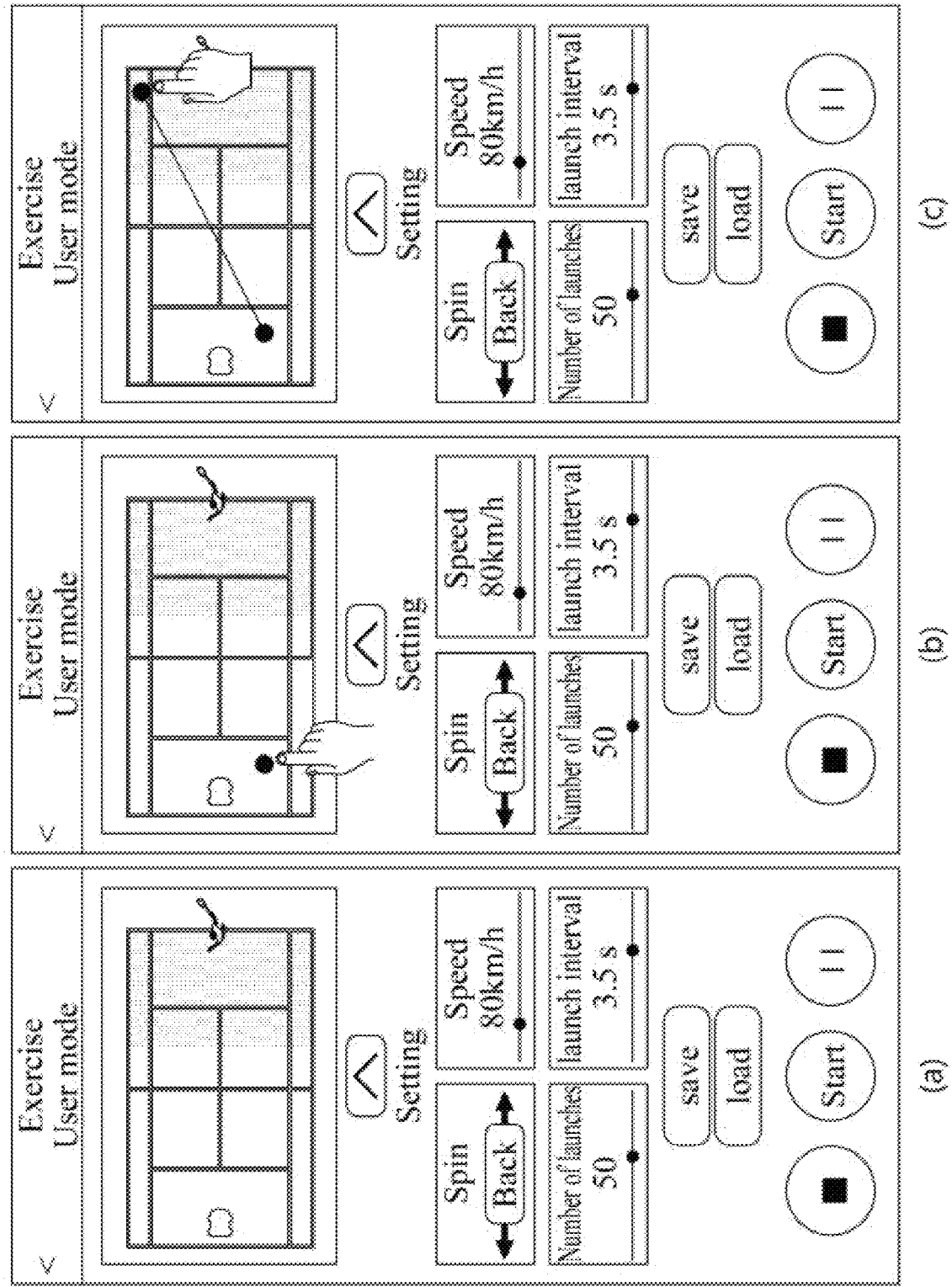
FIGS. 46 to 49 are exemplary views illustrating a method of operating an application according to an embodiment.

As an example, the user touches a point on one half-court of the tennis court area displayed on the screen of the mobile device 3000 to set the point as the ball launch position ((b) of FIG. 46), and touches a point on the other half-court, to set the point as the ball reaching position ((c) of FIG. 46). As another example, the user touches a point on one half-court of the tennis court area displayed on the screen of the mobile device 3000, slides to a point on the other half-court, and then releases the touch, thereby setting a point of the one half-court as a ball launch position and a point of the other half-court as a ball arrival position. As another example, the user moves two reference points displayed together with the tennis court on the screen of the mobile device 3000 to one point on one half court and one point on the other half court, respectively, thereby setting a point of the one half-court set as a ball launch position and a point of the other half-court as a ball arrival position.

Figure 47:
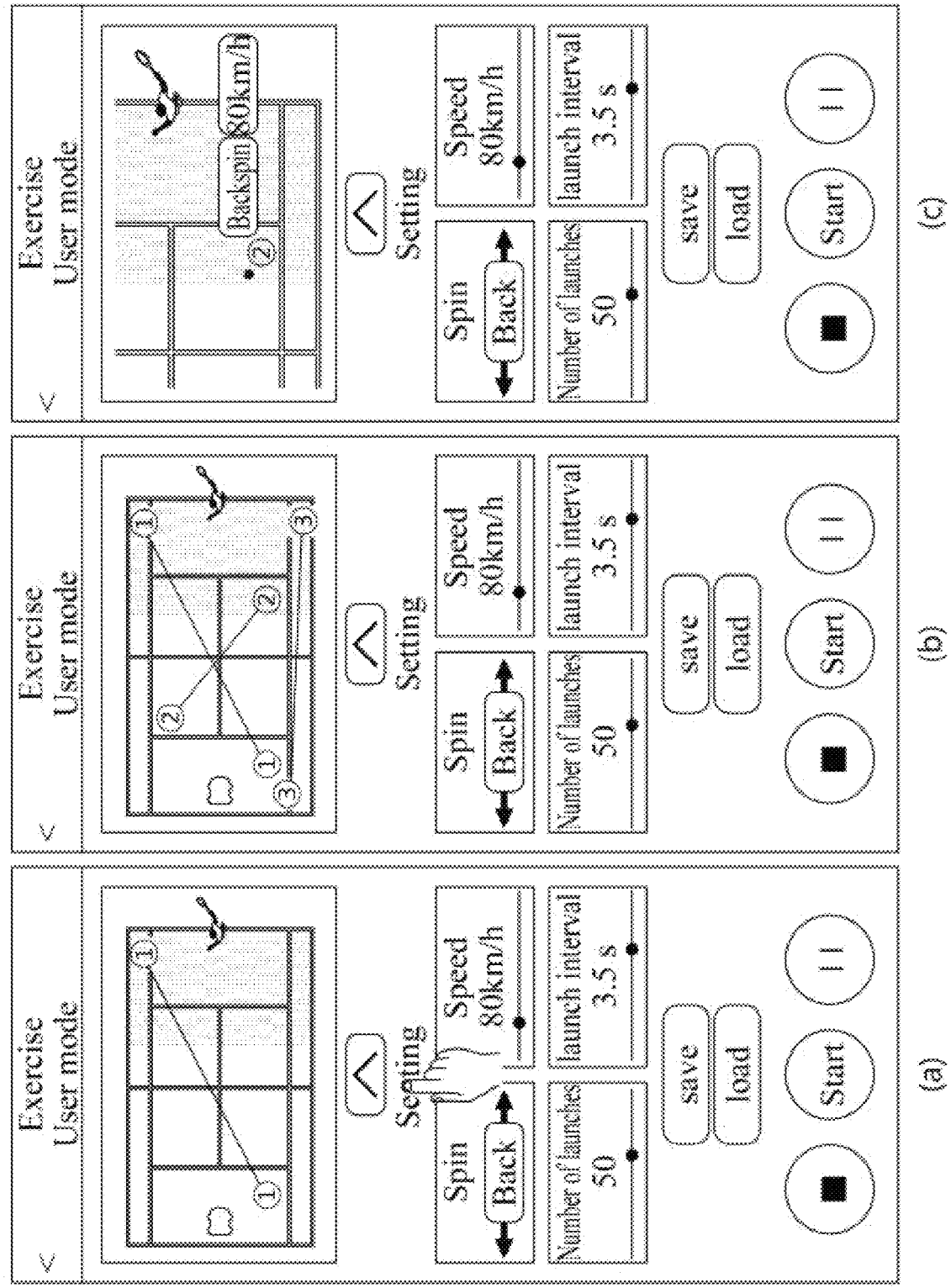

Referring to (b) of FIG. 47, the user may set two or more routines. For example, when the user sets up 2 routines, the user may set the first ball launch position and the corresponding first ball launch position, and the second ball launch position and the corresponding second ball launch position. Herein, the ball supply device 1000 may launch a ball from the first ball launch position to the first ball arrival position, move from the first ball launch position to the second ball launch position, and launch the ball from the second ball launch position to the second ball arrival position. In other words, the user may set the ball supply device 1000 to launch the ball while moving along a predetermined path through the user mode.

Referring to (c) of FIG. 47, the user may set a detailed routine by enlarging the tennis court displayed on the screen of the mobile device 3000. In addition, the user may modify the preset routine.

Referring to (a) and (b) of FIG. 47, the routine set by the user may be displayed on the screen of the mobile device 3000. Herein, the order of the routine may be displayed together. The ball supply device 1000 may operate according to the sequence of the routine.

As shown in FIGS. 46 and 47, in addition to the ball launch position and the ball arrival position, the user may set additional information including at least some of the ball launch time, ball launch speed, number of ball launches, ball launch interval, and ball launch spin. Herein, the routine may further include the additional information. In addition, when any of the ball launch position, ball arrival position and additional information are different, it is a different routine. For example, although the ball launch position and the ball reaching position are the same, when the ball launch speed is different, the routine is different. As with the ball launch position and the ball reaching position, the user may also modify the above additional information.

The user may select the user mode through the mobile device 3000 to perform training according to the set user mode. The mobile device 3000 transmits a message indicating that the user has selected the user mode to the external electronic device 2000, and the external electronic device 2000 may generate a control signal that controls the ball supply device 1000 according to the user mode. The external electronic device 2000 transmits the control signal to the ball supply device 1000, and the ball supply device 1000 may move according to the control signal and launch the ball to provide the user with training according to the user mode.

The general training program may include a coach mode in which the user directly manipulates the ball supply device 1000. In the coach mode, the mobile device 3000 may provide a screen used for controlling the ball supply device 1000.

Figure 48:
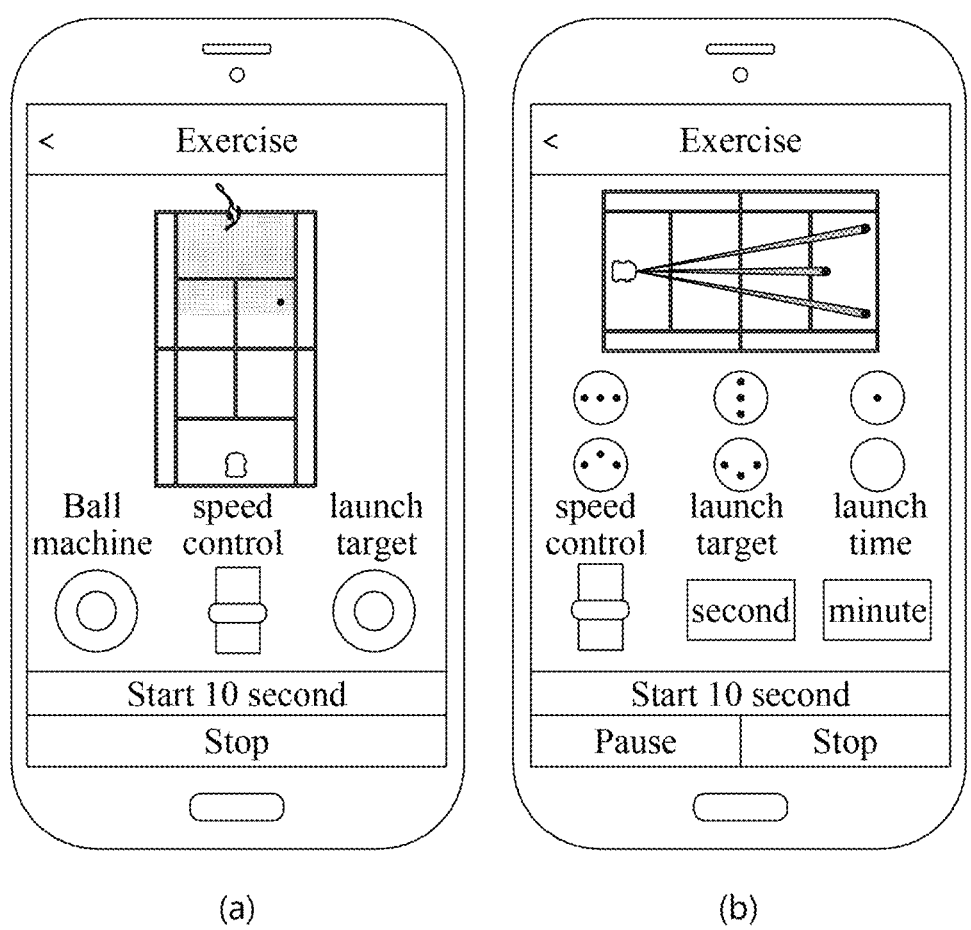

For example, as shown in (a) of FIG. 48, the screen of the mobile device 3000 may display at least one of a button for manipulating the position of the ball supply device 1000, a button for manipulating the speed of the ball launched from the ball supply device 1000, and a button for manipulating the ball arrival position.

The user may manipulate at least one of a position of the ball supply device 1000, a speed of a ball emitted from the ball supply device 1000, and a ball arrival position by manipulating the displayed button. Alternatively, the user may manipulate at least one of the position of the ball supply device 1000, the speed of the ball emitted from the ball supply device 1000, and the ball arrival position, through a separate input device (e.g., joystick, etc.) connected to the mobile device (3000). The position designated by the user may mean specific coordinates or position of the tennis court displayed on the screen of the mobile device 3000. Herein, the player may play a tennis match with the ball supply device 1000 operated in real time by the user.

The general training program may include a fixed mode in which the ball supply device 1000 does not move. As shown in (b) of FIG. 48, in the fixed mode, the ball supply device 1000 may launch a ball from a specific position to one or more ball arrival positions, according to a predetermined ball launch speed, number of ball launches, ball launch interval, ball launch spin, ball launch time, and the like.

In addition to interactive training programs and general training programs, the user may receive, from the tennis self-training system, player-wise pattern program that is created based on data of players who will become opponent including famous players, or player-wise weakness supplement program that is set to supplement weakness based on user's weakness information, and then conduct training according to the program.

Figure 49:
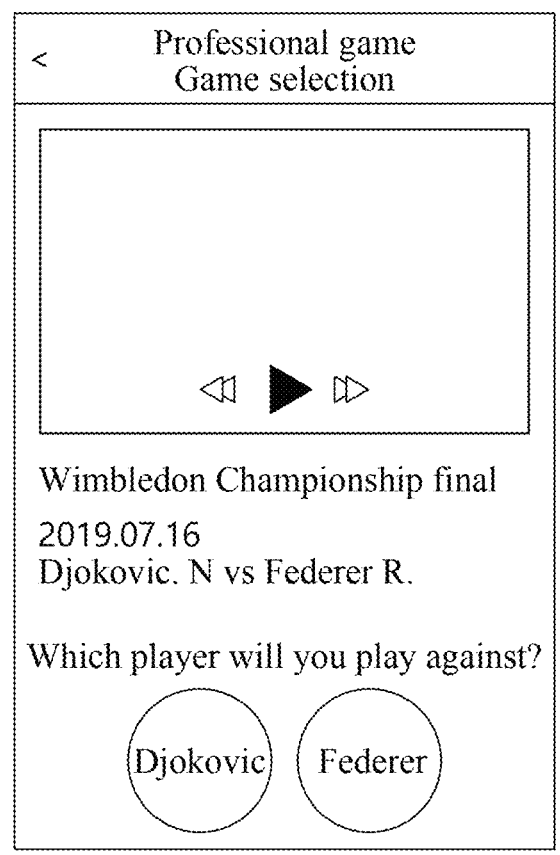

For example, as shown in FIG. 49, the mobile device 3000 may provide a game screen of professional players desired by the user based on the player-wise pattern program. Herein, when the user selects a professional player who he or she wants to play with, a practice program may be executed according to the game pattern of the corresponding player. That is, predetermined information about the professional player selected on the screen of the mobile device 3000 (meaning the game style or pattern of the professional player) is transmitted to the ball supply device 1000, and the ball supply device 1000 launches a ball to the user based on the provided information. As a result, the user may have an experience similar to playing a game with the professional player who he/she wants.

The server 4000 may be communicatively connected to at least one of the external electronic device 2000 and the mobile device 3000 through the network 10 to transmit/receive data. The server 4000 may be implemented as at least one computer device that provides commands, codes, files, contents, services, and the like, and may include a storage space, but is not limited thereto. The server 4000 may be a cloud server.

The server 4000 may recognize the exercise pattern, exercise skill, exercise posture, and the like of the user according to the image data, analyze the same, and provide the user with coaching data, such as a posture correction solution, a vulnerability solution, and training program. The user may check the coaching data through the mobile device 3000 or perform training accordingly.

5 Tennis Platform

Compared to the reality of increasing demand and interest in tennis, a community capable of receiving and providing information about tennis and capable of communicating among tennis players is not yet active. Especially, there is few platform in which users can share individual practice data or training data or provide events using the same.

The server of the tennis self-training system according to an embodiment may provide a tennis platform service. As mentioned above, the ball supply device 1000, the external electronic device 2000 and the like according to an embodiment may capture and analyze the user's movement and/or the movement of the ball, and generate user exercise information or training data based on the same. The server 4000 may provide a tennis platform service capable of providing various services by using the generated information or data.

FIGS. 50 to 53 are exemplary views illustrating a platform service that may be provided by the tennis self-training system according to an embodiment. Referring to FIGS. 50 to 53, the server 4000 according to an embodiment may provide a tennis platform service, and various services may be provided on the platform.

Figure 50:
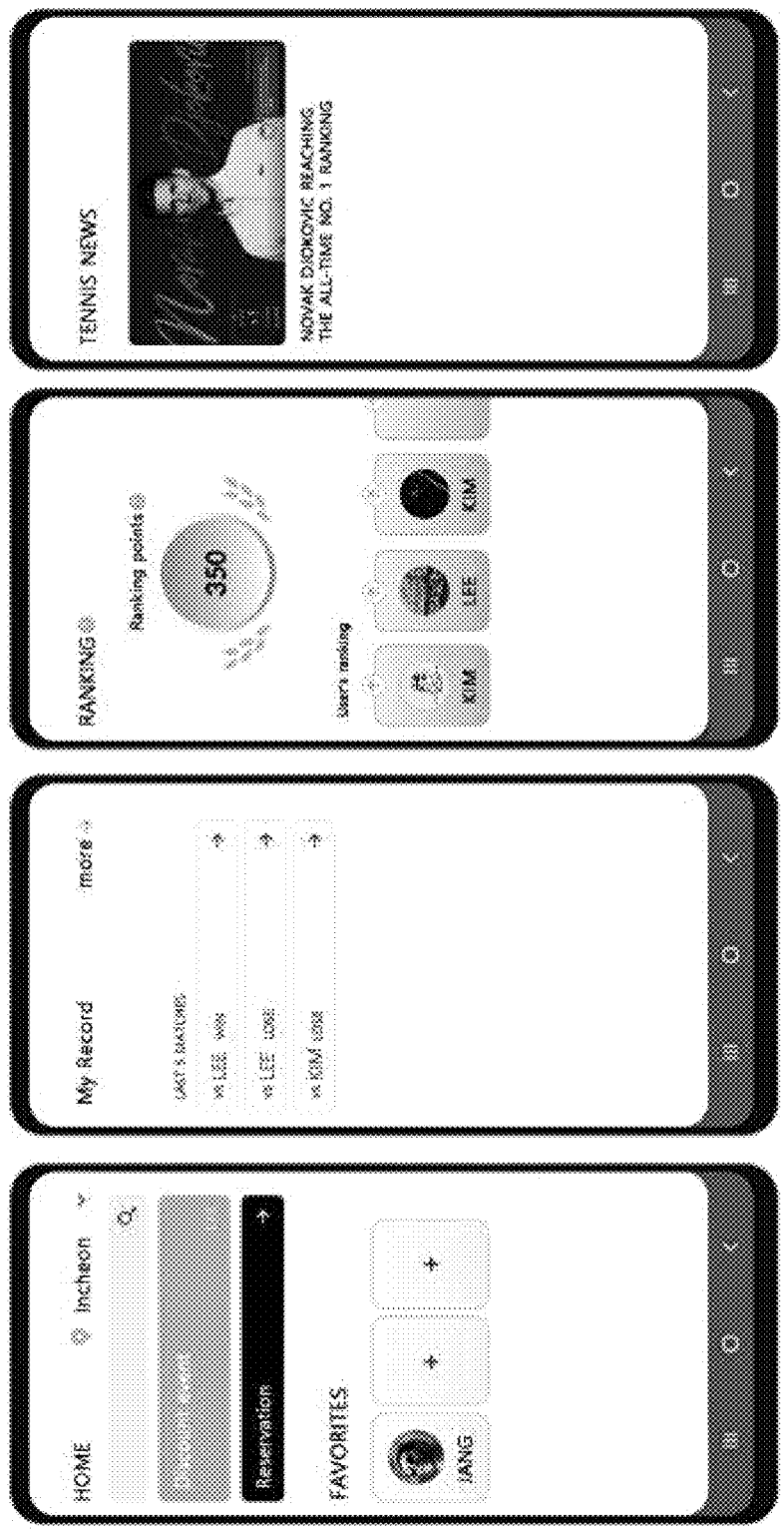
FIGS. 50 to 53 are exemplary views illustrating a platform service that may be provided by a tennis self-training system according to an embodiment.

Referring to (a) of FIG. 50, it is possible to provide a service to reserve a tennis field and/or tennis coach in association with a tennis company and/or a tennis coach; and as shown in (b) of FIG. 50, it is possible to provide data on a result of a match between users using the tennis platform service. In addition, as shown in (c) of FIG. 50, it is possible to assign a score through the result of the match between users, and provide one's own rank or overall rank by aggregating the assigned score. In this case, the score given to the user may be given through a match result between users, but is not limited thereto and may be given through the result of a practice match with the ball supply device 1000. More specifically, the score may be assigned in consideration of the training time, training difficulty level, training program, match result, and the like, through the ball supply device 1000. In addition, as shown in (d) of FIG. 50, service that allows accessing various news related to tennis in real time may be provided.

Figure 51:
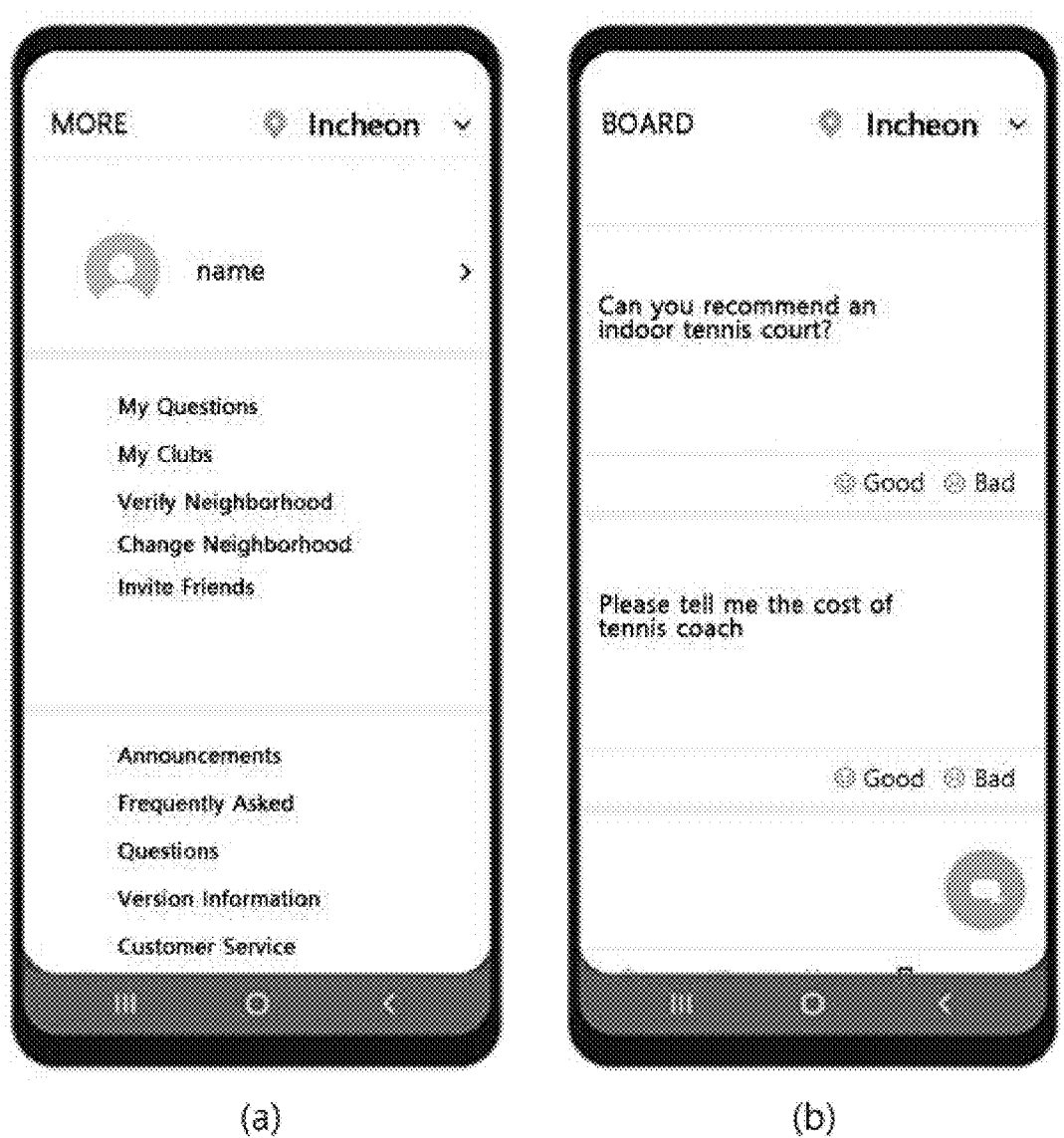

Referring to (a) of FIG. 51, a variety of services may be provided by allowing basic information necessary to use the tennis platform to be entered. More specifically, the platform service may provide information about the tennis driving range, tennis coach, practice partner, or other tennis news in the neighborhood to which the user belongs, based on the neighborhood information entered by the user. For example, as shown in (b) of FIG. 51, a separate community based on the neighborhood to which the user belongs may be provided.

Figure 52:
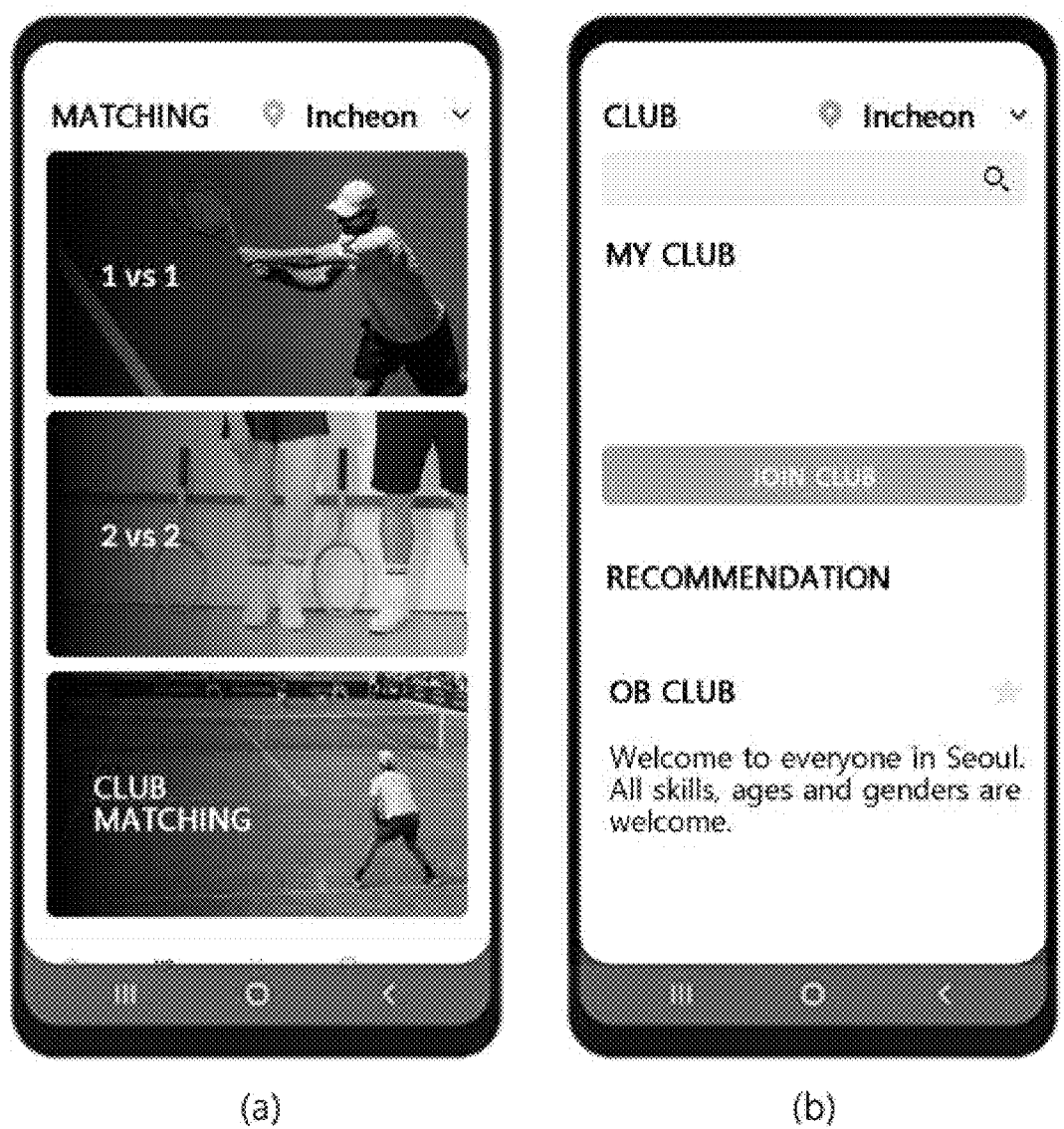

Referring to (a) of FIG. 52, a tennis matching service may be provided. The matching service may be provided based on data secured through the ball supply device 1000 and/or the external electronic device 2000. For example, it is possible to obtain the user's exercise information through the ball supply device 1000 and/or the external electronic device 2000, and to provide a matching service between users based on the same. Herein, the user's exercise information may be calculated based on training data secured through training with the ball supply device 1000, and may include information about the user's strengths, the user's weaknesses, or the user's exercise ability.

Figure 53:
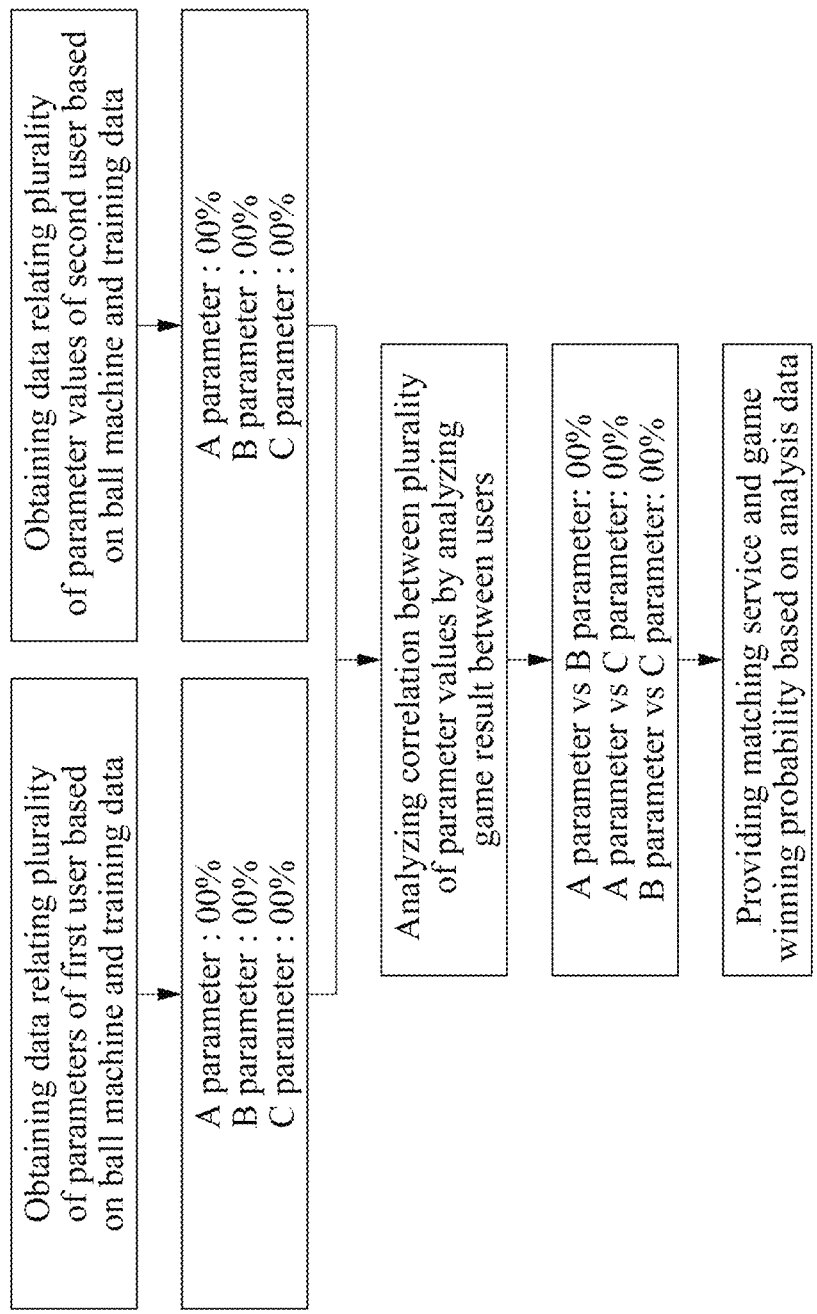

For example, as in FIG. 53, the tennis platform service according to an embodiment is configured to acquire a plurality of parameter values based on the training data and/or the user's exercise information obtained through the ball supply device 1000 and/or the external electronic device 2000, and to provide service for recommending a tennis matching partner based on the plurality of parameter values.

As another example, as in FIG. 53, when the second user is selected as an opponent of the first user through the above-described tennis matching partner recommendation service, the server 4000 is configured to obtain a plurality of parameter values for the first user and a plurality of parameter values for the second user, and then calculate a game winning probability of the first user or the second user through correlation analysis between the plurality of parameter values of the first user and the plurality of parameter values of the second user.

Features, structures, effects, and the like described in the above embodiments are included in at least an embodiment of the present invention, but is not necessarily limited to only an embodiment. Furthermore, features, structures, effects, and the like illustrated in each embodiment can be combined or modified for other embodiments by those of ordinary skill in the art to which the embodiments belong. Accordingly, the contents related to such combinations and modifications should be interpreted as being included in the scope of the present invention.

In addition, although the embodiment has been mainly described above, this is only an example and does not limit the present invention, but those of ordinary skill in the art to which the present invention pertains will appreciate that various modifications and applications not exemplified above are possible without departing from the essential characteristics of the present embodiment. That is, each component specifically shown in the embodiment can be implemented by modification. In addition, differences related to such modifications and applications should be construed as being included in the scope of the present invention defined in the appended claims.

What is claimed is:

1. A ball supply device, comprising:
a communication circuit configured to communicate with an external device;
a launcher configured to launch a ball;
a body unit configured to move the launcher;
a storage; and
a controller configured to:
identify whether the body unit is disposed on the first position based on a signal received from the communication circuit,
based on identifying that the body unit is disposed on the first position, control the launcher to launch the ball,
control the body unit to move to a second position after the launcher has stopped launching the ball,
identify whether the body unit is disposed on the second position based on the signal received from the communication circuit,
control the launcher or the body unit based on an image related to a tennis match,
obtain a first user information related to a first user at a first time point,
generate a first data based on an image related to a motion of the first user,
match the first data with the first user information and store the first data in the storage,
obtain a second user information related to a second user at a second time point, and
based on identifying that the second user information corresponds to the first user information, identify a launch condition of the launcher based on the first data,
wherein the first time point is prior to the second time point.

2. The device of claim 1, wherein the first position and the second position are identified based on a user input.

3. The device of claim 1, wherein the controller is configured to:
control the launcher or the body unit based on an image related to a tennis match,
generate a first data related to a position of the ball based on the image, and
control the body unit to move to the first position or the second position identified based on the first data.

4. The device of claim 3, wherein the controller is configured to:
generate a second data related to a position of a user based on the image, and
identify a launch condition of the launcher based on at least one of the first data or the second data.

5. The device of claim 4, wherein the launch condition is related to at least one of a ball launch angle, a type of spin or a ball launch speed.

6. The device of claim 1, wherein the launch condition is related to at least one of a ball launch angle, a type of spin or a ball launch speed.

7. The device of claim 1, wherein the controller is configured to:
obtain an image related to a tennis match,
generate a first data related to a position of the ball based on the image,
generate a second data related to a position of a user based on the image,
identify a ball launch position based on the first data, wherein the ball launch position is included in an area on a tennis court where the ball supply device starts launching the ball,
identify a ball arrival position based on the second data, wherein the ball arrival position is included in an area on the tennis court where the launched ball first hits the tennis court,
generate a first control signal for controlling the body unit to move to the ball launch position, and
generate a second control signal for controlling the launcher so that the ball falls to the ball arrival position.

8. The device of claim 7, wherein the second control signal is a signal for controlling at least one of a ball launch angle, a type of spin or a ball launch speed.

9. A method of launching a ball using a ball supply device, the method comprising:
controlling a body unit to move to a first position;
identifying whether the body unit is disposed on the first position based on a signal received from a communication circuit;
based on identifying that the body unit is disposed on the first position, controlling a launcher to launch the ball;
controlling the body unit to move to a second position after the launcher has stopped launching the ball;
identifying whether the body unit is disposed on the second position based on the signal received from the communication circuit, and
controlling the launcher or the body unit based on an image related to a tennis match,
wherein the controlling the launcher or the body unit further comprises:
obtaining a first user information related to a first user at a first time point;
generating a first data based on an image related to a motion of the first user; and
matching the first data with the first user information and storing the first data in the storage;
obtaining a second user information related to a second user at a second time point; and
based on identifying that the second user information corresponds to the first user information, identifying a launch condition of the launcher based on the first data,
wherein the first time point is prior to the second time point.

10. The method of claim 9, wherein the first position and the second position are identified based on a user input.

11. The method of claim 9, further comprising:
controlling the launcher or the body unit based on an image related to a tennis match;
generating a first data related to a position of the ball based on the image; and
controlling the body unit to move to the first position or the second position identified based on the first data.

12. The method of claim 11, further comprising:
generating a second data related to the position of a user based on the image; and
identifying a launch condition of the launcher based on at least one of the first data or the second data.

13. The method of claim 12, wherein the launch condition is related to at least one of a ball launch angle, a type of spin or a ball launch speed.

14. The method of claim 9, wherein the launch condition is related to at least one of a ball launch angle, a type of spin or a ball launch speed.

15. The method of claim 9, further comprising:
controlling the launcher or the body unit based on an image related to a tennis match,
wherein the controlling the launcher or the body unit further comprises:
  generating a first data related to a position of the ball based on the image;
  generating a second data related to a position of a user based on the image;
  identifying a ball launch position based on the first data, wherein the ball launch position is included in an area on a tennis court where the ball supply device starts launching the ball;
  identifying a ball arrival position based on the second data, wherein the ball arrival position is included in an area on the tennis court where the launched ball first hits the tennis court;
  generating a first control signal for controlling the body unit to move to the ball launch position; and
  generating a second control signal for controlling the launcher so that the ball falls to the ball arrival position.

16. The method of claim 15, wherein the second control signal is a signal for controlling at least one of a ball launch angle, a type of spin or a ball launch speed.

* * * * *